(12) United States Patent
Menas

(10) Patent No.: US 7,812,479 B1
(45) Date of Patent: Oct. 12, 2010

(54) POWER SAMPLING SYSTEMS AND METHODS

(76) Inventor: Gregory W. Menas, 317 Whitfield, Wichita, KS (US) 67206

( * ) Notice: Subject to any disclaimer, the term of this patent is extended or adjusted under 35 U.S.C. 154(b) by 211 days.

(21) Appl. No.: 11/931,426

(22) Filed: Oct. 31, 2007

Related U.S. Application Data

(60) Provisional application No. 60/885,007, filed on Jan. 15, 2007.

(51) Int. Cl.
*G05B 11/01* (2006.01)
*H02J 3/14* (2006.01)

(52) U.S. Cl. .......................... 307/31; 700/22
(58) Field of Classification Search ............... 307/11, 307/38, 31; 700/22
See application file for complete search history.

(56) References Cited

U.S. PATENT DOCUMENTS

| | | | |
|---|---|---|---|
| 4,335,445 A | 6/1982 | Nercessian | |
| 4,659,941 A | 4/1987 | Quiros et al. | |
| 4,761,725 A | 8/1988 | Henze | |
| 4,915,639 A | 4/1990 | Cohn et al. | |
| 5,051,720 A | 9/1991 | Kittirutsunetorn | |
| 5,079,410 A | 1/1992 | Payne et al. | |
| 5,103,110 A | 4/1992 | Housworth et al. | |
| 5,300,864 A | 4/1994 | Allen, Jr. | |
| 5,329,491 A | 7/1994 | Brown et al. | |
| 5,347,211 A | 9/1994 | Jakubowski | |
| 5,406,091 A | 4/1995 | Burba et al. | |
| 5,481,730 A | 1/1996 | Brown et al. | |
| 5,532,914 A | 7/1996 | Kageyama et al. | |
| 5,550,729 A | 8/1996 | Wissell | |
| 5,570,002 A | 10/1996 | Castleman | |
| 5,652,893 A | 7/1997 | Ben-Meir et al. | |
| 5,847,950 A | 12/1998 | Bhagwat | |
| 5,886,422 A | 3/1999 | Mills | |
| 5,905,370 A | 5/1999 | Bryson | |
| 5,928,365 A | 7/1999 | Yoshida | |
| 5,939,868 A | 8/1999 | Hall et al. | |
| 5,958,056 A | 9/1999 | Lehmann | |
| 5,973,948 A | 10/1999 | Hahn et al. | |
| 6,058,030 A | 5/2000 | Hawkes et al. | |
| 6,137,188 A | 10/2000 | Mitchell et al. | |
| 6,149,319 A | 11/2000 | Richter et al. | |
| 6,172,891 B1 | 1/2001 | ONeal et al. | |
| 6,232,675 B1 | 5/2001 | Small | |

(Continued)

FOREIGN PATENT DOCUMENTS

WO 0143266 A1 6/2001

(Continued)

OTHER PUBLICATIONS

International Search Report regarding PCT/US2004/037326 dated Mar. 22, 2005, two (2) pages.

(Continued)

*Primary Examiner*—Michael Rutland Wallis
(74) *Attorney, Agent, or Firm*—Polsinelli Shughart PC

(57) ABSTRACT

An automatic sensing power system automatically has a voltage sampling system that samples a voltage from an electrical device, determines a power requirement for the electrical device, converts power to the required level, and outputs the power to the electrical device when the electrical device is connected to the automatic sensing power system.

24 Claims, 43 Drawing Sheets

U.S. PATENT DOCUMENTS

| | | | |
|---|---|---|---|
| 6,262,567 B1 | 7/2001 | Bartlett | |
| 6,327,663 B2 | 12/2001 | Isaac et al. | |
| 6,396,169 B1 | 5/2002 | Voegeli et al. | |
| 6,445,087 B1 | 9/2002 | Wang et al. | |
| 6,448,672 B1 | 9/2002 | Voegeli et al. | |
| 6,459,175 B1 | 10/2002 | Potega | |
| 6,512,682 B2 | 1/2003 | Cohen et al. | |
| 6,538,341 B1 | 3/2003 | Lang | |
| 6,634,896 B1 | 10/2003 | Potega | |
| 6,643,158 B2 | 11/2003 | McDonald et al. | |
| 6,650,560 B2 | 11/2003 | MacDonald et al. | |
| 6,651,178 B1 | 11/2003 | Voegeli et al. | |
| 6,653,814 B1 | 11/2003 | Patino | |
| 6,697,897 B1 | 2/2004 | Friel et al. | |
| 6,700,808 B2 | 3/2004 | MacDonald et al. | |
| 6,715,022 B1 | 3/2004 | Ahern | |
| 6,751,109 B2 | 6/2004 | Doss et al. | |
| 6,765,365 B2 | 7/2004 | Kim et al. | |
| 6,775,163 B2 | 8/2004 | McDonald et al. | |
| 6,791,853 B2 | 9/2004 | Afzal et al. | |
| 6,811,444 B2 | 11/2004 | Geyer | |
| 6,829,547 B2 | 12/2004 | Law et al. | |
| 7,242,111 B2 | 7/2007 | Menas et al. | |
| 7,285,874 B2 | 10/2007 | Menas et al. | |
| 7,466,042 B2 * | 12/2008 | Eldredge | 307/154 |
| 7,485,986 B2 | 2/2009 | Menas et al. | |
| 7,508,092 B2 | 3/2009 | Menas et al. | |
| 7,514,814 B2 | 4/2009 | Menas et al. | |
| 2002/0071290 A1 | 6/2002 | Youn et al. | |
| 2002/0187682 A1 | 12/2002 | Lincoln, III et al. | |
| 2003/0060243 A1 | 3/2003 | Burrus, IV | |
| 2003/0073342 A1 | 4/2003 | Geyer | |
| 2003/0129869 A1 | 7/2003 | Milan | |
| 2003/0230934 A1 | 12/2003 | Cordelli et al. | |
| 2004/0130213 A1 | 7/2004 | Goldsholl | |
| 2004/0218411 A1 | 11/2004 | Luu et al. | |
| 2005/0102043 A1 * | 5/2005 | Menas et al. | 700/22 |
| 2006/0119182 A1 | 6/2006 | Menas et al. | |
| 2006/0119993 A1 | 6/2006 | Menas et al. | |
| 2006/0119994 A1 | 6/2006 | Menas et al. | |
| 2006/0129252 A1 | 6/2006 | Menas et al. | |
| 2006/0129253 A1 | 6/2006 | Menas et al. | |
| 2006/0183510 A1 | 8/2006 | Menas et al. | |
| 2006/0202557 A1 | 9/2006 | Menas et al. | |
| 2007/0205666 A1 | 9/2007 | Menas et al. | |
| 2007/0225833 A1 | 9/2007 | Menas et al. | |
| 2007/0252436 A1 | 11/2007 | Menas et al. | |
| 2007/0252437 A1 | 11/2007 | Menas et al. | |
| 2007/0252438 A1 | 11/2007 | Menas et al. | |
| 2007/0252439 A1 | 11/2007 | Menas et al. | |
| 2007/0257559 A1 | 11/2007 | Menas et al. | |
| 2007/0257560 A1 | 11/2007 | Menas et al. | |
| 2007/0273208 A1 | 11/2007 | Menas et al. | |
| 2007/0273215 A1 | 11/2007 | Menas et al. | |
| 2008/0031026 A1 | 2/2008 | Menas et al. | |

FOREIGN PATENT DOCUMENTS

| | | |
|---|---|---|
| WO | 2005013456 A1 | 2/2005 |
| WO | 2005048415 A1 | 5/2005 |

OTHER PUBLICATIONS

Office Action dated Oct. 6, 2009 regarding U.S. Appl. No. 11/931,420, 5 pages.
Office Action dated Apr. 3, 2009 regarding U.S. Appl. No. 11/931,310, 10 pages.
Cherry Semiconductor Corporation, 5 Bit Synchronous CPU Controller With Power-Good and Current Limit (CS-5166)-manual, revised Jul. 30, 1998, 23 pages.
English translation of Decision of Refusal (JP2006-539737), drafted May 2, 2008, 3 pages.
English translation of Notice of Reasons for Rejection (JP2006-539737), drafted Sep. 26, 2007, 3 pages.
Unitrode, (UCC2882/-1) Average Current Mode Synchronous Controller With 5-Bit DAC, dated Nov. 1998, 14 pages.
Intel Corporation, VRM 8.3 DC-DC Converter Design Guidelines, dated Mar. 1999, 14 pages.
Linear Technology, 5-Bit Programmable Synchronous Switching Regulator Controller for Pentium II Processor (LTC1753), Sep. 1998, 24 pages.
Notice of Allowance for U.S. Appl. No. 11/931,420, Power Sampling Systems and Methods, dated Jun. 7, 2010, 8 pages.
Notice of Allowance for U.S. Appl. No. 11/334,143, Automatic Sensing Power Systems and Methods, dated Jun. 10, 2010, 6 pages.
Notice of Allowance for U.S. Appl. No. 11/334,082, Automatic Sensing Power Systems and Methods, dated Jun. 25, 2010, 6 pages.
Notice of Allowance for U.S. Appl. No. 11/334,078, Automatic Sensing Power Systems and Methods, dated Aug. 4, 2010, 6 pages.
Notice of Allowance for U.S. Appl. No. 10/983,507, Automatic Sensing Power Systems and Methods, dated Aug. 5, 2010, 6 pages.
Notice of Allowance for U.S. Appl. No. 11/777,209, Automatic Sensing Power Systems and Methods, dated Aug. 5, 2010, 6 pages.
Notice of Allowance for U.S. Appl. No. 11/777,207, Automatic Sensing Power Systems and Methods, dated Aug. 9, 2010, 6 pages.
Notice of Allowance for U.S. Appl. No. 11/777,227, Automatic Sensing Power Systems and Methods, dated Aug. 9, 2010, 6 pages.
Notice of Allowance for U.S. Appl. No. 11/777,212, Automatic Sensing Power Systems and Methods, dated Aug. 13, 2010, 6 pages.
Issue Notification for U.S. Appl. No. 11/931,310, Power Sampling Systems and Methods, dated Jun. 9, 2010, 1 page.
Issue Notification for U.S. Appl. No. 11/777,216, Automatic Sensing Power Systems and Methods, dated Aug. 18, 2010, 1 page.

* cited by examiner

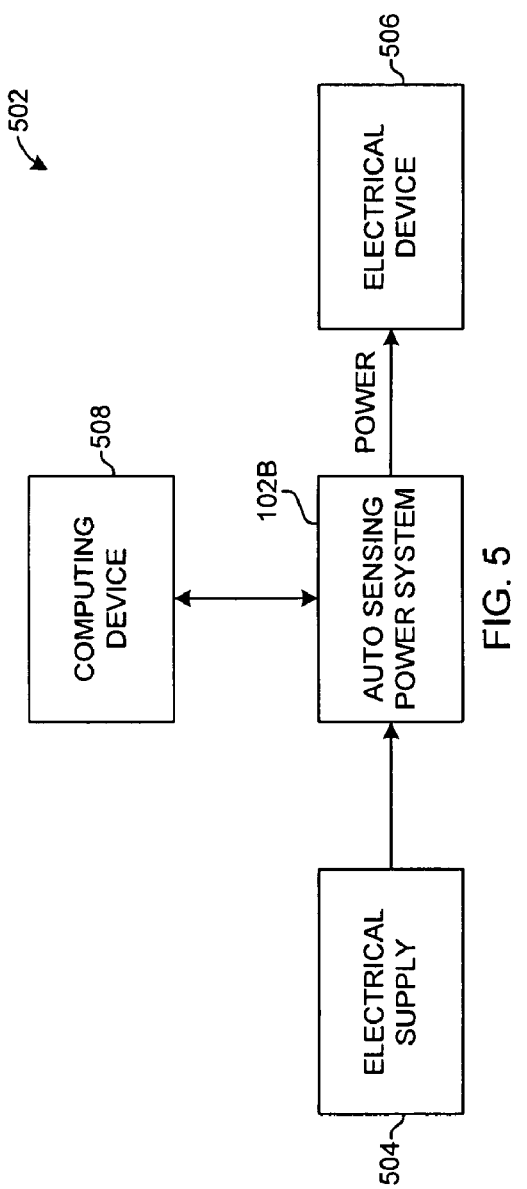
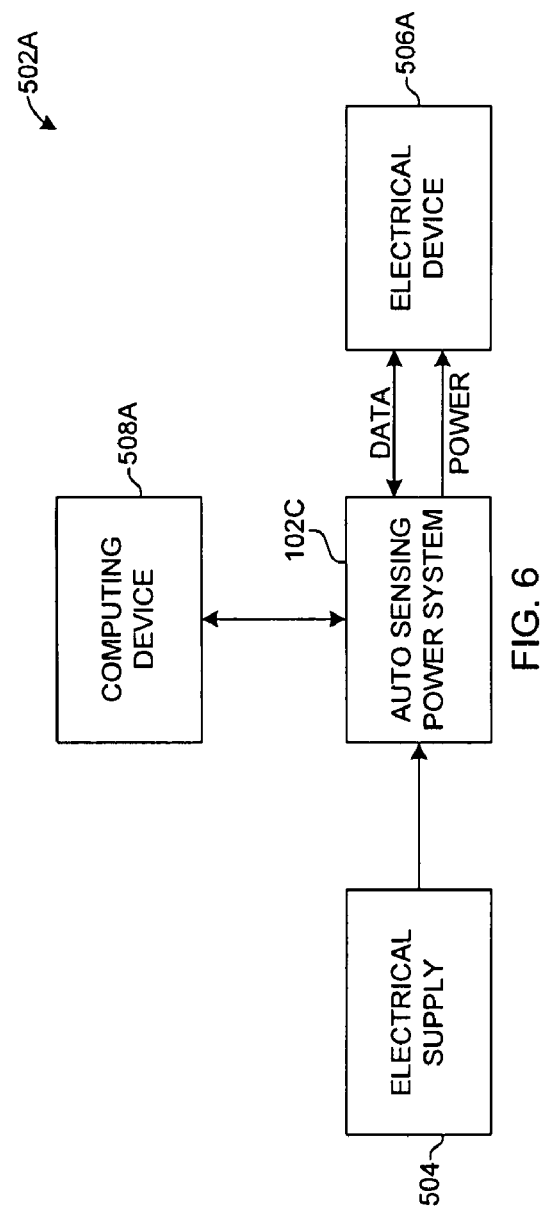

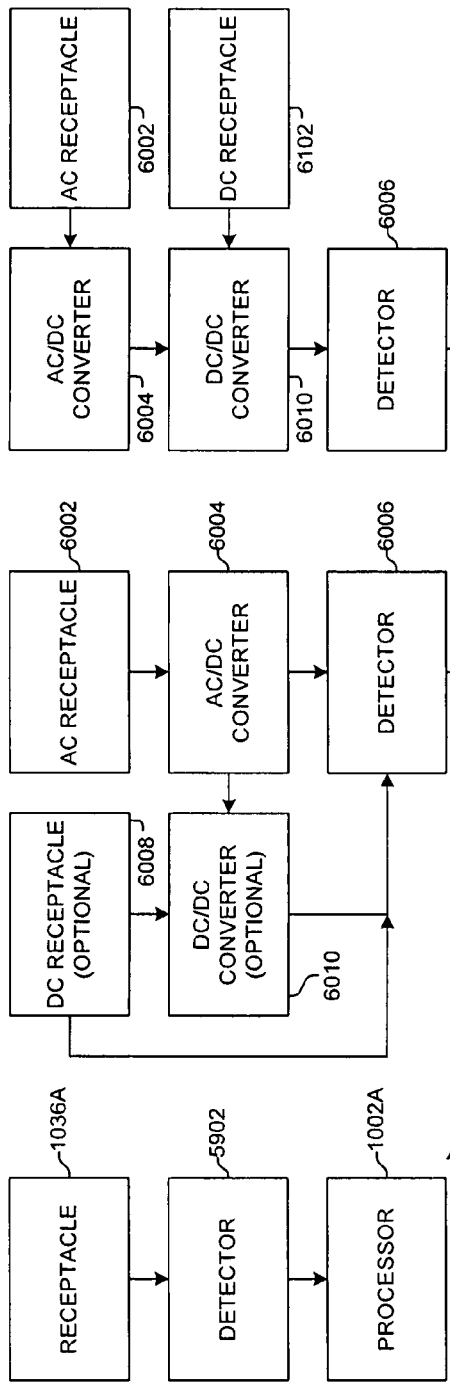
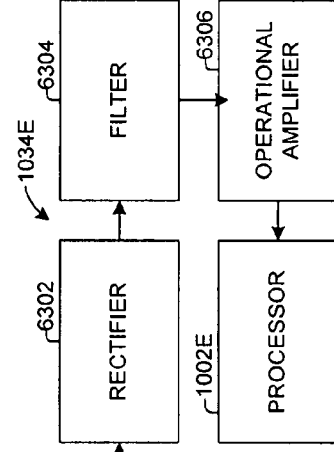
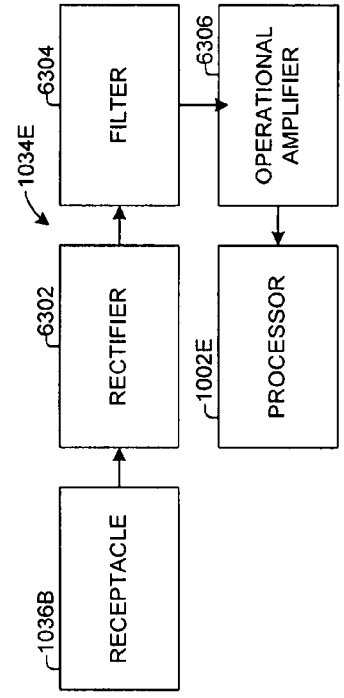
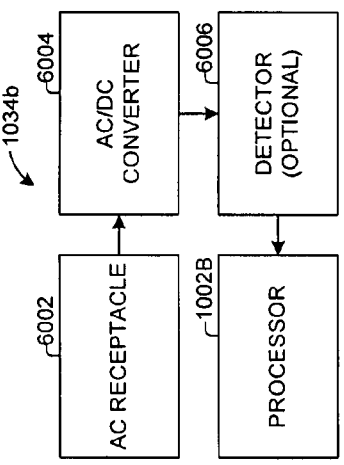

POWER SAMPLING SYSTEMS AND METHODS

RELATED APPLICATIONS

This application claims the benefit of the filing date of U.S. Provisional Application No. 60/885,007, entitled Automatic Sensing Power Systems and Methods, filed Jan. 15, 2007, which is related to co-pending co-owned U.S. patent application Ser. No. 10/983,507, entitled Automatic Sensing Power Systems and Methods, filed Nov. 5, 2004, U.S. Publication No. 2005/0102043, which takes priority to U.S. Patent App. No. 60/518,374, filed Nov. 7, 2003, entitled Automatic Sensing Power Systems and Methods, now U.S. Pat. No. 7,285,874, the entire contents of which are incorporated herein by reference, and is related to co-pending, co-owned U.S. patent application Ser. No. 11/334,143, filed Jan. 18, 2006, entitled Automatic Sensing Power Systems and Methods, U.S. Publication No. 2006/0202557, U.S. patent application Ser. No. 11/334,084, filed Jan. 18, 2006, entitled Automatic Sensing Power Systems and Methods, U.S. Publication No. 2006/0129253, U.S. patent application Ser. No. 11/334,078, filed Jan. 18, 2006, entitled Automatic Sensing Power Systems and Methods, U.S. Publication No. 2006/0129252, U.S. patent application Ser. No. 11/334,132, filed Jan. 18, 2006, entitled Automatic Sensing Power Systems and Methods, U.S. Publication No. 2006/0183510, U.S. patent application Ser. No. 11/334,082, filed Jan. 18, 2006, entitled Automatic Sensing Power Systems and Methods, U.S. Publication No. 2006/0119182, U.S. patent application Ser. No. 11/334,094, filed Jan. 18, 2006, entitled Automatic Sensing Power Systems and Methods, now U.S. Pat. No. 7,242,111, and U.S. patent application Ser. No. 11/334,098, filed Jan. 18, 2006, entitled Automatic Sensing Power Systems and Methods, U.S. Publication No. 2006/0119994, U.S. patent application Ser. No. 11/752,846, filed Jun. 23, 2007, entitled Automatic Sensing Power Systems and Methods, U.S. patent application Ser. No. 11/746,391, filed Jun. 23, 2007, entitled Automatic Sensing Power Systems and Methods, U.S. patent application Ser. No. 11/777,207, filed Jul. 12, 2007, entitled Automatic Sensing Power Systems and Methods, U.S. patent application Ser. No. 11/777,212, filed Jul. 12, 2007, entitled Automatic Sensing Power Systems and Methods, U.S. patent application Ser. No. 11/777,227, filed Jul. 12, 2007, entitled Automatic Sensing Power Systems and Methods, U.S. patent application Ser. No. 11/777,229, filed Jul. 12, 2007, entitled Automatic Sensing Power Systems and Methods, U.S. patent application Ser. No. 11/777,214, filed Jul. 12, 2007, entitled Automatic Sensing Power Systems and Methods, U.S. patent application Ser. No. 11/777,216, filed Jul. 12, 2007, entitled Automatic Sensing Power Systems and Methods, U.S. patent application Ser. No. 11/777,217, filed Jul. 12, 2007, entitled Automatic Sensing Power Systems and Methods, U.S. patent application Ser. No. 11/777,224, filed Jul. 12, 2007, entitled Automatic Sensing Power Systems and Methods, the entire contents of which are incorporated herein by reference.

FEDERALLY SPONSORED RESEARCH OR DEVELOPMENT

Not Applicable

COMPACT DISK APPENDIX

Not Applicable

BACKGROUND OF THE INVENTION

The proliferation of electronic and electrical devices is a key factor fueling an ever-increasing demand for additional alternating current (AC) outlets at home, on the road, and in the workplace. Often there are too many devices and not enough outlets. Additionally, devices including calculators, phones, and laptops use AC to direct current (DC) power converters (commonly called wall-bricks) to connect to AC power outlets. Due to their non-standard bulky form-factors, wall-bricks often take up more than one outlet, exacerbating outlet-shortage problems and driving users to seek solutions.

A popular remedy is to use multi-outlet power strips. However, these power strips provide an ineffective solution because they fail to adequately address all of the problems created by, and associated with, the increasing prevalence and use of wall-bricks.

For example, a user who owns six devices buys a power strip. While connecting the equipment, the user realizes that two devices use wall-bricks. Upon plugging the bricks into the power strip, the user discovers that only two or three of the six outlets remain open, leaving at least one outlet short. After spending $25-$200, the user expected to be able to use all the outlets, but now must buy one or more additional power strips to plug-in the remaining devices.

Low-cost power strips provide additional outlets, but do not adequately condition or stabilize incoming power, increasing the risk of equipment malfunction or outright failure. Moderate to high priced surge protectors perform well, but bulky wall-bricks often cover multiple outlets, reducing the number of devices that can be connected.

Additionally, wall-bricks often generate heat and electrical interference in addition to passing along the ambient AC conducted sags, spikes, surges, and noise generated by the power-grid and carried along AC power-lines throughout industrial, office, and residential settings. Electrical power disturbance events cause data loss and damage equipment. Wall-bricks pack and travel poorly, create cable-clutter, and are an eyesore.

Damaged equipment and downtime costs are a growing concern among users. As technology has advanced, business, commerce, home, and industrial users have become increasingly dependant on the health of the networks that supply and manipulate data and information. Additionally, the growing emphasis on network speed and the sheer volume of transactions that can take place in a fraction of a second make the prospect of downtime that much more ominous. The cost to business and industry of human or naturally caused power surges and outages has become substantially more detrimental.

It is clear from the statistical evidence that power conditioning is a vital issue and one whose importance is only going to increase. Clean, constant, noise-free power is required to ensure the proper operation, and to protect the delicate circuitry, of today's electronic and electrical devices.

Presently, systems and methods are needed that simultaneously solve outlet-shortage and transient voltage surge and noise problems. New systems and methods are needed to eliminate wall-brick issues and other identified problems.

SUMMARY OF THE INVENTION

In one embodiment, an automatic sensing system and method include a line-cord power device configured to convey power between a power source that generates alternating current (AC) power and an electrical device having a connection. The line-cord power device has an AC to direct current (DC) regulator configured to receive the AC power and to convert the AC power to DC power having a first DC voltage level. The line-cord power device also has a plurality of DC receptacles, wherein at least one DC receptacle is configured to receive the connection from the electrical device. The line-cord device includes a voltage sampling system configured to receive a plug from the electrical device and to sample the voltage required for the electrical device. The line-cord power device includes a processor configured to receive the sampled voltage from the voltage sampling system, to determine a second DC voltage level required for the electrical device, and to generate a signal to configure a DC power output to the at least one DC receptacle at the second DC voltage level. The line-cord power device also includes a DC to DC regulator configured to receive the signal from the processor and, in response thereto, to convert the DC power from the first DC voltage level to the second DC voltage level and to generate the DC power to the at least one DC receptacle at the second DC voltage level. In another aspect, the line-cord device includes one or more AC receptacles. In another aspect, the line-cord device has a detachable wall plug device with one or more DC receptacles and one or more AC receptacles. The detachable wall plug device is configured to connect to the line-cord device and/or to connect to the power source. In some aspects, the plug is the connection received by the at least one DC receptacle, and the voltage sampling system is in communication with the at least one DC receptacle. In other aspects, the plug is the connection, the plug is received by another DC receptacle, and the voltage sampling system is in communication with the other DC receptacle. In other aspects, the plug is an AC plug, and the voltage sampling system includes an AC receptacle.

BRIEF DESCRIPTION OF THE DRAWINGS

FIG. 5 is a block diagram of an automatic sensing power system in accordance with an embodiment of the present invention.

FIG. 6 is a block diagram of another automatic sensing power system in accordance with an embodiment of the present invention.

FIGS. 59-63 are block diagrams of exemplary embodiments a voltage sampling system in accordance with an embodiment of the present invention.

DETAILED DESCRIPTION

The automatic sensing power systems and methods enable alternating current (AC) to direct current (DC) power conversion, DC to DC power conversion and supply, data communication, and power management. In one embodiment, an automatic sensing power system (ASPS) component is embedded in an electronic device, such as a laptop computer, and a power delivery component resides in an ASPS, such as a power strip or a receptacle.

In one embodiment, upon connection to the ASPS, the electronic device communicates its power requirements to the ASPS via a power cord or plug. The ASPS processes the request and supplies the appropriate power. Inexpensive low voltage electrical cords and modular adapters replace the wall-bricks typically supplied with cell and desk phones, personal digital assistants (PDAs), computers, mobile phones, digital cameras, cordless drills, fax machines, and other electrical devices. The ASPS is programmable and upgradeable.

In another embodiment, the ASPS enables a user to enter a power level for an electronic device. The ASPS supplies the appropriate power.

In another embodiment, the ASPS has a voltage sampling system that samples the power levels required by an electrical device. The ASPS processes the sampled voltage and supplies the appropriate power.

The ASPS solves many problems currently encountered by home, office, and industrial consumers. The ASPS couples with single and multi-receptacle plug-in and hard-wired surge suppression devices, AC/DC power converters and transformers, and a wide-range of electronic and electrical appliances, tools, and devices.

In one embodiment, the ASPS eliminates wall-bricks by placing modular DC receptacles in a power system. The power system has AC and DC receptacles in one unit, thereby eliminating the need for multiple power strips. In some embodiments, the power system includes communication and networking interfaces and systems over which communications may be transmitted, such as through Bluetooth, Ethernet, Firewire, USB, and/or other connections. In this embodiment, the ASPS includes expanded data line protection, such as for cable, DSL, Ethernet, and modem protection. In another embodiment, the ASPS integrates gateway, network, and router capabilities. Another embodiment incorporates data communication over a broadband connection. In one example, electronic devices communicate with and through the power system via a DC connector or an AC connector.

In another embodiment, the ASPS includes a line-cord or plug device with a detachable wall plug device. Once detached, the wall plug device can be moved between rooms or offices or taken on the road to replace wall-bricks. In some examples, the detachable wall plug device includes a voltage sampling system.

Figure 1:
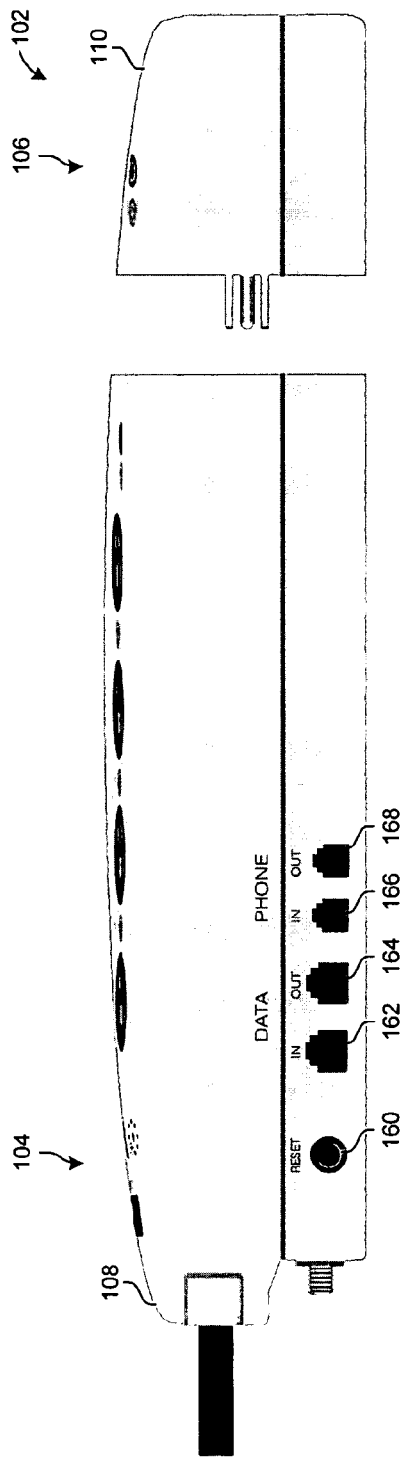
FIG. 1 is a side view of an automatic sensing power system with a detachable module in accordance with an embodiment of the present invention.
Figure 2:
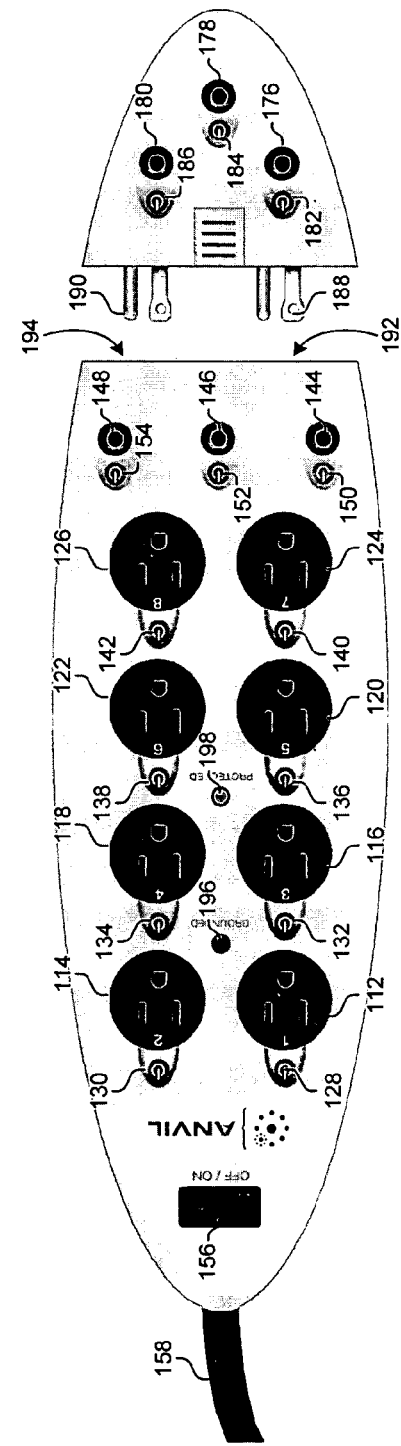
FIG. 2 is a top view of an automatic sensing power system with a detachable module in accordance with an embodiment of the present invention.
Figure 3:
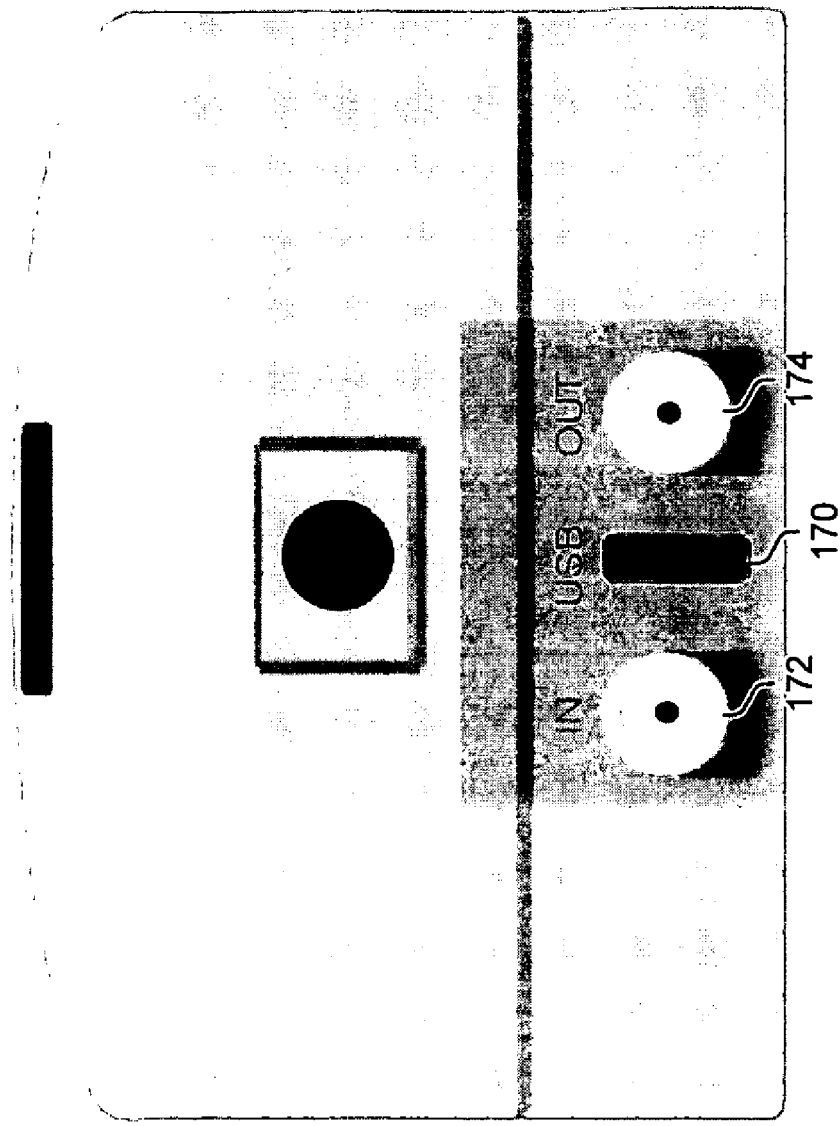
FIG. 3 is a side view of an automatic sensing power system in accordance with an embodiment of the present invention.

FIGS. 1-3 depict an exemplary embodiment of an automatic sensing power system (ASPS). In the embodiment of FIG. 1, the ASPS 102 includes a line-cord device 104 and a detachable wall plug device 106. The line-cord device 104 has a housing 108, and the detachable wall plug device 106 has a housing 110. In other embodiments, the ASPS 102 may be only a wall plug device, only a line-cord device, or a combination thereof. The ASPS 102 also may be embodied in other forms, such as a modular wall plug permanently installed or removably installed in place of a wall receptacle, an alternating current (AC) wall receptacle, or another AC or direct current (DC) device.

The ASPS 102 may be incorporated in, for example, an electronic device, such as a computer, a laptop computer, a pocket PC, a personal digital assistant (PDA), a mobile phone, a recording device, or another electrical device. As used herein, an electrical device means a device that operates using electricity, including AC and/or DC electricity. Similarly, electrical devices may use a portion of the ASPS systems identified below, including those electrical devices previously listed and other electrical devices.

Referring again to FIGS. 1-3, the line-cord device 104 includes one or more AC receptacles 112-126. Each AC receptacle 112-126 includes a power control/indicator 128-142, such as a physical or logical on/off switch used to enable or disable power flow to the associated AC receptacle 112-126. In one embodiment, the power control/indicators 128-142 are lighted switches. In another embodiment, the lighted switches are lighted when power is enabled to the AC receptacle, and not lighted when power is not enabled to the receptacle. In another embodiment, the power control/indicator 128-142 is only an indicator, such as a light, and is not used to enable or disable power to the associated receptacle 112-126. For example, a processor within the ASPS 102 may be used to enable or disable power to a receptacle, and the power control/indicator 128-142 indicates whether or not power is enabled or disabled for that receptacle. In still another embodiment, the power control/indicator 128-142 is configured to enable and disable power to the associated receptacle, and the power control/indicator includes an indicator, such as a light, to indicate whether power is enabled for the receptacle either by the physical power control or by a processor or other system or method.

The line-cord device 104 also includes one or more automatic sensing (AS) DC receptacles 144-148. The AS DC receptacles 144-148 may be used by devices for which the power requirements, including voltage and/or amperage requirements, will be automatically determined. The power requirements for the electrical device connected to the AS DC receptacles 144-148 then will be provided to the electrical device, as will be explained more completely below.

The AS DC receptacles 144-148 also have an associated power control/indicator 150-154 such as a physical or logical on/off switch used to enable or disable power flow to the associated DC receptacle 144-148. In one embodiment, the power/control indicators 150-154 are lighted switches. In another embodiment, the lighted switches are lighted when power is enabled to the DC receptacle, and not lighted when power is not enabled to the receptacle. In another embodiment, the power control/indicator 150-154 is only an indicator, such as a light, and is not used to enable or disable power to the associated receptacle 144-148. For example, a processor within the ASPS 102 may be used to enable or disable power to a receptacle, and the power control/indicator 150-154 depicts whether or not power is enabled or disabled for that receptacle. In still another embodiment, the power control/indicator 150-154 is configured to enable and disable power to the associated receptacle, and the power control/indicator includes an indicator, such as a light, to indicate whether power is enabled for the receptacle either by the physical power control or by a processor or another system or method.

In the embodiment of FIGS. 1-3, the line-cord device 104 also has a main power control/indicator 156. The main power control/indicator 156 is used to enable or disable power to the line-cord device 104. In one embodiment, the main power control/indicator 156 includes a fuse device configured to disable power to the line-cord device 104 if power to the line-cord device exceeds selected voltage and/or selected amperage requirements. In another embodiment, the main power/control indicator 156 includes a surge protection device and/or other voltage and/or amperage protection devices.

The ASPS 102 also includes an electrical connector 158 configured to transfer power from an electrical supply to the ASPS 102. In one embodiment, the electrical connector 158 also is configured to communicate data to and from the ASPS 102.

In one embodiment, the ASPS 102 includes a reset control 160. The reset control 160 is used to reset the ASPS 102, in some instances, if a fuse or other device in the ASPS disables power to the ASPS.

In one embodiment, the ASPS 102 includes a data in port 162 and/or a data out port 164. The data ports 162-164 are used to communicate data to and from the ASPS 102, such as to a computing device, another data device, or another electrical device. The ASPS 102 may use one or more communication protocols to transfer data to and from the ASPS.

In one embodiment, the ASPS 102 includes a phone in port 166 and/or a phone out port 168. The phone ports 166-168 are used to communicate voice and/or data communications over a telephone or telephone-related communication device.

In another embodiment, as best depicted in FIG. 3, the ASPS 102 includes a data communication port 170. The data communication port 170 is used to communicate process data, control data, control instructions, update data, electrical device data, and other data with a processing device, a computing device, or another device. In one embodiment, the data communication port 170 is a universal serial bus (USB) port.

In another embodiment, other data communication connectors may be used. As best depicted in FIGS. 1 and 3, other data communication connections 172 and 174 are used to communicate data to and from the ASPS 102 in various formats and using various protocols. In one example, the data connections 172-174 include one or more cable ports, such as an in and out cable connection. Other types of data connections, networking connections, device connections, and/or device controllers may be used.

Referring again to FIGS. 1 and 2, the detachable wall plug device 106 includes AS DC receptacles 176-180. The AS DC receptacles 176-180 have an associated power control/indicator 182-186. The AS DC receptacles 176-180 and the power control/indicators 182-186 are the same as those described above.

The detachable wall plug device 106 also includes one or more electrical connectors 188-190, such as module plugs, used to transfer power to the wall plug device. The electrical connectors 188-190 connect to receiving connectors 192-194 in the line-cord device 104. AC and/or DC power is transmitted from the line-cord device 104 to the wall plug device 106 via the electrical connectors 188-190 and the receiving connectors 192-194. In some embodiments, communications, including control instructions and/or data, are transmitted from the line-cord device 104 to the wall plug device 106 via the electrical connectors 188-190 and the receiving connectors 192-194. It will be appreciated that one or more electrical connectors may be used. Additionally, while a standard 3-prong wall plug is depicted in FIGS. 1 and 2, other electrical connectors may be used.

In one embodiment, the wall plug device 106 includes a fuse device. In another embodiment, the wall plug device 106 includes a surge protection device and/or other voltage and/or amperage protection devices. In another embodiment, the wall plug device 106 includes a reset control.

In one embodiment, the ASPS 102 includes a grounded indicator 196 and/or a protected indicator 198. The grounded indicator 196 indicates that the ASPS 102 is properly grounded to an electrical supply, such as to an AC receptacle. Therefore, the ASPS 102 should provide properly grounded electrical connections for electrical devices connected to the ASPS.

The ASPS 102 also may include a protected indicator 196 in other embodiments. The protected indicator 198 indicates that surge protection and/or noise filtration systems and/or circuits are functional. In other embodiments, the wall plug device 106 includes a grounded indicator and/or a protected indicator.

The ASPS 102 also includes one or more voltage sampling receptacles. In one example, only an AC voltage sampling receptacle 200 is present. In another example, only a DC voltage sampling receptacle 202 is present. In another example, both the AC and DC voltage sampling receptacles 200-202 are present. More than one AC or DC voltage sampling receptacle could be present. Each of the voltage sampling receptacles optionally may have an associated power/control indicator (not shown).

Alternately, an AC receptacle 126 can be configured as an AC voltage sampling receptacle, and the AC voltage sampling receptacle 200 is optional. Alternately, an AS DC receptacle 148 can be configured as the DC voltage sampling receptacle, and the DC voltage sampling receptacle 202 is not present. As another example, one or more of the AC receptacles 114-126 can be configured as voltage sampling receptacles. Additionally, one or more of the AS DC receptacles 144-148 can be configured as DC voltage sampling receptacles. Other examples exist.

The detachable wall plug device 106 also or alternately can be configured with one or more voltage sampling receptacles. In one example, only an AC voltage sampling receptacle 204 is present. In another example, only a DC voltage sampling receptacle 206 is present. In another example, both the AC and DC voltage sampling receptacles 204-206 are present. More than one AC or DC voltage sampling receptacle could be present. One or more of the voltage sampling receptacles 204-206 are optional.

In another embodiment, an AS DC receptacle 176 can be configured as the DC voltage sampling receptacle, and the DC voltage sampling receptacle 206 is not present. Additionally, one or more of the AS DC receptacles 176-180 can be configured as DC voltage sampling receptacles. These embodiments are optional. Other examples exist.

Figure 4:
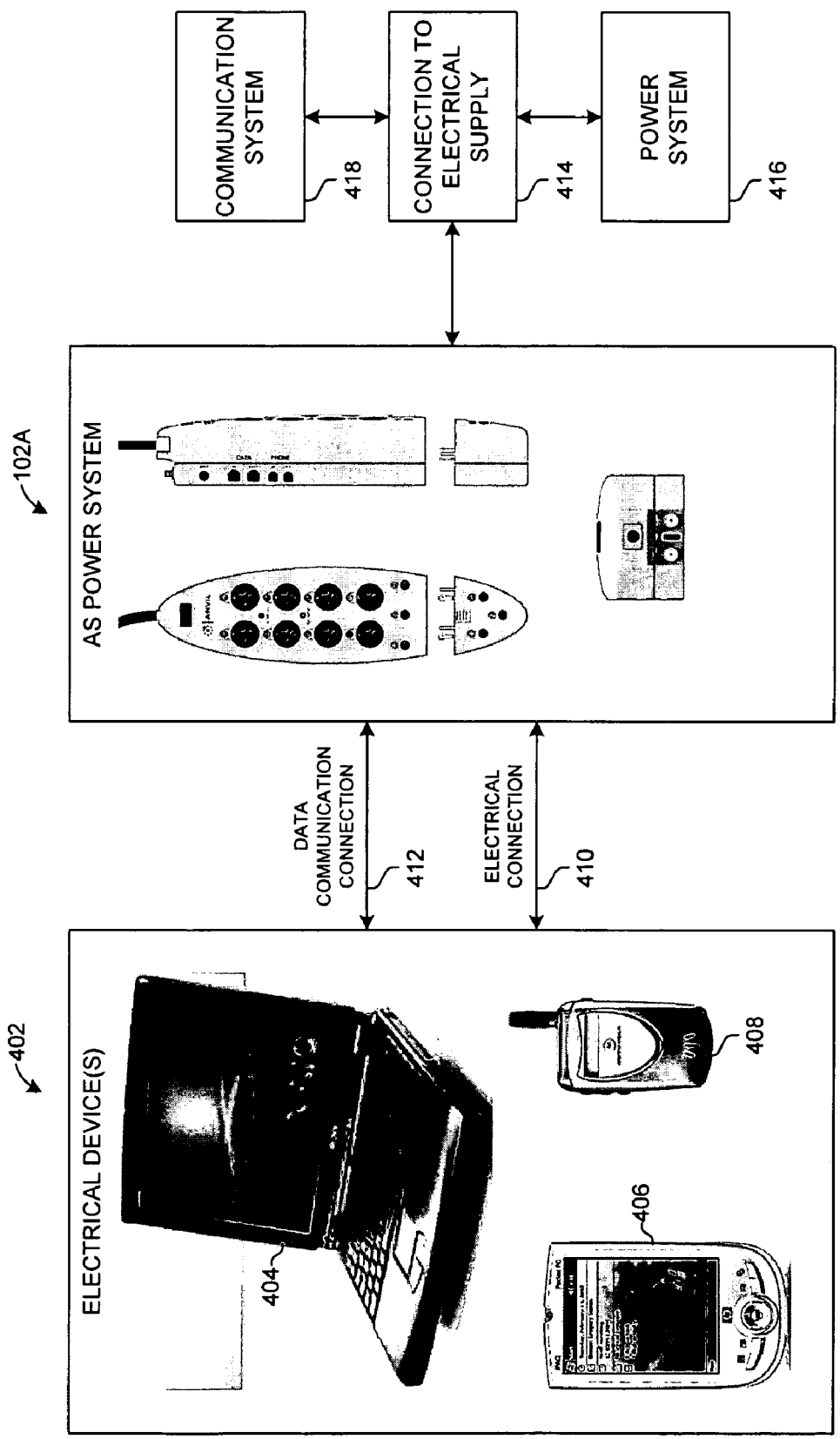
FIG. 4 is a diagram of an automatic sensing power system communicating with one or more electrical devices and an electrical supply in accordance with an embodiment of the present invention.

FIG. 4 depicts an exemplary embodiment in which an ASPS 102A communicates with one or more electrical devices 402, including a computer 404, a PDA 406, a mobile phone 408, and/or another electrical device, via an electrical connection 410 and/or a data communication connection 412. The electrical connection 410 and/or the data communication connection 412 are depicted as logical connections. The data communication connection 412 is optional for some embodiments. In one embodiment, the electrical connection 410 and/or the data communication connection 412 both may use a single physical connection over which both power and data communications are transmitted. In another embodiment, the electrical connection 410 and/or the data communication connection 412 may use one or more physical connections.

The ASPS 102A also is connected by a connection 414 to a power system 416 and/or a communication system 418. In one example, the power system 416 is a power source for AC power. In one embodiment of FIG. 4, the ASPS 102A communicates both power and data over the same connection 414 to the power system 416. In this example, the power system 416 includes one or more of a private power system and/or a public power system. In this example, data communications are transferred to other electrical devices, such as to communications devices or computers, via the power system 416. In another example of this embodiment, data communications are transmitted to other electrical devices, such as communication devices and/or computers, via the communication system 418.

In one example, the electrical connection 410 is an AC connection. In another example, the electrical connection 410 is a DC connection. In another embodiment, the electrical connection 410 is a two-wire DC cord with a modular connector on one end and a barrel connector on the other end. In another embodiment, the electrical connection 410 is a two-wire DC cord with a modular connector on one end and configured to accept one or more adaptive connectors on the other end.

In another example, the connection 414 is connected to an electrical supply, such as an AC receptacle in a home, office, or business, to a private or public power system. In one example, the connection 414 to the electrical supply connects to a public electrical power grid. Private circuits generally connect to the electrical grid via a service entrance panel or subpanel device that may or may not require the AS communication interfaces described herein.

In another embodiment, an automatic sensing (AS) processing system, as described more completely below, resides on the ASPS 102A. In another embodiment, an AS processing system resides on the electrical device 402. In another embodiment, an AS processing system does not reside on the electrical device 402.

In still another embodiment, the electrical device 402 includes one or more of an Ethernet device, a cable device, a digital subscriber line (DSL) device, a satellite device, a dial-up device, an internet protocol (IP) device, or another device configured to communicate data, including voice communications converted to data and transferred as data via the connection 414. In still another embodiment, the data communications are transferred via the power system 416 and/or the communication system 418 to another electrical device, such an Ethernet device, a cable device, a DSL device, a satellite device, a dial-up device, an IP device, or another device configured to transmit or receive communications.

FIG. 5 depicts an exemplary embodiment of an automatic power system (APS). The APS 502 of FIG. 5 includes an automatic sensing power system (ASPS) 102B, an electrical supply 504, an electrical device 506, and a computing device 508. The ASPS 102B is used to automatically determine the power requirements of the electrical device 506, including voltage and/or amperage requirements, and supply the appropriate power to the electrical device.

In this embodiment, the electrical device 506 does not have a power converter. Instead, the electrical device 506 includes a simple electrical connector between the ASPS 102B and the electrical device. The electrical connector is not a bulky power converter, such as a wall brick. The connector may be a standard power conducting wire, such as those used for a laptop computer, a PDA, a mobile telephone, or another electrical device (without the power converter).

The ASPS 102B receives power from the electrical supply 504. Upon determining the power requirements, the ASPS 102B supplies the correct power to the electrical device 506.

The ASPS 102B is configured to sample power from the electrical device 506 to determine the power requirements for the electrical device. In one example, the ASPS 102B is configured to sample voltage from the electrical device 506 to determine the power requirements of the electrical device. In another example, the electrical device plugs into the ASPS 102B. The ASPS 102B then determines the power requirements for the electrical device by sampling the voltage and/or current used by the electrical device. In another example, the electrical device plugs into the ASPS 102B, and the ASPS determines the power drawn by the electrical device.

In one embodiment, the ASPS 102B includes a receptacle to which the electrical device 506 plugs or otherwise connects. In another example, the AC plug of the transformer (i.e. wall brick) for the electrical device 506 is plugged into an AC power sampling receptacle of the ASPS 102B, and the ASPS 102B determines the power used to drive the transformer. In another example, the AC plug of the transformer (i.e. wall brick) for the electrical device 506 is plugged into an AC power sampling receptacle of the ASPS 102B, and the ASPS 102B determines the power output from the transformer. In another example, the DC end of the transformer (i.e. wall brick) for the electrical device 506 is plugged into a DC power sampling receptacle of the ASPS 102B, and the ASPS determines the power output from the transformer. In another example, a power connection is connected between the electrical device 506 and a connector for the ASPS 102B, and the ASPS determines the power that will be drawn by the electrical device.

In another example, the ASPS 102B comprises a voltage sampling system that determines the voltage drawn by the transformer, output from the transformer, or drawn by the electrical device. In another example, the ASPS 102B comprises a voltage sampling system that determines the voltage generated by the transformer or electrical device.

The ASPS 102B communicates with the computing device 508. The computing device 508 may be a computing device, data device, or another device configured to communicate with the ASPS 102B.

In one embodiment, the computing device 508 receives status data from the ASPS 102B, including faults, breakdowns in processes, if any, surge identifications, identification of sampled voltage, and other status information. In another embodiment, the ASPS 102B receives data from the computing device 508. In one example, the ASPS 102B receives control data, such as configuration data, from the computing device 508.

In one example, a user uses the computing device 508 to load the power requirements of the electrical device 506 to the ASPS 102B. The ASPS 102B stores the power requirements and uses the power requirements to provide the appropriate power levels, including voltage and/or amperage levels, to the electrical device 506.

In another example, the ASPS 102B receives data from the computing device 508. The computing device 508 is configured to transmit power requirements for the electrical device 506 to the ASPS 102B. In this example, the ASPS 102B is configured to assign a particular receptacle, such as a particular DC receptacle or a particular AC receptacle, to the electrical device 506. In this example, a user may plug the electrical device 506 into a particular receptacle in the ASPS 102B, and the power requirements will be transmitted to the electrical device 506.

In one example, the computing device 508 is configured to enable the particular receptacle for the electrical device 506. In this example, the computing device 508 also is configured to disable one or more other receptacles, including one or more other AC receptacles and/or DC receptacles. In this example, disabling one or more receptacles provides a safety feature so that the electrical device 506 is not inadvertently plugged into a receptacle with the wrong power requirements, which may result in damaging the electrical device. In this example, an indicator light may indicate whether the receptacle is enabled or disabled to receive power and/or to transmit power to an electrical device.

The ASPS 102B may receive configuration data and/or control data to configure one or more receptacles. For example, the ASPS 102B may configure a first receptacle for a mobile telephone and a second receptacle for a computer. In this example, the first receptacle would provide the correct power requirements to the mobile telephone, and the second receptacle would provide the correct power requirements to the computer.

In the above example, the electrical device 506 does not require an AS processing system, as described more completely below. This embodiment provides flexibility to the user for devices not having the AS processing system.

It will be appreciated that the configuration data and/or control data may be provided to the ASPS 102B in a variety of ways. In one embodiment, the ASPS 102B receives configuration data identifying a model of a particular electrical device 506, such as a device name and/or a model name or number or another identifier. In this example, data identifying particular electrical devices and their power requirements reside on the ASPS 102B. In this example, the ASPS 102B performs a search, look up, or other process to identify the particular electronic device model and its power requirements from the data stored on the ASPS. The ASPS 102B then can provide the correct power to the electrical device 506.

In another embodiment, the ASPS 102B is configured to receive the particular power requirements, including voltage and/or amperage requirements, directly from the computing device 508. In this example, the ASPS 102B is not required to perform a search, look up, or other processing operation to identify a particular electrical device's power requirements. In this example, after receiving the configuration information, the ASPS 102B configures a particular receptacle for the power requirements.

In another example, the ASPS 102B includes a power sampling connection, such as a power sampling receptacle, a power connector, or other connection. The electrical device connects to the ASPS 102B. The ASPS 102B samples the power required by the electrical device 508, including the voltage requirements and/or current requirements. The ASPS 102B transmits an identification of the sampled power requirements to the computing device 506. The computing device 508 assigns a particular receptacle, such as a particular DC receptacle, to the electrical device 506 for that sampled power. The ASPS 102B assigns the sampled power to the assigned receptacle. In this example, a user may plug the electrical device 506 into a particular receptacle in the ASPS 102B, and the power requirements will be generated to the particular receptacle for the electrical device 506.

In one example, the computing device 508 is configured to enable the particular DC receptacle to which the sampled power requirements will be generated for the electrical device 506. In this example, the computing device 508 also is configured to disable one or more other receptacles. The computing device 508 may select or assign one or more receptacles for one or more sampled power requirements. In this example, an indicator light may indicate whether the receptacle is enabled or disabled to receive power and/or to transmit power to an electrical device.

In another example, the ASPS 102B is configured to automatically sample the power requirements for an electrical device 508. In one example, the ASPS 102B has a detector to detect when an electrical device 508 is connected to the ASPS.

In another example, the ASPS 102B is configured to automatically assign a receptacle to receive the corresponding power requirements for the sampled voltage. The ASPS 102B optionally may transmit the identification of the power requirements and the receptacle assignment to the computing device 506.

The ASPS 102B may have one or more power sampling connections, such as one or more power sampling receptacles or power connectors, including one or more AC and/or DC receptacles and/or other connections. When an electrical device 508 is plugged into or otherwise connected to the power sampling receptacle, the ASPS 102B samples the power requirements (including voltage and/or current) of the electrical device.

FIG. 6 depicts another exemplary embodiment of an APS 502A. In this embodiment, the electrical device 506A includes an AS processing system. In the embodiment of FIG. 6, power is transmitted from the ASPS 102C to the electrical device 506A. Additionally, data is communicated between the ASPS 102C and the electrical device 506A.

It will be appreciated that the power and the data may be transmitted over the same physical connection, one physical connection for the power and another physical connection for the data, or multiple physical connections for the power and/or data.

In one embodiment of FIG. 6, the ASPS 102C identifies that an electrical device 506A has been plugged into one of the receptacles. This identification may be made through hardware, software, firmware, or other methods. In one example, the electrical device 506A makes a circuit when the electrical device is plugged into the receptacle. In another example, the electrical device 506A causes the receptacle to transmit a signal when the electrical device is plugged into the receptacle.

In one example, the electrical device 506A generates a power request upon being connected to the receptacle. In one example, the request includes an identification of the particular electrical device. In another example, the request includes specific power requirements for the electrical device 506A.

The ASPS 102C receives the request and determines the power requirements for the electrical device 506A. In one example, the ASPS 102C identifies the particular electrical device 506A and searches its data, such as through a look up, a search, or other determination, to identify the power requirements for the electrical device 506A. The ASPS 102C provides the appropriate power, including the appropriate voltage and amperage, to the electrical device 506A.

In another example, the ASPS 102C receives a request for power from the electrical device 506A. In this example, the request includes the specific power requirements. In this example, the ASPS 102C is not required to perform a look up, search, or other determination to identify the power requirements for the electrical device 506A. The ASPS 102C provides the power to the electrical device 506A according to the power requirements.

In another example, the ASPS 102C has one or more power sampling connections, such as one or more power sampling receptacles or power connectors, including one or more AC and/or DC receptacles and/or other connections. An electrical device 506A is plugged into or otherwise connected to the power sampling receptacle of the ASPS 102C. The ASPS 102C samples the power requirements from the electrical device 506A. The ASPS 102C assigns an AS DC receptacle to which the required power will be generated and generates the required power to the assigned AS DC receptacle.

Figure 7:
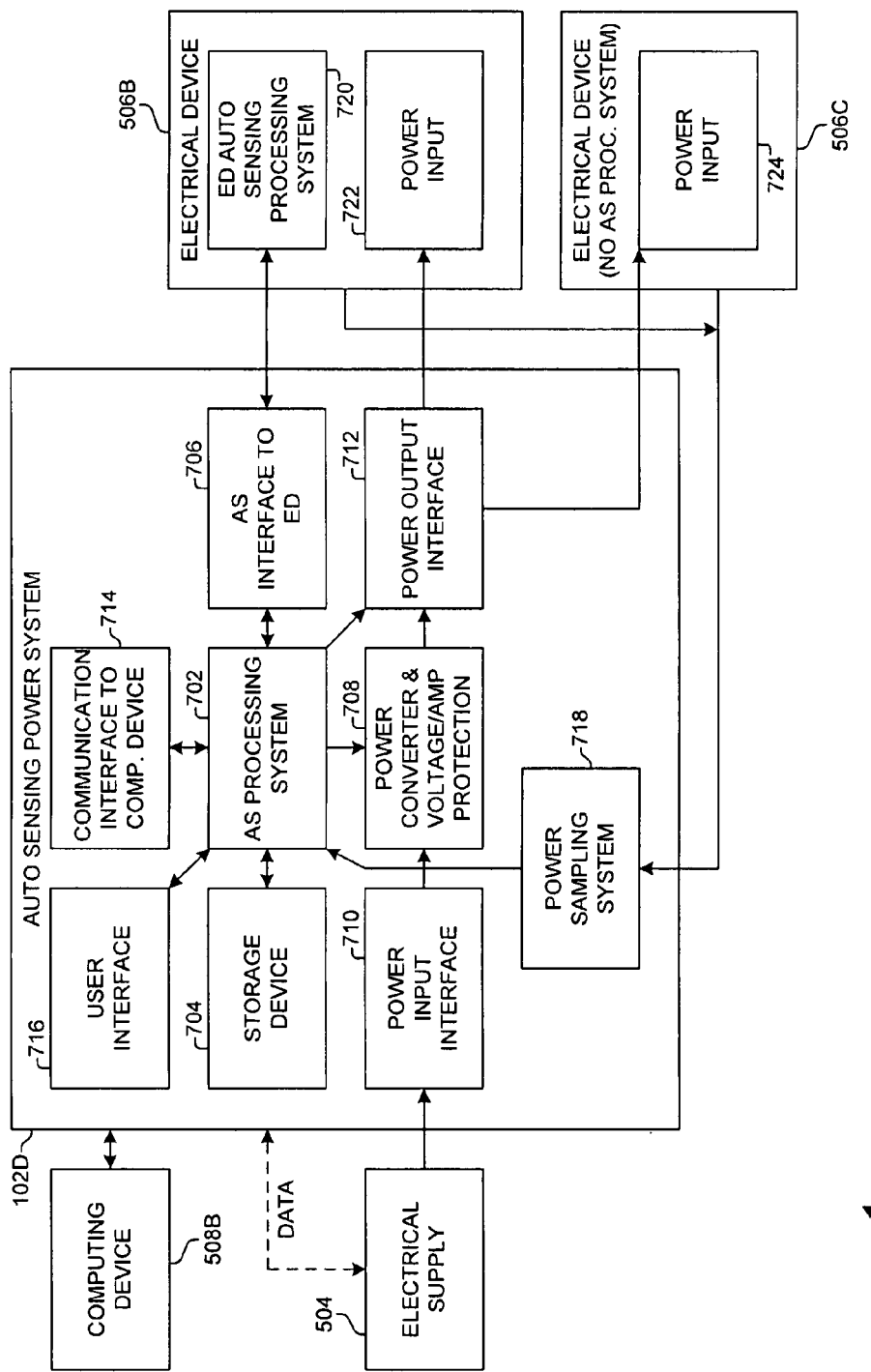
FIG. 7 is a block diagram of another automatic sensing power system in accordance with an embodiment of the present invention.

FIG. 7 depicts an exemplary embodiment of one or more processes occurring in the ASPS 102D, the electrical device 506B, and the electrical device 506C. The ASPS 102D communicates with a computing device 508B, and the ASPS 102D receives power from the electrical supply 504.

The ASPS 102D has an AS processing system 702. The AS processing system 702 controls the operations of the ASPS 102D, including data storage, power conversion, enabling and/or disabling receptacles, generating the correct power to each receptacle, communicating with electrical devices 506B and 506C, and communicating with the computing device 508B.

In one embodiment, the AS processing system 702 stores data in, and retrieves data from, the storage device 704. The storage device 704 may include, for example, RAM, ROM, EPROM, EEPROM, Flash storage, or another storage device.

The AS processing system 702 also processes communications received from the electrical device 506B via the AS communication interface 706. The AS processing system 702 determines what action to take based upon the communication from the electrical device 506B. The AS processing system 702 also may transmit data and/or other communications to the electrical device 506B via the AS communication interface 706B.

In one embodiment, the AS processing system 702 controls conversion of power at the power converter 708. In one example, the AS processing system 702 transmits control signals to the power converter 708 to control the power conversion and subsequent output of the converted power to one or more receptacles. In another example, the AS processing system 702 is configured to control at which receptacle the power is output from the power converter 708. For example, the AS processing system 702 may transmit a control signal to the power converter 708 requiring the power converter to output power to a selected receptacle. In another example, the power converter 708 is hard wired to one or more receptacles, and the AS processing system 702 controls hard wired switches from the power converter to one or more receptacles. In another example, the power converter 708 may otherwise output power to particular receptacles in response to control signals from the AS processing system 702.

The AS processing system 702 also controls power sampling, processes signals indicative of sampled power, controls and/or manages assignments of receptacles for power sampling, and controls and/or manages generating power to one or more receptacles for the sampled power. The ASPS 102D has one or more power sampling connections from which power is sampled, such as one or more power sampling receptacles or power connectors, including one or more AC and/or DC receptacles and/or other connections. Signals from these power sampling connections are transmitted to the AS processing system 702 for processing. Based on processing one or more of the power sampling signals, the AS processing system 702 determines the power requirements controls generating power for the power requirements to a selected receptacle.

In one example, the electrical device 506C is connected to a power sampling connection of the ASPS 102D. The ASPS 102D samples the power requirements from the electrical device 506C. The processing system 702 processes the sampled power and determines the power requirements for the electrical device. The processing system 702 selects a DC receptacle to which the required power will be generated and generates one or more control signals to the power converter 708 requiring the power converter to generate power to the selected receptacle. In one example, the processing system 702 receives signals indicative of the sampled voltage, processes the signals, and determines the power requirements for the electrical device 506C.

The power converter 708 receives power from the power input interface 710. The power input interface 710 receives power from the electrical supply 504.

In one embodiment, the power converter 708 includes voltage and/or amperage protection and/or surge protectors. In another embodiment, voltage and/or amperage protection and/or surge protectors are configured between the power output interface 712 and the power converter 708 and/or the AS processing system 702.

The AS processing system 702 also controls the receptacles in the power output interface 712. The power output interface 712 includes one or more AC receptacles and/or one or more DC receptacles.

Additionally, the power output interface 712 may include one or more power control/indicators, such as those identified in FIGS. 1-3. The power control/indicators may be controlled by the AS processing system 702 or otherwise. Alternately, the power control/indicators may be hard wired to one or more receptacles. In one example, the power control/indicators may indicate that power is enabled or disabled for a particular receptacle based upon power being transferred to the control/indicator. Other examples exist. In another example, the power control/indicator is a physical switch used to disable or enable power to a particular output, regardless of any control processing by the AS processing system 702.

The AS processing system 702 also may transmit data to, and receive data from, a computing device 508B or another device via the communication interface 714. The communication interface 714 may be used to transmit and/or receive control data, configuration data, status data, or other data. In one example, the AS processing system 702 transmits and/or receives configuration data from the computing device 508B via the communication interface 714. In another example, the AS processing system 702 transmits and/or receives configuration data from the computing device 508B via the communication interface 714 and stores the configuration data in the storage device 704. The configuration data may be, for example, search data or other data used by the AS processing system 702 to identify power requirements for one or more electrical devices.

The AS processing system 702 also may transmit and/or receive other data, such as communication data, application data, video, voice communications, and other communications via the communication interface 714 to the computing device 508B or through the electrical supply 504. In one example, the electrical supply 504 includes a power supply grid. In this example, the AS processing system 702 transmits data via the communication interface 714 to the electrical supply 504 for further communication to another electrical device. In another example of this embodiment, the AS processing system 702 transmits data via the communication interface 714 to the computing device 508B.

In any of the above examples, the data transmitted by the AS processing system 702 via the communication interface 714 may be configuration data, status data, or other data used for the operation of the electrical device 506B or 506C or other information regarding the electrical devices. The data may be used by a user of the computing device 508B or another user.

The AS processing system 702 also may transmit data to, and receive data from, a computing device 508B or another device via a user interface 716. The user interface 716 generates data for display by the computing device 508B or another device. The user interface 716 may be used to transmit and/or receive control data, configuration data, status data, or other data. In one example, the user interface 716 resides on the ASPS 102D and generates data for display by the electrical device 506B. In another example, the user interface 716 resides on the electrical device 506B, and the ASPS 102D communicates with the user interface so the user interface can display data and enter control processes and operations, such as selecting a particular voltage for a particular receptacle.

In some embodiments, the communication interface 706 and the communication interface 714 are a single interface. In other examples, the communication interface 706, the communication interface 714, and/or the user interface 716 are a single interface.

A power sampling system 718 receives a power connection from the electrical device 506B and/or 506C and/or other devices and samples the power requirements of the electrical devices. In one embodiment, the power sampling system 718 includes a receptacle to which the electrical device 506B and/or 506C plugs or otherwise connects. In one example of this embodiment, the power sampling system 718 determines the power drawn by or generated to the electrical device 506B and/or 506C.

In another embodiment, the AC plug portion of a transformer (i.e. wall brick) for the electrical device 506C is plugged into an AC power sampling receptacle of the power sampling system 718, and the power sampling system determines the power required for the electrical device. In another example, the power sampling system 718 determines the power used to drive the transformer. In another example, the power sampling system 718 determines the power output from the transformer. In another example, the DC end of the transformer (i.e. wall brick) for the electrical device 506C is plugged into a DC power sampling receptacle of the power sampling system 718, and the power sampling system determines the power output from the transformer. In another example, a power connection is connected between the electrical device 506B and a connector for the power sampling system 718, and the power sampling system determines the power required by the electrical device.

In another example, the power sampling system 718 comprises a voltage sampling system that determines the voltage drawn by the transformer or electrical device. In another example, the power sampling system 718 comprises a voltage sampling system that determines the voltage generated by the transformer or electrical device.

In another example, the power sampling system 718 includes one or more AC receptacles and/or one or more DC receptacles. The receptacles may be separate dedicated power sampling receptacles. Alternately, the receptacles may be one or more existing receptacles configured to sample power requirements and supply the power requirements. In one embodiment, one or more receptacles can be enabled or disabled.

The power sampling system 718 can be configured to automatically detect when a device is connected to one of the power sampling receptacles and automatically sample the power sampling receptacles. Alternately, the power sampling system 718 can be configured for manual initiation of the power sampling at one or more power sampling receptacles.

In another embodiment, the power sampling system 718 can automatically assign a sampled power or an AS DC determined power to a particular receptacle, such as a next available receptacle or other default receptacle. Alternately, a user can assign a sampled power to a receptacle. In some instances, the power sampling system 718 receives configuration data identifying a name or other identifier for a power sampled device. The name or other identifier may be assigned to or associated with a receptacle.

The power sampling system 718 transmits sampling data or one or more signals to the processor 702. The sampling data or signals indicate the sampled power requirements.

In the embodiment of FIG. 7, the electrical device 506B has an electrical device automatic sensing (EDAS) processing system 720 and a power input interface 722. The EDAS processing system 720 communicates with the ASPS 102D via the AS communication interface 706. In one embodiment, the EDAS processing system 720 includes a processor. In another embodiment, the EDAS processing system 720 includes a storage device, such as an EPROM, EEPROM, Flash storage, or other storage. In another embodiment, the EDAS processing system 720 is configured with hardware, firmware, and/or software configured to communicate with the ASPS 102D and/or otherwise configure, control, transmit, receive, and/or process communications related to power requirements, statistics, and/or operational requirements of the electrical device 506B.

In one example, the EDAS processing system 720 generates a request for power to the ASPS 102D via the AS communication interface 706. In another embodiment, the EDAS processing system 720 receives a communication requesting whether or not the electrical device 506B is to receive power.

In another embodiment, the EDAS processing system 720 processes instructions for transmitting power requirements to the ASPS 102D or for receiving information regarding power requirements of the electrical device 506B and the provision of power to the electrical device from the ASPS 102D.

The power input interface 722 receives power from the ASPS 102D via the power output interface 712. The power input interface 722 may be hardware, such as a plug and/or cord, and/or another device.

In the embodiment of FIG. 7, the electrical device 506C does not include an EDAS processing system. In this embodiment, data is not communicated between the electrical device 506C and the ASPS 102D. In this embodiment, the electrical device 506C receives power at the power input interface 724 from the ASPS 102D via the power output interface 712.

In one embodiment, the computing device 508B includes a configuration system used to configure the ASPS 102D. In one embodiment, the computing device 508B includes a user interface (UI) used to configure power requirements for particular electrical devices, power requirements or other configurations for particular AC and/or DC receptacles, operational parameters for the ASPS 102D, and/or other processes of the ASPS 102D.

In one example, the UI enables a user to configure particular receptacles on the ASPS 102D for particular electrical devices. The UI presents a simple screen or other output to the user, such as with radio buttons, check boxes, or drop-down boxes to enable or to disable particular receptacles or make selections. Text boxes enable a user to enter data, such as voltage and/or current values and names of electrical devices, other identifiers, and other text. For example, a user may use the UI to program a DC receptacle for a mobile telephone by setting the voltage and/or amperage requirements of the mobile telephone for a selected receptacle. The user may use the GUI to program a second DC receptacle for a PDA by setting the voltage and/or amperage requirements of the PDA for a selected receptacle. In a particular embodiment of this example, the user may select an identification of the electrical device from a menu or other interface. The electrical device then may be assigned to a particular receptacle. Alternately, the user may enter the name or other identifier of the electrical device.

In another example, the particular receptacle with the associated electrical device may be enabled or disabled using a radio button, check box, or other entry on the UI. In the above example, after the user configures the first receptacle for the mobile telephone, an enable and disable button is generated for the first receptacle. After the user configures the second receptacle for the PDA, an enable and disable button is generated for the second receptacle. Once the configuration data is transmitted to the ASPS 102D, the communication connection between the ASPS 102D and the computing device 508B may be removed.

In one example, once the configuration data is downloaded to the ASPS 102D, the ASPS retains the configuration data. In another example, the ASPS 102D may be reset by the computing device 508B. In another example, the ASPS 102D configuration may be reset by a reset button, such as the reset button depicted in FIG. 1. In another example, the configuration of the ASPS 102D may be reset upon removing power from the device. Other examples exist.

In another example, one or more AC receptacles (ports) and one or more DC receptacles (ports) are identified on the UI. Each receptacle has an associated radio button, check box, or other entry or selection for enabling or disabling the receptacle. The UI also includes a status window, box, or frame for identifying the status or operations.

The UI may include one or more selection or operation buttons for initiating an action or operation, including a Sample Port button for initiating the power sampling operation for one or more power sampling receptacles, a separate Sample AC Port for sampling one or more AC receptacles, a separate Sample DC Port for sampling one or more DC receptacles, a Read asDC Voltage (Volt) button for initiating communication between the ASPS and the electrical device to determine the power requirements for the electrical device, an Assign Port button to assign a sampled power or an AS DC determined voltage to a particular port, and a Force Port button to force a selected port on or off.

The UI also may include radio buttons, check boxes, or other selection mechanisms to select a receptacle (port) for a power assignment from a power sampled receptacle or an AS DC determined voltage. Radio buttons, check boxes, or other selection mechanisms are used to enable and disable an automatic (auto) sample feature configured to automatically detect and sample power requirements for a device, including a transformer, connected to a power sampling receptacle and an automatic assignment (auto assign) feature configured to automatically assign a sampled power to a default receptacle (port), such as the next lowest numbered receptacle.

Other text boxes are used to show the sampled voltage/power, the AS DC determined voltage, and a name for the AS DC determined device. A text entry box, drop down box, or other entry mechanism enables a user to enter a name or other identifier for a power sampled device. The name or other identifier may be assigned to a receptacle (port) with an Assign Name button or other button or operation.

Figure 8:
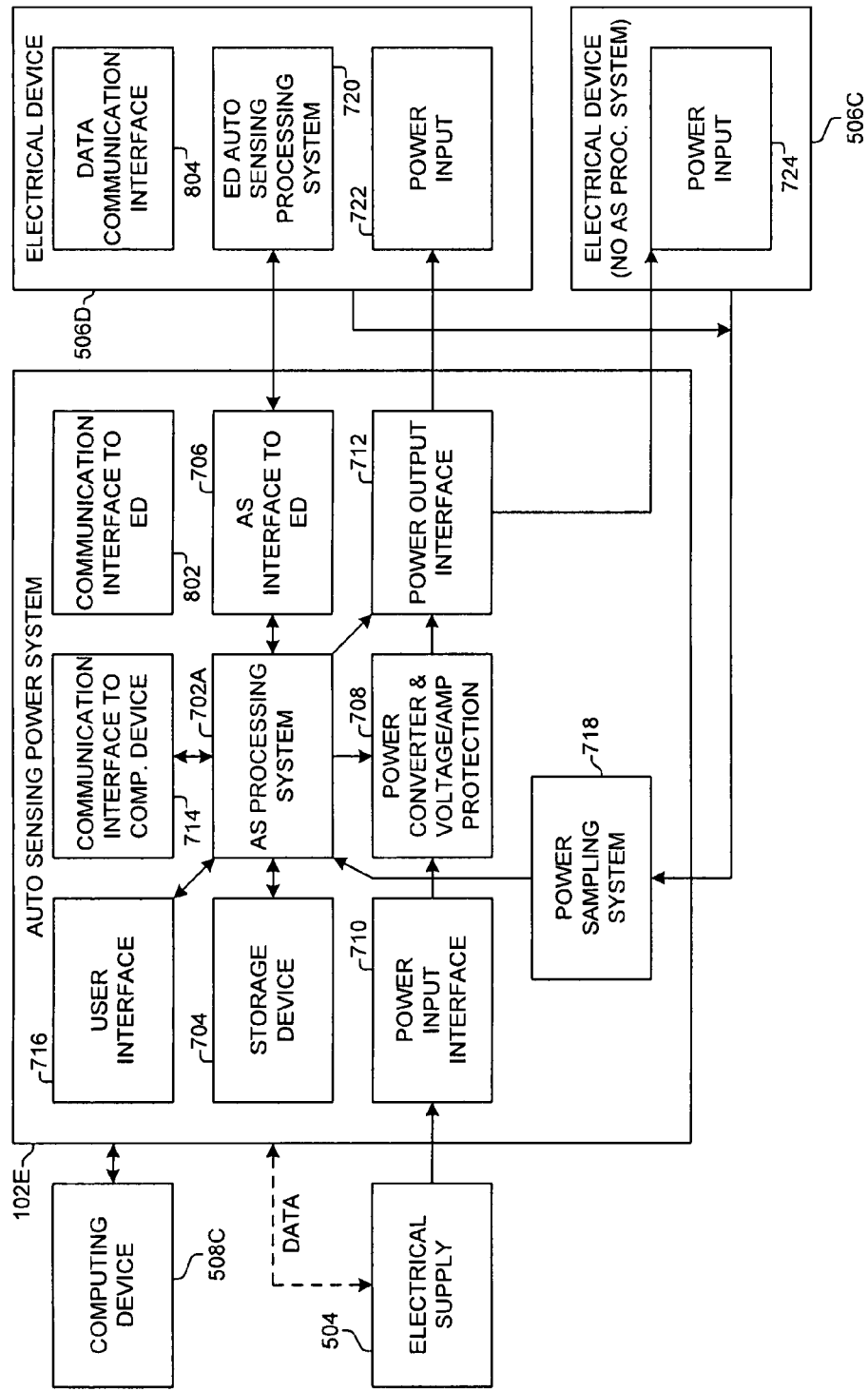
FIG. 8 is a block diagram of another automatic sensing power system in accordance with an embodiment of the present invention.

FIG. 8 depicts an exemplary embodiment of an ASPS 102E communicating with the electrical device 506D. In this embodiment, the ASPS 102E has a communication interface 802 through which it communicates to a communication interface 804 of the electrical device. The AS processing system 702A controls transmission of communications from, and reception of communications at, the communication interface 802.

In some embodiments of FIG. 8, the communication interface 706 and the communication interface 714 are a single interface. In other examples, the communication interface 706, the communication interface 714, the user interface 716, and/or the communication interface 802 are a single interface.

In this embodiment, communications normally transmitted to and from the electrical device 506D via an Ethernet connection, a cable connection, a DSL connection, a dial-up connection, an IP connection, or another type of connection through which other data may be communicated, are transmitted to the ASPS 102E for further transmission and from the ASPS to the electrical device. In this embodiment, the communications being transmitted between the electrical device 506D and the ASPS 102E may occur via one or more physical connections, including wireless connections. The power transmitted from the ASPS 102E to the electrical device 506D may be provided over the same physical connection or another physical connection.

Figure 9:
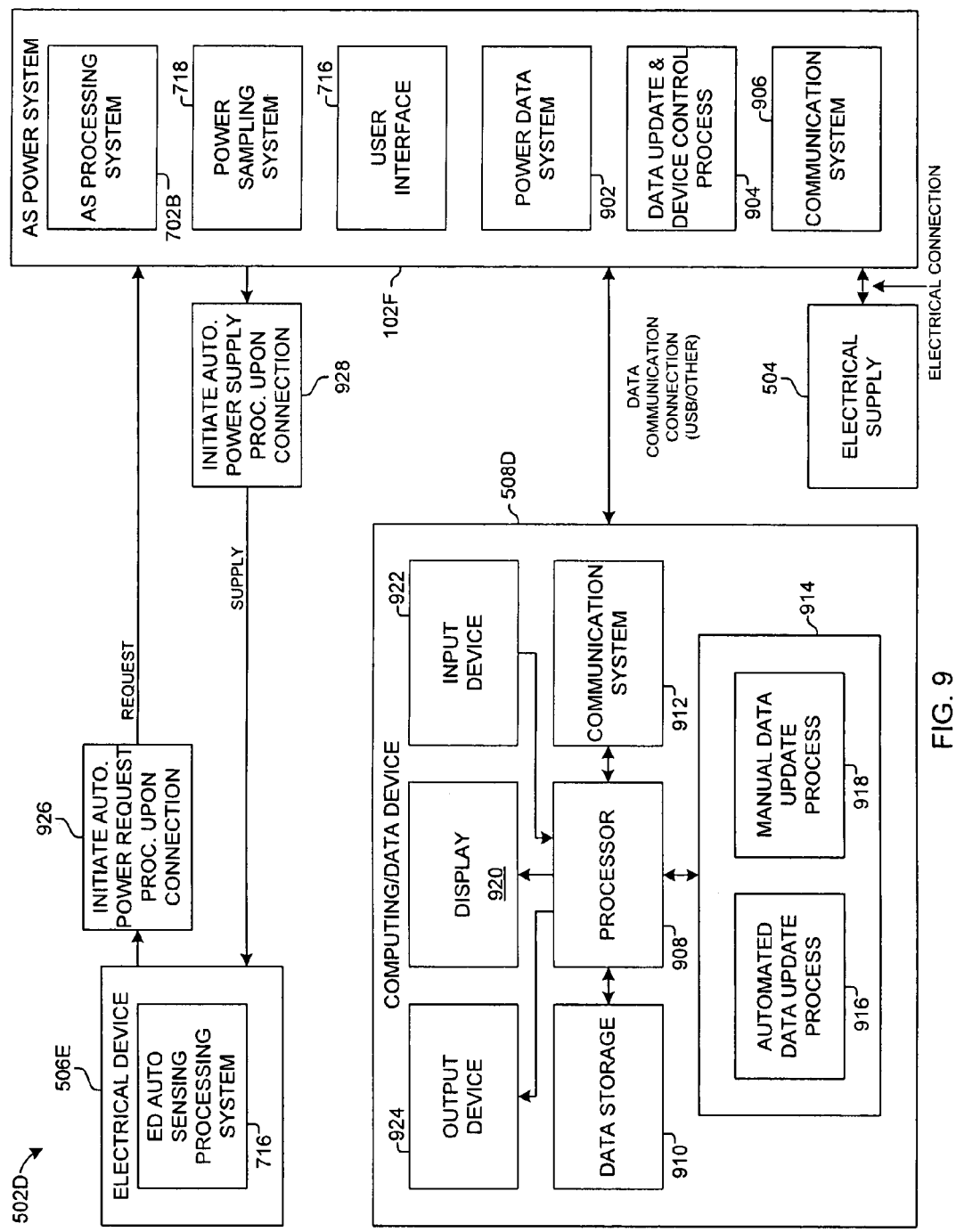
FIG. 9 is a block diagram of another automatic sensing power system communicating with a computing device and an electrical device in accordance with an embodiment of the present invention.

FIG. 9 depicts an exemplary embodiment of another ASPS 102F communicating with an electrical device 506E and a computing device 508D. The ASPS 102F includes an AS processing system 702B. The AS processing system 702B operates with a power data system 902, a data update and device control process 904, and a communication system 906.

The power data system 902 has data identifying the power requirements for one or more electrical devices. In one embodiment, the power data system 902 includes a voltage and/or amperage database that identifies the voltage and/or amperage requirements for one or more electrical devices. In this embodiment, the voltage and/or amperage database may be used with a look up or other search process by the AS processing system 702B to identify the power requirements for an electrical device. The power data system 902 may include other power related data, including configuration data and other operational data.

The data update and device control process 904 is used to automatically update information stored in the power data system 902. In one example, the data update and device control process 904 includes an automatic database update process used to automatically receive database updates from the computing device 508D and to automatically store the updated data in the power data system 902.

The communication system 906 may include a communication interface to the computing device 508D, a communication interface to the electrical device 506E, and/or another system configured to receive and/or transmit communications, including instructions and data. The communication system 906 may include one or more different types of physical connections and/or ports by which communications are received or transmitted. The communication system 906 also may operate according to one or more communication protocols to receive and/or transmit communications.

The computing device 508D includes a processor 908 used to control the processes in the computing device. In one embodiment, the processor 908 controls storage of data in, and retrieval of data from, the data storage device 910. The processor 908 also receives communications from, and transmits communications to, the communication system 912.

The processor 908 also receives data from, and transmits data to, the update system 914. The update system 914 may include an automated data update process 916 and a manual update process 918. The automated data update process 916 is configured to automatically update data, including configuration data, power requirements, and other data, for the ASPS 102F. The manual data update process 918 is configured to enable a user to manually update data, including configuration data, power requirements, and other data, to the ASPS 102F.

The processor 908 controls generation of data to the display 920, such as data for a GUI or another user interface. Additionally, the processor 908 receives data from an input device 922, such as a keyboard, a mouse, a pointer, or another input device. The processor 908 also outputs data to other output devices 924, such as a printer, another electrical device, or another device.

In one embodiment, the computing device 508D enables a user to configure the ASPS 102F, including one or more AC and/or DC receptacles on the ASPS 102F. The configuration includes enabling and disabling one or more receptacles and providing configuration data, including power requirements and/or power sampling configuration or operation data, to the ASPS 102F for one or more receptacles in which one or more electrical devices will be plugged.

In one embodiment, the processor 908 generates a GUI to the display 920. In another embodiment, the processor 908 generates another user interface.

In one example, the GUI or other user interface is used to display operational and event logging. In another embodiment, the GUI or other user interface is used to display device operational information and AC and/or DC receptacle controls.

In the embodiment of FIG. 9, the electrical device 506E connects to the ASPS 102F. Thereafter, the electrical device 506E initiates an automatic power request upon the connection at step 926. The ASPS 102F receives the request, processes the request, and automatically initiates the power supply to the electrical device 506E at step 928. Other examples exist.

As used in the description of FIGS. 5-9, the word "system" includes hardware, firmware, software, and/or other systems used to perform the functional and/or component operations and/or requirements. Similarly, the word "interface" includes hardware, firmware, software, and/or other systems used to perform the functional and/or component operations and/or requirements. One or more interfaces and/or systems may be separated and/or combined in the above-descriptions. Physical and/or logical components may be combined and/or separated.

Figure 10:
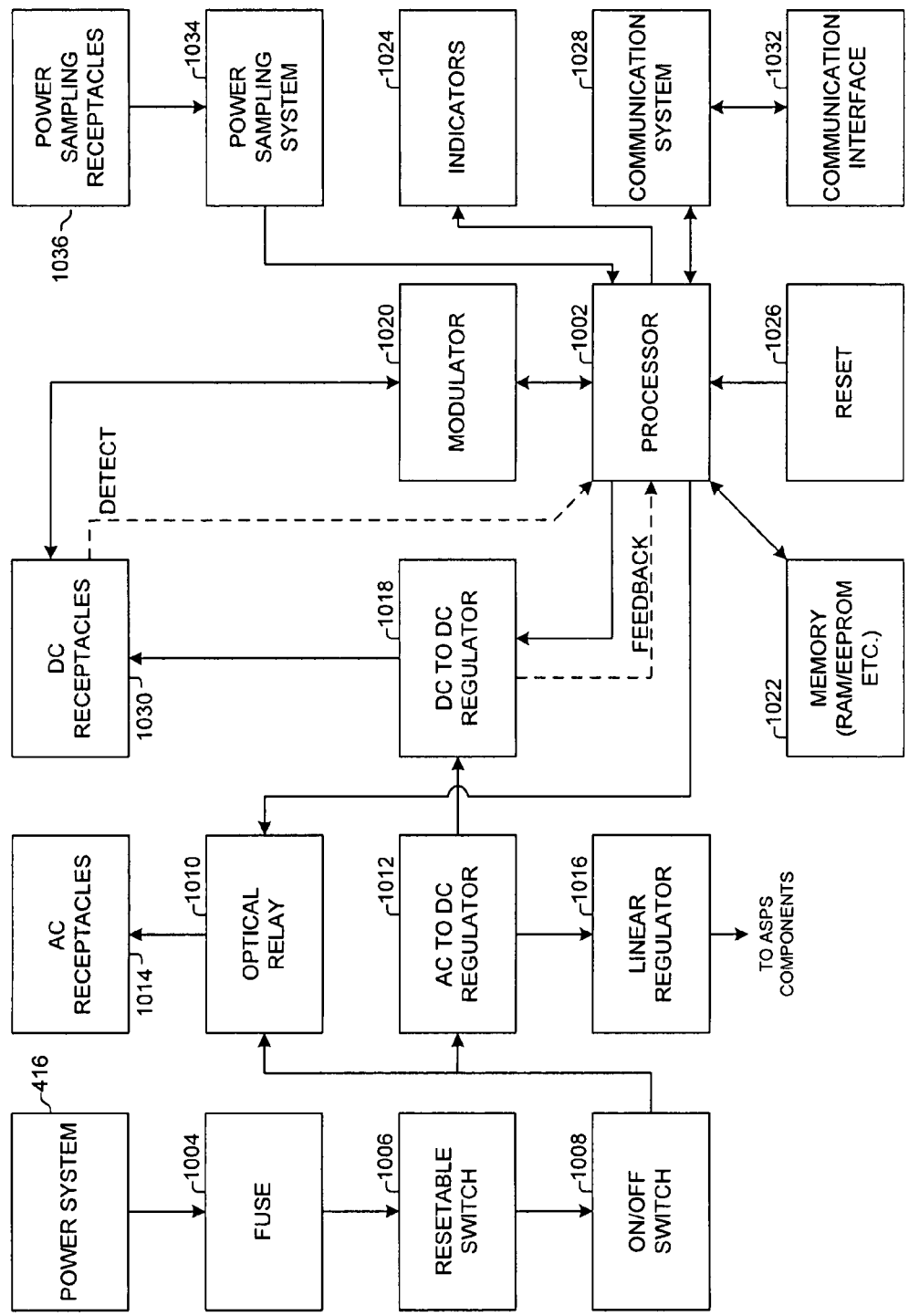
FIG. 10 is a block diagram of another automatic sensing power system in accordance with an embodiment of the present invention.

FIG. 10 depicts an exemplary embodiment of an ASPS 102G. In the embodiment of FIG. 10, a processor 1002 controls the operation of the ASPS 102G.

Power is received at the ASPS 102G from a power system 416. In the embodiment of FIG. 10, the power is received at a fuse 1004. In other embodiments, the power may be received into the ASPS 102G at a resetable switch 1006, at an on/off switch 1008, or at another component.

In the embodiment of FIG. 10, the fuse 1004 enables power to flow from the power system 416 to the ASPS 102G. The fuse 1004 terminates the flow of power into the ASPS 102G when the amperage level or another power level reaches an upper limit. In one example, the fuse 1004 opens the circuit between the power system 416 and the resetable switch 1006, or other components of the ASPS 102G, if the resetable switch is not present or when the current from the power system 416 is approximately at or exceeds 30 amps, thereby terminating the flow of electricity to the ASPS 102G. In some embodiments, the fuse 1004 is replaced after the fuse opens the circuit between the power system 416 and the resetable switch 1006 or other components. The fuse 1004 is optional in some embodiments.

The resetable switch 1006 temporarily terminates the circuit between the power system 416 and the on/off switch 1008 or other components of the ASPS 102G if the on/off switch is not present. In one example, if the on/off switch 1008 is not present, the resetable switch 1006 temporarily terminates the circuit between the power system 416 and the optical relay 1010 and the AC to DC switching regulator 1012. The resetable switch 1006 can be reset, such as by a user or automatically by another method, to close the circuit and enable power transmission to the components of the ASPS 102G. In one embodiment, the resetable switch 1006 is a circuit breaker configured to open the circuit when the current level from the power being drawn from the power system 416 is approximately at or exceeds 15 amps. The resetable switch 1006 is optional in some embodiments.

The on/off switch 1008 enables a user to manually turn power on and off for the ASPS 102G. The on/off switch 1008 may be a toggle switch, a push switch, an electronic and/or software driven switch, or another type of switch. It will be appreciated that the on/off switch 1008 may be located logically or physically in another location in the ASPS 102G, such as before or after the fuse 1004 or the resetable switch 1006. The on/off switch 1008 is optional in some embodiments.

The optical relay 1010 isolates the incoming AC power from the processor 1002 and enables the processor to control turning AC power on or off for one or more of the AC receptacles 1014. The optical relay 1010 isolates the received AC power and the transmitted AC power from connections from the processor 1002.

The optical relay 1010 receives one or more signals from the processor 1002. Based upon the one or more signals, the optical relay 1010 connects AC power to one or more of the AC receptacles 1014. In one embodiment, the optical relay 1010 connects AC power to one selected AC receptacle. In another embodiment, the optical relay 1010 connects AC power to N selected AC receptacles out of M possible AC receptacles, where N is a number greater than or equal to one, and M is a number greater than or equal to one.

In one embodiment, the optical relay 1010 is a TRIAC. In other embodiments, the optical relay 1010 is another transistor device. In other embodiments, the optical relay 1010 is another type of relay configured to isolate the processor 1002 from the incoming AC power and the outgoing AC power to the AC receptacles 1014. The optical relay 1010 is optional in some embodiments.

The AC to DC regulator 1012 receives AC power and converts the AC power to DC power. The converted DC power is transmitted to the linear regulator 1016 and to the DC to DC regulator 1018. In one embodiment, the AC to DC regulator 1012 converts 120 volt AC (VAC) power to 24 volt DC (VDC) power.

The AC receptacles 1014 are configured to transmit power from the ASPS 102G to one or more electrical devices connected to the AC receptacles. The AC receptacles 1014 include one or more AC receptacles. In one embodiment, a single AC receptacle is included in the ASPS 102G. In another embodiment, 8 AC receptacles are included in the ASPS 102G. In another embodiment, N AC receptacles are included in the ASPS 102G, where N is a number greater than or equal to one.

In one embodiment, the AC receptacles 1014 include one or more 3-prong AC receptacles. In another embodiment, the AC receptacles 1014 include one or more 2-prong AC receptacles. Other embodiments include other types of AC receptacles. The AC receptacles 1014 are optional in some embodiments.

In one embodiment, an optional switch (not shown) is included between the optical relay 1010 and the AC receptacles 1014. The optional switch enables a user to turn a selected one or more of the AC receptacles 1014 on or off. In one example, each optional switch includes one of the indicators 1024.

The linear regulator 1016 converts the DC power received from the AC to DC regulator 1012 to DC voltages required by other components in the ASPS 102G. The linear regulator 1016 provides DC voltage to integrated circuits, linear components, and other components in the ASPS 102G. In one example, the linear regulator 1016 down converts the 24 VDC voltage received from the AC to DC regulator 1012 and transmits the down-converted DC voltage to the processor 1002, the optical relay 1010, the modulator 1020, the memory 1022, the indicators 1024, the reset controller 1026, and the communication system 1028. In one embodiment, the linear regulator 1016 outputs 5 volts DC to one or more components of the ASPS 102G. In another embodiment, the linear regulator 1016 outputs N volts DC to one or more components of the ASPS 102G, where N is a number greater than or equal to 0.001.

The DC to DC regulator 1018 provides DC power to the DC receptacles 1030 at one or more voltage levels. In one example, the DC to DC regulator 1018 is an adjustable switching regulator configured to convert the 24 VDC incoming power to one or more output DC voltages. In another example, the DC to DC regulator 1018 is a synchronous adjustable switching regulator.

The DC to DC regulator 1018 receives one or more signals from the processor 1002. The DC to DC 1018 sets the output DC voltage based upon the one or more signals received from the processor 1002, and outputs the set voltage to one or more selected DC receptacles 1030. In one embodiment, the processor 1002 digitally adjusts the output of the DC to DC regulator 1018 and configures the DC to DC regulator to output the selected DC voltage to a selected DC receptacle. For example, the DC to DC regulator 1018 may receive a first signal from the processor 1002 from which the DC to DC regulator configures a first output DC voltage for 20 VDC and 4.5 amps. In another example, the DC to DC regulator 1018 receives a signal from the processor 1002 from which the DC to DC regulator configures an output DC voltage to a selected DC receptacle for 7.5 VDC and 1 amp. In another example, the DC to DC regulator 1018 receives a signal from the processor 1002 from which the DC to DC regulator 1018 configures an output DC voltage for a selected DC receptacle for 3.7 VDC and 340 milli-amps. Other examples exist.

The modulator 1020 transmits communications to and receives communications from one or more DC receptacles 1030. The modulator 1020 enables the ASPS 102G to transmit communications to an electrical device and receive communications from an electrical device over DC power carrying wire or other cable via the DC receptacles 1030. The modulator 1020 also transmits communications to and receives communications from the processor 1002.

The modulator 1020 modulates communications received from the processor 1002 for transmission to the DC receptacles 1030. The modulator 1020 also demodulates communications received from the DC receptacles 1030 for transmission to the processor 1002.

In one embodiment, the modulator 1020 modulates and demodulates communications using voltage modulation. In this embodiment, the modulator 1020 modulates the on and off states of a DC voltage to serially transmit data packets. The modulator 1020 receives voltage modulated data packets and detects the modulated data packets. In one example, the modulator 1020 reassembles the data packets to a digital form and transmits the digital data to the processor 1002. In another example, the modulator 1020 or the processor 1002 includes a voltage divider circuit that divides the voltage level of the received data to a lower range. An analog-to-digital converter then converts the divided-voltage into a digital format processable by the processor 1002.

In one example, one or more communications from the electrical device connected to the DC receptacle 1030 includes an identification string or other identification in the communication. In one embodiment, the identification string is a series of ASCII characters that correspond to data or a data structure stored in the memory 1022. The electrical device identification and/or the voltage code are stored as data in the memory 1022.

In another example, one or more communications are transmitted from and received at the modulator 1020 serially. The communications are formatted using a hexadecimal format. In this example, one or more of the following may be transmitted: a request by the ASPS 102G if an electrical device is present, an acknowledgment by the electrical device, a request for an identification code from the electronic device, an electronic device identification code, a request for a voltage code, an electrical device voltage code, an instruction to an electrical device to enable DC power for itself, a request from the ASPS for data, an electrical device data download, and other communications. In another example, one or more of the previously identified communications include ASCII characters transmitted via the hexadecimal format.

In another embodiment, the modulator 1020 transmits and receives communications using frequency shift key modulation. In this embodiment, communications are transmitted and received using a higher bandwidth.

In another embodiment, the modulator 1020 transmits and receives carrier signals that are superimposed onto the power generated from the DC to DC regulator 1018 through the DC receptacles 1030. In other embodiments, other types of modulation and/or communication may be used.

The memory 1022 includes RAM, Flash memory, EEPROM memory, and/or other memory. The memory 1022 may be used, for example, to store data, data structures, operating parameters, and/or programming, including firmware, software, and other programming.

The memory 1022 stores data received from the processor 1002. The memory 1022 also retrieves data and transmits it to the processor 1002.

In one embodiment, the memory 1022 stores product specification data for one or more electrical devices. In one example, the product specification data includes names of one or more electrical devices, model numbers of one or more electrical devices, serial numbers of one or more electrical devices, a product description of one or more electrical devices, and customer numbers for one or more electrical devices. Other data may be included.

In another embodiment, the memory 1022 includes data structures identifying voltage requirements for one or more electrical devices. The data structure also includes a designation of the electrical device, such as a model name, a model number, a serial number, or another designation.

In another embodiment, the memory 1022 includes data stored by the ASPS 102G during the operation of the ASPS. This data may include, for example, a voltage setting for a selected DC receptacle, another voltage setting for another selected DC receptacle, a voltage setting for an electrical device, another voltage setting for another electrical device, and other data. The ASPS data also may include event data, such as for power surges, selected settings for DC receptacles, states of the receptacles, critical events for the ASPS, including data identifying a blown fuse or a broken circuit, when an event occurred, and other data. Other examples exist.

In one embodiment, the memory 1022 stores one-time variables and buffer data for the processor 1002 operations. In another embodiment, the memory 1022 includes non-volatile storage for the storage of programming that is executed by the processor 1002. In another embodiment, the memory 1022 stores other non-volatile variable data, such as event data, data strings, voltage settings, and other product data.

The indicators 1024 indicate a status of one or more states and/or one or more operations for the ASPS 102G. In one embodiment, the indicators 1024 indicate a status of one or more DC receptacles 1030 and/or one or more AC receptacles 1014. In one example, the indicator is off, red, or green. If the indicator is off, the receptacle is not powered. If the indicator is green, the receptacle is powered and configured to output power to an electrical device. If the indicator is red, the receptacle is active and available to generate power to a connecting electrical device, but the receptacle is not yet generating power to the electrical device. If the indicator is red and green, an error condition exists.

The indicators 1024 receive one or more control signals from the processor 1002 and operate in accordance with the signals. In one example, a control signal causes an indicator to enable a red or green indication.

In one embodiment, the indicators 1024 are light emitting diodes (LEDs). In other embodiments, the indicators 1024 are other light emitting devices. In still other embodiments, the indicators are other types of indicating devices. The indicators 1024 are optional in some embodiments.

The reset controller 1026 resets the components on the ASPS 102G. In one embodiment, the reset controller 1026 provides a memory address to the processor 1002 at which start-up programming is stored. In another embodiment, the reset controller 1026 resets one or more DC receptacles 1030 so that the DC receptacles and the DC to DC regulator 1018 are not set for particular DC output voltages. In another embodiment, the reset controller 1026 resets the AC receptacles 1014. In another embodiment, the reset controller 1026 resets all logic components on the ASPS 102G. The reset controller 1026 is optional in some embodiments.

The communication system 1028 processes communications transmitted from, and communications received at, the communication interface 1032. The communication system 1028 formats communications to be transmitted from the ASPS 102G in a format receivable by the receiving device. The communication system 1028 formats communications received from a transmitting device connected to the ASPS 102G so that the formatted communications are processable by the processor 1002.

The communication system 1028 processes communications for various protocols. In one embodiment, the communication system 1028 processes universal serial bus (USB) based communications. In this embodiment, the communication system 1028 decodes USB data received via the communication interface 1032 and transmits the decoded data to the processor 1002. These communications may include, for example, control commands, data, and programming. The communication system 1028 also receives communications from the processor 1002 and codes the communications for transmission as USB data via the communication interface 1032. These communications may include, for example, control commands, data, and programming.

The communication system 1028 may be configured to transmit and receive communications via other protocols. For example, the communication system 1028 may be configured to transmit and receive communications as internet protocol (IP) packets, analog-based data such as voice data, digitized data, Ethernet-based data, and other types of communication system based data. Other examples exist. The communication system 1028 is optional in some embodiments.

The DC receptacles 1030 are configured to transmit power from the ASPS 102G to one or more electrical devices connected to the DC receptacles. The DC receptacles 1030 include one or more DC receptacles. In one embodiment, a single DC receptacle is included in the ASPS 102G. In another embodiment, N DC receptacles are included in the ASPS 102G, where N is a number greater than or equal to one.

In one embodiment, one or more of the DC receptacles 1030 are barrel connectors. The barrel connector includes a ground pin and power pin. The DC receptacle in this embodiment is a female barrel connector and is configured to receive a male barrel connector.

In one embodiment, the barrel connector also includes a switch and/or switch detector configured to indicate when a mating barrel connector is connected to the barrel connector of the DC receptacle 1030. The processor 1002 receives a signal from the switch detector when a mating barrel connector is connected to the connector of the DC receptacle.

In one example, the switch detector has a switch lead that is connected to a ground lead when no device is plugged into the barrel connector. The switch lead also is connected to the processor 1002, and a switch detector signal is transmitted via the switch lead to the processor. When the switch lead is connected to ground, the processor 1002 reads the switch detector signal as a logic 0, which corresponds to ground. When an electrical device is connected to the barrel connector, the switch lead is disconnected from the ground lead. The processor 1002 reads the switch detector signal as a logic 1, which indicates an electrical device is connected into the barrel connector of the DC receptacle.

In one embodiment, an optional switch (not shown) is included between the DC to DC regulator 1018 and the DC receptacles 1030. The optional switch enables a user to turn a selected one or more of the DC receptacles 1030 on or off. In one example, each optional switch includes one of the indicators 1024.

The communication interface 1032 interfaces to one or more types of communication systems. In one embodiment, the communication interface 1032 is a USB interface. In another example, the communication interface is an RJ-11 or RJ-14 telephone jack interface. In another example, the communication interface is an RJ-45 connector. In another example, the communication interface 1032 is an Ethernet-based interface. One or more of the previously referenced communication interfaces and/or one or more other interfaces may exist in a single embodiment. Other examples exist. The communication interface 1032 is optional in some embodiments.

The power sampling system 1034 receives a power connection from an electrical device and samples the power requirements of the electrical devices. In one embodiment, the power sampling system 1034 includes one or more power sampling receptacles 1036 to which the electrical device plugs or otherwise connects, such as an AC receptacle, an AS DC receptacle, or a DC receptacle. Alternately, the AC receptacles and/or DC receptacles 1030 may be used for power sampling. In one example of this embodiment, the power sampling system 1034 determines the power drawn by or generated to the electrical device.

In one example, the AC plug portion of a transformer (i.e. wall brick) for an electrical device is plugged into an AC power sampling receptacle of the power sampling system 1034, and the power sampling system determines the power required for the electrical device. In another example, the power sampling system 1034 determines the power used to drive the transformer. In another example, the power sampling system 1034 determines the power output from the transformer. In another example, the DC end of a transformer (i.e. wall brick) for an electrical device is plugged into a DC power sampling receptacle of the power sampling system 1034, and the power sampling system determines the power output from the transformer. In another example, a power connection is connected between the electrical device and a connector for the power sampling system 1034, and the power sampling system determines the power required by the electrical device.

In another example, the power sampling system 1034 comprises a voltage sampling system that determines the voltage drawn by an electrical device or a transformer for an electrical device. In another example, the power sampling system 1034 comprises a voltage sampling system that determines the voltage generated by a transformer for an electrical device.

In another example, the power sampling system 1034 includes one or more AC receptacles and/or one or more DC receptacles. The receptacles may be separate dedicated power sampling receptacles. Alternately, the receptacles may be one or more existing receptacles configured to sample power requirements and supply the power requirements. In one embodiment, one or more receptacles can be enabled or disabled.

The power sampling system 1034 can be configured to automatically detect when a device is connected to one of the power sampling receptacles and automatically sample the power sampling receptacles. Alternately, the power sampling system 1034 can be configured for manual initiation of the power sampling at one or more power sampling receptacles.

In another embodiment, the power sampling system 1034 can automatically assign a sampled power or an AS DC determined power to a particular receptacle, such as a next available receptacle or other default receptacle. Alternately, a user can assign a sampled power to a receptacle. In some instances, the power sampling system 1034 receives configuration data identifying a name or other identifier for a power sampled device. The name or other identifier may be assigned to or associated with a receptacle.

The power sampling system 1034 transmits sampling data or one or more signals to the processor 1002. The sampling data or signals indicate the sampled power requirements.

The processor 1002 controls the operations of the ASPS 102G. The processor 1002 controls the on and off states of the AC receptacles 1014 by enabling and disabling the optical relay 1010 to connect and disconnect the AC input power for output to one or more AC receptacles. The processor 1002 transmits one or more signals to the optical relay 1010 to make or break a connection for one or more of the AC receptacles 1014.

The processor 1002 controls the on and off states of the DC receptacles 1030. The processor 1002 controls which DC receptacles 1030 will be enabled with DC power. The processor 1002 determines the DC power level that will be output from the DC to DC regulator 1018 for each DC receptacle. The processor 1002 transmits a signal to the DC to DC regulator 1018 identifying the DC power level to be output to each DC receptacle and enables the DC power output level for that DC receptacle.

The processor 1002 processes the sampling data or signals from the power sampling system 1034. The processor 1002 then determines the power requirements for the electrical device based on the sampling data or signals. For example, the sampling data or sampling signals could be a lower value DC signal. The value of the signal corresponds to the value required by the electrical device.

The processor 1002 controls the transmission and reception of data to and from the modulator 1020. The processor 1002 receives data from the modulator 1020 and processes the data. The data may include, for example, a specific or approximate DC voltage level required by an electrical device connected to one of the DC receptacles 1030 and/or an identification of the electrical device.

The processor 1002 determines the type of communication that will be made via the modulator 1020. In one example, the processor 1002 controls the modulation of the modulator 1020 so that communications are made in a format receivable by the electrical device connected to the DC receptacle 1030. The processor 1002 also controls demodulation of the modulator 1020 so that communications received from an electrical device are transmitted in a format receivable by the modulator 1020 and processable by the processor 1002.

The processor 1002 controls the indicators 1024. The processor 1002 transmits one or more signals to one or more of the indicators 1024 for an indicator status. In one embodiment, the indicators 1024 are LEDs, and the processor 1002 enables a particular input to cause the LED to turn on. In another example, the processor 1002 enables another input of the LED to cause the LED to light a second color.

The processor 1002 controls start-up of the ASPS 102G. In addition, upon receiving a reset signal from the reset controller 1026, the processor 1002 retrieves the start-up programming from memory 1022 and resets the ASPS 102G.

The processor 1002 processes communications received via the modulator 1020 and the communication system 1028. The processor 1002 also transmits communications via the modulator 1020 and the communication system 1028.

In one embodiment, the processor 1002 generates a user interface via the communication system 1028 for display, such as for display on a computer system with a monitor. In this embodiment, the processor 1002 transmits data to the computer system for display. The data may include, for example, voltage levels required for a particular DC receptacle 1030, power sampling data, instructions to enable a particular DC receptacle for a particular level, instructions to assign power values to one or more receptacles, instructions to sample a receptacle, instructions to enable or disable one or more AC receptacles 1014 and/or DC receptacles 1030, or other data.

In another embodiment, the user interface resides on a computer system that is communicating with the processor 1002 via the communication system 1028 and the communication interface 1032. In this embodiment, the processor 1002 transmits data to the computer system for display by the user interface. The computer system transmits data received from the user interface to the processor 1002 for processing. In this example, the data may include, for example, voltage levels required for a particular DC receptacle 1030, instructions to enable a particular DC receptacle for a particular level, instructions to enable or disable one or more AC receptacles 1014 and/or DC receptacles 1030, or other data.

In one embodiment, the processor 1002 monitors the output from the DC to DC regulator 1018 to identify the actual or approximate actual voltage being generated from the DC to DC regulator to a selected DC receptacle 1030. The raw analog voltage level generated by the DC to DC regulator 1018 is used as a feedback signal and is input back to the processor 1002. This feedback signal is indicated by the dashed-line between the processor 1002 and the DC to DC regulator 1018 in FIG. 10. In this embodiment, the processor 1002 has a voltage divider that divides the feedback signal to a lower DC voltage range, such as between 0 volts and 5 volts, samples the divided feedback signal with an analog-to-digital converter, and uses the sampled feedback signal to determine if any adjustments must be made to the output of the DC to DC regulator 1018 to maintain the proper output DC voltage. In one example, the voltage divider is a circuit having two resistors.

In one embodiment, the processor 1002 transmits an adjustment signal to the DC to DC regulator 1018 to adjust its output of a DC voltage for a particular DC receptacle 1030. In one example, the adjustment signal is an analog output signal that is used to inject an offset into the DC to DC regulator 1018. In this example, the degree of offset is linearly related to the output DC voltage of the DC to DC regulator 1018. This voltage may be expressed as Voutput=Vadjustment*Beta, with Beta=GainFactor+Tolerance. The GainFactor is a gain specific to the DC to DC regulator 1018, and its value depends upon the exact design of the DC to DC regulator. The Tolerance is a parameter used to express the production tolerance of each DC to DC regulator. Ideally, the Tolerance is 0.

The feedback loop signal enables the processor 1002 to vary Vadjustment until Voutput is equal to the DC voltage required by the electrical device connected to the particular DC receptacle. In other embodiments, the adjustment signal includes a raw digital format, rather than an analog format. Other examples exist.

In one embodiment, when an electrical device is connected to one of the DC receptacles 1030, the processor 1002 causes a minimal level of DC power to output from the DC to regulator 1018 to the DC receptacle. The minimal power level is enough DC power to initiate operations of the electrical device, such as operation of the electrical device's processor, but not enough DC power to fully power the electrical device. The minimal power level is low enough that it will not exceed power levels that may damage the electrical device. In this example, the minimal power level enables the processor of the electrical device to communicate with the processor 1002 of the ASPS 102G. The processor of the electrical device then is able to transmit the voltage requirements or the electrical device's identification to the processor 1002 of the ASPS 102G. The processor 1002 then configures the DC voltage level to be output from the DC to DC regulator 1018 to the DC receptacle 1030 in which the electrical device is connected and enables output of the DC power to that DC receptacle.

Figure 11:
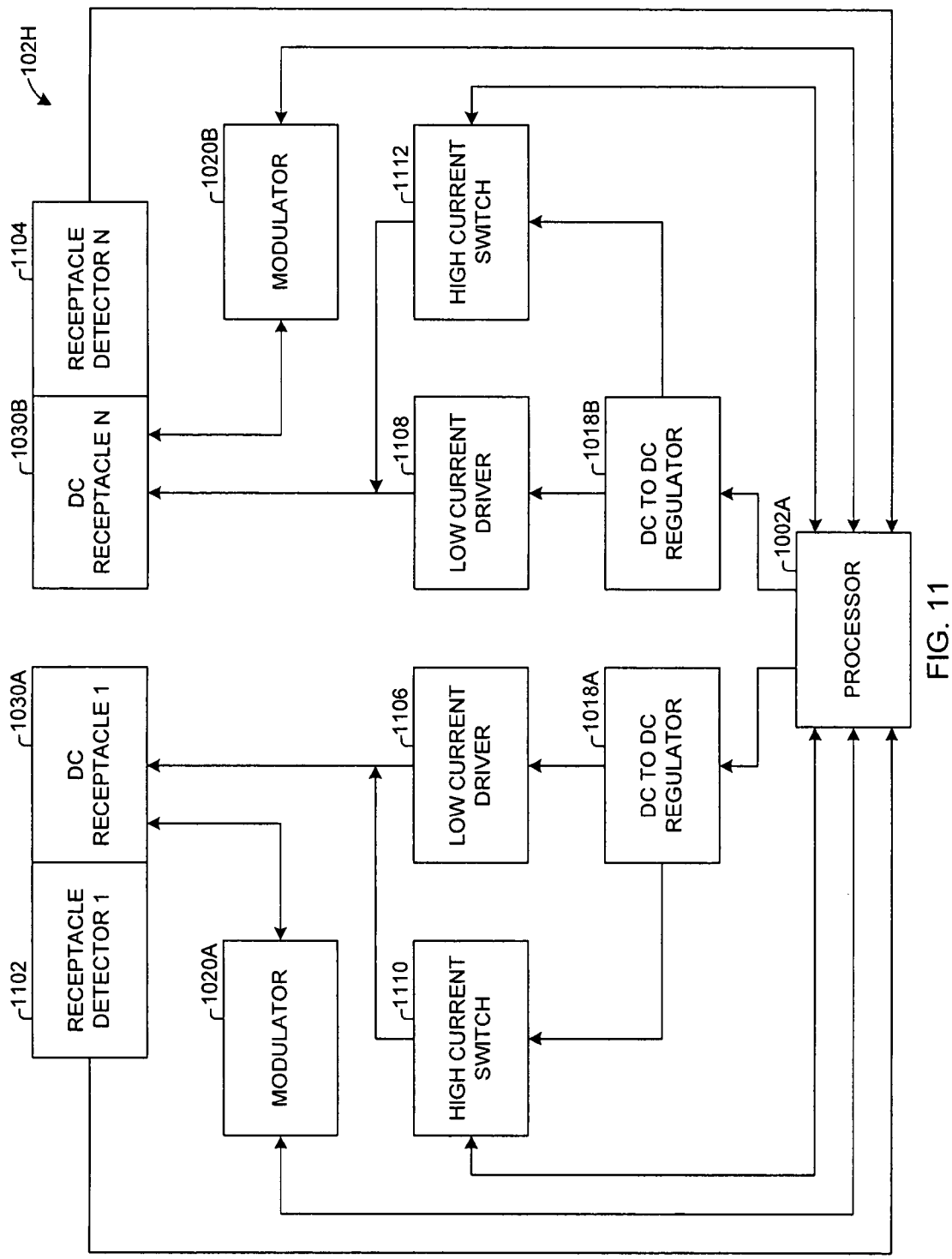
FIG. 11 is a block diagram of another automatic sensing power system in accordance with an embodiment of the present invention.

FIG. 11 depicts another exemplary embodiment of a ASPS 102H. In the embodiment of FIG. 11, the ASPS 102H includes DC receptacle 1 1030A through DC receptacle N 1030B. Each DC receptacle 1030A-1030B has an associated detector 1102-1104, such as a detector switch for the barrel connector described above. Other examples exist. Each detector 1102-1104 is configured to enable a signal to the processor 1002A identifying that an electrical device connector has been connected to the receptacle 1030A-1030B.

A modulator 1020A-1020B is configured to communicate between a respective DC receptacle 1030A-1030B and the processor 1002A. The processor 1002A transmits communications to the DC receptacles 1030A-1030B via the modulator 1020A-1020B and receives communications from the DC receptacles via the modulators.

A low current driver 1106 and 1108 and a high current switch 1110 and 1112 are associated with each DC receptacle 1030A-1030B. The low current drivers 1106 and 1108 receive DC power from the DC to DC regulator 1018A-1018B at a low current level and/or a low voltage level. The low current drivers 1106-1108 provide the DC power to the DC receptacles 1030A-1030B. The low current driver 1106-1108 is used to signal to the electrical device connected to the DC receptacle 1030A-1030B that the processor 1002A will transmit communications to, or receive communications from, the electrical device. In one embodiment, a low current driver 1106-1108 includes one or more resistors.

The high current switches 1110-1112 receive DC power from the DC to DC regulator 1018A-1018B at a high current level and/or a high voltage level. The high current switches 1110-1112 provide the DC power to the DC receptacles 1030A-1030B. The DC power provided by the high current switch 1110-1112 to the DC receptacle 1030A-1030B is used to charge or otherwise power the electrical device connected to the DC receptacle. In one embodiment, a high current switch 1110-1112 includes a transistor or multiple transistors configured to receive DC power from the DC to DC regulator 1018A-1018B and to receive an enable signal from the processor 1002A. Upon receiving the enable signal from the processor 1002A, the high current switch 1110-1112 transmits the DC power to the DC receptacle 1030A-1030B.

In the embodiment of FIG. 11, the processor 1002A and the modulators 1020A-1020B are configured to communicate using voltage modulation. In one embodiment, the modulator 1020A-1020B transmits communications to, and receives communications from, the DC receptacle 1030A-1030B using a hexadecimal format. In one example, one or more communications transmit ASCII-based characters using hexadecimal format.

In one embodiment, the ASPS 102H of FIG. 11 operates as follows. The DC receptacle 1030A includes a female barrel connector having a ground pin, a power pin, and a switch pin. The detector 1102 is the switch pin and switching mechanism in this example.

When a mating jack is not connected to the DC receptacle 1030A, the switching mechanism causes the switch pin to be connected to the ground lead. The switch pin also is connected to an input of the processor 1002A. When the switch pin is connected to ground, the processor reads the switch pin signal as a logic 0, which corresponds to ground.

An electrical device having a male connector is plugged into the DC female barrel connector receptacle. When the device is connected, the switch lead of the detector 1102 is disconnected from the ground lead. In this example, pull-up resistors are connected to the switch lead between the detector 1102 and the processor 1002A. When the switch lead is disconnected from ground, the detector signal transitions to a logic 1.

When the detector signal transitions to a logic 1, the processor 1002A determines that an electrical device is connected to the DC receptacle 1030A. The processor 1002A causes a low current and/or a low voltage driver signal to be generated from the DC to DC regulator 1018A through the low current driver 1106 to the DC receptacle 1030A. In this example, the low current signal is 24 volts DC and less than 5 milli-amps. The low current signal is enough power to turn on a processor for the electrical device. However, the low current signal likely does not have sufficient amperage to damage the electrical device.

The low current driver signal is an indication to the electrical device that one or more communications will be transmitted from the ASPS 102H to the electrical device. The processor 1002A transmits a query to the electrical device through the modulator 1020A and to the DC receptacle 1030A. In this example, the modulator 1020A uses voltage modulation to transmit the communication.

After the low current driver signal has been transmitted to the electrical device, the processor 1002A causes the modulator 1020A to transmit the communication to the electrical device through the DC receptacle 1030A. In this example, the processor 1002A transmits a series of enable and disable signals to the modulator 1020A. In response to the enable signals, the modulator 1020A outputs a voltage having an amplitude greater than a minimal amperage, such as 3 volts DC. The electrical device receives the voltage having the amplitude and recognizes it as a logic 1. When the modulator 1020A receives a disable signal, the modulator either outputs a voltage having a level below the minimal level or does not output any voltage at all. The electrical device identifies that the voltage is either below the minimal level or that no voltage is received at all and reads this as a logic 0. Using this method, a series of 1s and 0s are transmitted between the modulator and the electrical device as one more data packets.

The electrical device transmits a communication to the modulator 1020A through the DC receptacle 1030A, and the modulator transmits the communication to the processor 1002A. In this example, the processor 1002A has a divider circuit that divides the voltage of the communication to a lower voltage, such as voltage between 0 and 5 volts DC. The processor 1002A also has an analog-to-digital converter that samples the divided communication. The processor 1002A reads the converted signal and identifies the communication type and the data in the communication.

In this example, the communication from the electrical device is an acknowledgment indicating a status OK command. The processor 1002A transmits a message via the modulator 1020A requesting a voltage code and an identification string from the electrical device. The processor 1002A receives a communication from the electrical device via the modulator 1020A with the voltage code and the identification string for the electrical device.

The processor 1002A transmits a signal to the DC to DC regulator 1018A for the requested voltage and enables the output from the DC to DC regulator to the high current switch 1110. The processor 1002A also enables the switch for the high current switch 1110, which causes the DC power to flow from the DC to DC regulator 1018A through the high current switch 1110 and to the DC receptacle 1030A.

If the processor 1002A communicates with the electrical device while or after the electrical device receives the DC power generated from the DC to DC regulator 1018A through the high current switch 1110, the processor 1002A disables the output from the DC to DC regulator to the high current switch 1110. The processor 1002A may accomplish this by disabling the output from the DC to DC regulator 1018A, disabling the high current switch 1110, or both.

The processor 1002A then enables a low current and/or low voltage driver signal from the DC to DC regulator 1018A to the low current driver 1106. The low current driver 1106 transmits the low current driver signal to the electrical device through the DC receptacle 1030A. The low current driver signal is a signal to the electrical device that a communication will be transmitted from the processor 1002A. In this example, the processor 1002A and the electrical device operate in a master-slave relationship. In other embodiments, a polling relationship may occur between the processor 1002A and the electrical device. Other examples exist.

After the low current driver signal has been transmitted to the electrical device, the processor 1002A causes the modulator 1020A to transmit the communication to the electrical device through the DC receptacle 1030A. In this example, the processor 1002A transmits a series of enable and disable signals to the modulator 1020A. In response to the enable signals, the modulator 1020A outputs a voltage having an amplitude greater than a minimal amperage, such as 3 volts DC. The electrical device receives the voltage having the amplitude and recognizes it as a logic 1. When the modulator 1020A receives a disable signal, the modulator either outputs a voltage having a level below the minimal level or does not output any voltage at all. The electrical device identifies that the voltage is either below the minimal level or that no voltage is received at all and reads this as a logic 0. Using this method, a series of 1s and 0s are transmitted between the modulator and the electrical device as one or more data packets.

Similarly, in this example, the electrical device transmits one or more data packets to the modulator 1020A having a voltage amplitude that indicates a logic 1 or a logic 0. The voltage levels are transmitted from the modulator to the divider circuit and the analog-to-digital converter on the processor 1002A and read by the processor as a logical 0 or a logical 1.

It will be appreciated that one or more of the embodiments of FIGS. 4-11 may be embodied in a line-cord device, a wall-plug device, the line-cord device 104 of FIGS. 1-3, the detachable wall-plug device 106 of FIGS. 1-3, each of the line-cord device 104 and the detachable wall-plug device 106 of FIGS. 1-3, or another device. Alternately, portions of the embodiments of FIGS. 4-11 may be embodied in those devices. Other examples exist.

Figure 12:
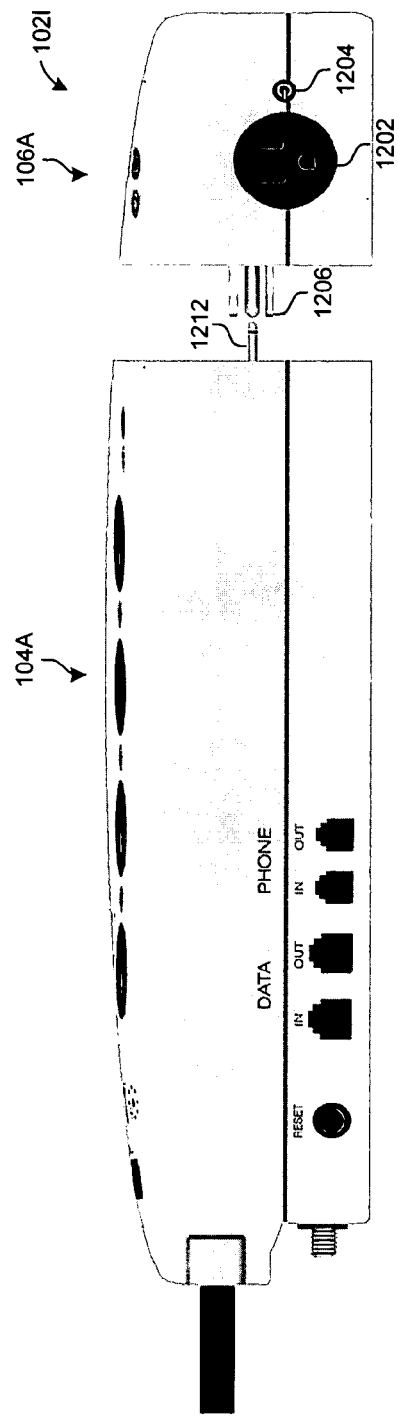
FIG. 12 is a side view of another automatic sensing power system with a detachable module in accordance with an embodiment of the present invention.
Figure 13:
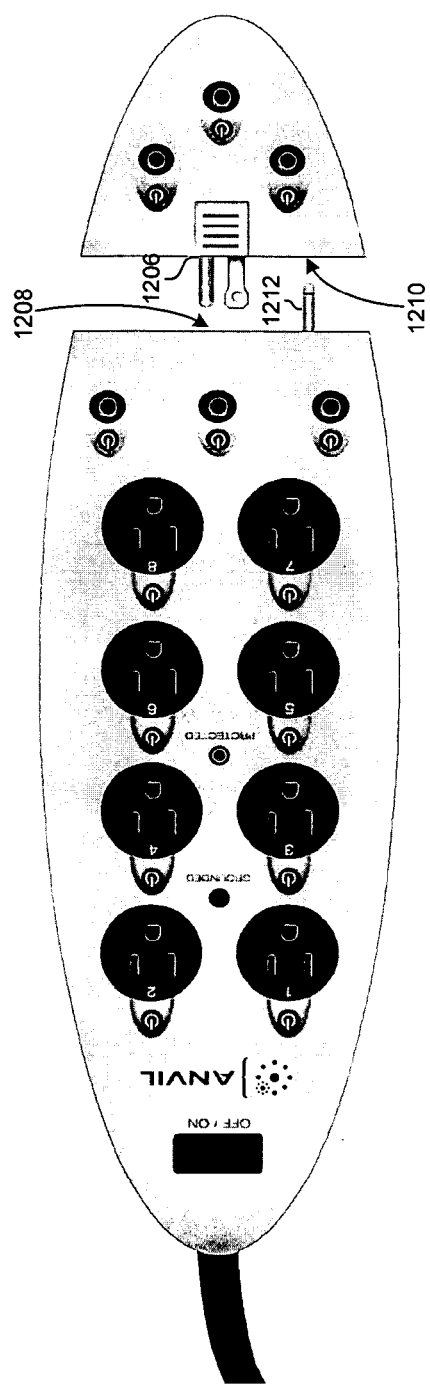
FIG. 13 is a top view of another automatic sensing power system with a detachable module in accordance with another embodiment of the present invention.
Figure 14:
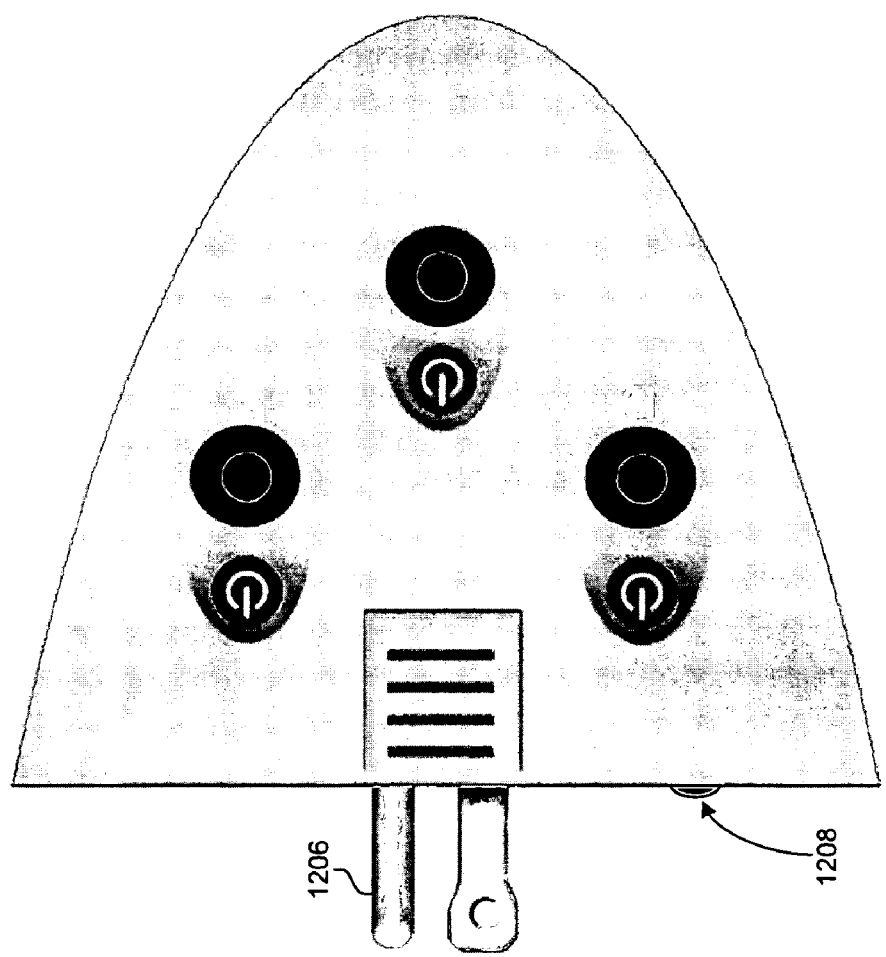
FIG. 14 is a side view of another automatic sensing power system in accordance with an embodiment of the present invention.

FIGS. 12-14 depict another exemplary embodiment of an ASPS 102I. In the embodiment of FIGS. 12-14, the detachable wall plug device 106A includes an AC receptacle 1202. In some embodiments, the AC receptacle 1202 has an associated power control/indicator 1204.

The wall plug device 106A also includes a single electrical connector 1206. The electrical connector 1206 connects to a receiving connector 1208 in the line-cord device 104A. AC and/or DC power is transmitted from the line-cord device 104A to the wall plug device 106A via the electrical connector 1206 and the receiving connector 1208. In some embodiments, communications, including control instructions and/or data, are transmitted from the line-cord device 104A to the wall plug device 106A via the electrical connector 1206 and the receiving connector 1208. In one embodiment, the electrical connector 1206 is a 3-prong electrical plug. In other embodiments, other types of electrical connectors may be used.

The wall plug device 106A also includes a communication interface 1210. The communication interface 1210 is configured to communicate with a corresponding communication interface 1212 in the line-cord device 104A. In one embodiment, the communication interface 1210 is a female connector, and the corresponding communication interface 1212 is a male connector configured to mate with the female connector. In one embodiment, the corresponding communication interface 1212 is a foldable male connector that folds down or to the side when not in use. In one example, the foldable male connector locks into place when in use.

In the embodiment of FIGS. 12-14, communications may be transmitted between the line-cord device 104A and the wall plug device 106A via the communication interfaces 1210 and 1212. Alternately, communications may be transmitted via the electrical connector 1206.

The ASPS 102I also includes one or more power sampling receptacles. In one example, only an AC power sampling receptacle 1214 is present. In another example, only a DC power sampling receptacle 1216 is present. In another example, both the AC and DC power sampling receptacles 1214-1216 are present. More than one AC or DC power sampling receptacle could be present. Each of the power sampling receptacles optionally may have an associated power/control indicator (not shown).

Alternately, an AC receptacle 126A can be configured as an AC power sampling receptacle, and the separate AC power sampling receptacle 1214 is optional. Alternately, an AS DC receptacle 148A can be configured as the DC power sampling receptacle, and the separate DC power sampling receptacle 1216 is not present. As another example, one or more of the AC receptacles 114A-126A can be configured as power sampling receptacles. Additionally, one or more of the AS DC receptacles 144A-148A can be configured as DC power sampling receptacles. Other examples exist.

The detachable wall plug device 106 also or alternately can be configured with one or more power sampling receptacles. In one example, only an AC power sampling receptacle (not shown) is present. In another example, only a DC power sampling receptacle 1218 is present. In another example, both the AC power sampling receptacle (not shown) and the DC power sampling receptacle 1218 are present. More than one AC or DC power sampling receptacle could be present. One or more of the power sampling receptacles are optional.

In another embodiment, an AC receptacle 1202 can be configured as the AC power sampling receptacle, and a separate AC power sampling receptacle is not present. In another embodiment, an AS DC receptacle 176A can be configured as the DC power sampling receptacle, and the DC power sampling receptacle 1218 is not present. Additionally, one or more of the AS DC receptacles 176A-180A can be configured as DC power sampling receptacles. These embodiments are optional. Other examples exist.

It will be appreciated that one or more of the embodiments of FIGS. 4-11 may be embodied in a line-cord device, a wall-plug device, the line-cord device 104A of FIGS. 12-14, the detachable wall-plug device 106A of FIGS. 12-14, each of the line-cord device 104A and the detachable wall-plug device 106A of FIGS. 12-14, or another device. Alternately, portions of the embodiments of FIGS. 4-11 may be embodied in those devices. Other examples exist.

Figure 15:
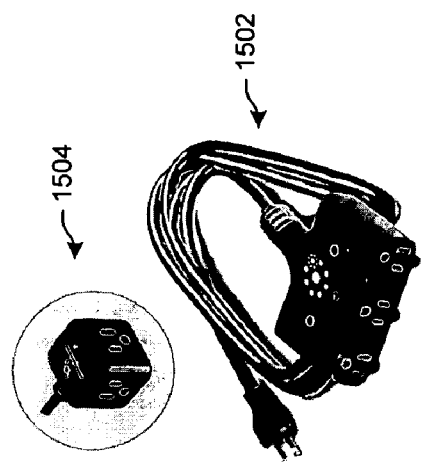
FIG. 15 is a top view of a line-cord automatic sensing device in accordance with an embodiment of the present invention.

FIGS. 15-22 depict other embodiments of an automatic sensing power system and/or an automatic power system. FIG. 15 depicts an embodiment in which line-cord devices 1502 and 1504 incorporate the automatic sensing power system, and each device is configured for power sampling and has an AC receptacle 1506 and 1508 that is configured as a power sampling receptacle. Alternately, the AC receptacle 1506 and 1508 is configured as a power sampling receptacle and a power delivery receptacle.

Figure 16:
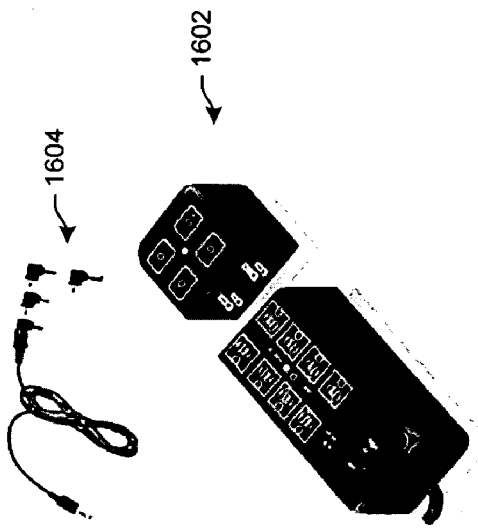
FIG. 16 is a top view of another line-cord automatic sensing device with a connector and adaptors in accordance with an embodiment of the present invention.

FIG. 16 depicts another embodiment of an automatic sensing power system 1602, including AC receptacles, DC receptacles, and a detachable module, such as the detachable wall plug device. FIG. 16 also depicts an exemplary embodiment of one type of electrical modular connector 1604 that may be used in connection with the automatic sensing power system, including the receptacles, electrical cords, and/or connectors and adaptors. The power system 1602 is configured for power sampling and has an AC receptacle 1604 that is configured as a power sampling receptacle. Alternately, the AC receptacle 1604 is configured as a power sampling receptacle and a power delivery receptacle. Alternately, a DC receptacle 1608 can be configured as a power sampling receptacle.

Figure 17:
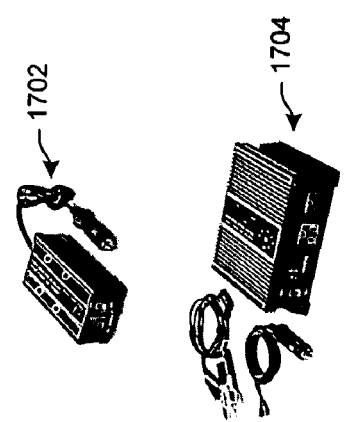
FIG. 17 is a top view of other line-cord automatic sensing devices with connectors and DC adaptors in accordance with an embodiment of the present invention.

FIG. 17 depicts an exemplary embodiment that incorporates an automatic sensing power system 1702 and 1704 in a device that may be plugged into a vehicle receptacle. Each device is configured for power sampling and has an AC receptacle 1706 and 1708 that is configured as a power sampling receptacle. Alternately, the AC receptacle 1706 and 1708 is configured as a power sampling receptacle and a power delivery receptacle.

Figure 18:
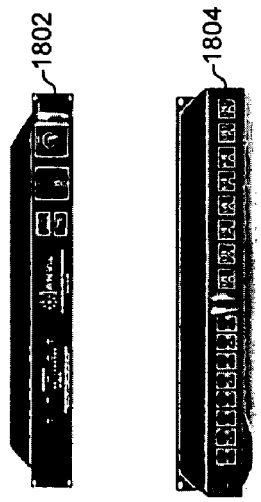
FIG. 18 is a front view of rack/cabinet mount automatic sensing devices in accordance with an embodiment of the present invention.

FIG. 18 depicts another embodiment in which AC receptacles and DC receptacles are used in a rack mount 1802 and a cabinet mount 1804 automatic sensing power system. The rack mount 1802 is configured for power sampling and has an AC receptacle 1806 that is configured as a power sampling receptacle. Alternately, a DC receptacle 1808 is configured as a power sampling receptacle. Alternately, an AC receptacle 1810 and/or a DC receptacle 1812 are configured as power sampling receptacles and power delivery receptacles.

Figure 19:
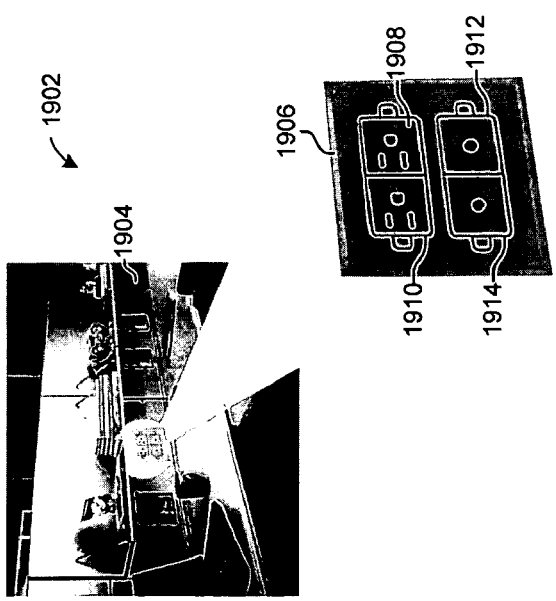
FIG. 19 is a front view of a modular power receptacle in a modular wall unit in accordance with an embodiment of the present invention.

FIGS. 19-22 depict various modular devices using the automatic sensing power system. FIG. 19, for example, depicts a modular unit 1902 installed in a wall 1904, such as a modular wall receptacle junction box 1906. The modular wall receptacle junction box 1906 of FIG. 19 includes both AC and DC modular receptacles 1908-1910 and 1912-1914, respectively. The modular wall receptacle junction box 1906 and/or the modular receptacles 1908 and 1912 are configured for power sampling. In one example, the AC receptacle 1908 is configured as a power sampling receptacle. Alternately, the AC receptacle 1908 is configured as a power sampling receptacle and a power delivery receptacle. In another example, a DC receptacle 1912 is configured as a power sampling receptacle. Alternately, the DC receptacle 1912 is configured as a power sampling receptacle and a power delivery receptacle.

Figure 20:
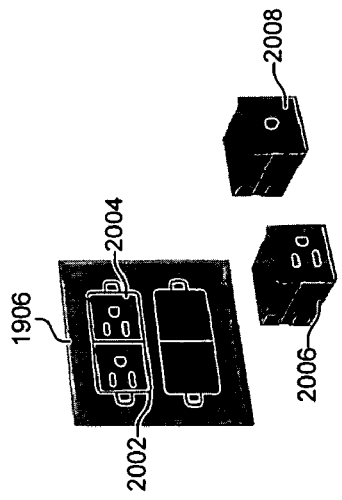
FIG. 20 is a front view of a modular wall unit with modular automatic sensing power system receptacles in accordance with an embodiment of the present invention.

FIG. 20 depicts removable modular receptacles that may be removably installed in a modular wall receptacle junction box 1906. FIG. 20 depicts various modules 2002-2008 that may be interchangeably placed in a modular wall receptacle junction box 1906. In one example, the AC receptacle 2006 is configured as a power sampling receptacle. Alternately, the AC receptacle 2006 is configured as a power sampling receptacle and a power delivery receptacle. In another example, the DC receptacle 2008 is configured as a power sampling receptacle. Alternately, the DC receptacle 2008 is configured as a power sampling receptacle and a power delivery receptacle.

Figure 21:
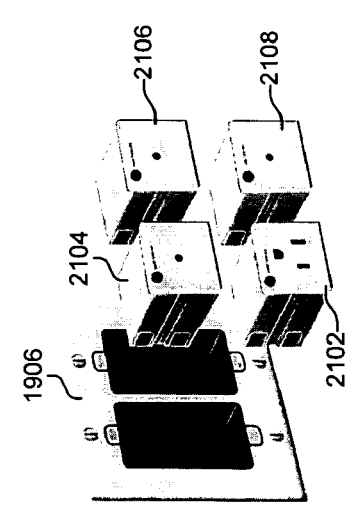
FIG. 21 is a front view of modular automatic sensing power system receptacles in accordance with an embodiment of the present invention.

FIG. 21 depicts other wall modules 2102-2108 that may be interchangeably and removably installed in modular wall receptacle junction box 1906. The example of FIG. 21 includes an AC receptacle 2102 and DC receptacles 2104-2108, each of which include a grounded indicator and/or a protected indicator and/or an enabled or disabled indicator. In one example, the AC receptacle 2102 is configured as a power sampling receptacle and/or a power delivery receptacle. In another example, the DC receptacle 2104 is configured as a power sampling receptacle and/or a power delivery receptacle.

Figure 22:
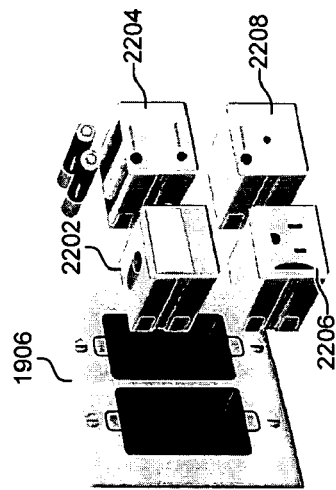
FIG. 22 is a front view of modular automatic sensing power system receptacles in accordance with an embodiment of the present invention.

FIG. 22 depicts exemplary embodiments of modular power receptacles that may be installed in a modular wall receptacle junction box 1906. Each of the modular power receptacles may include a grounded indicator, a protected indicator, and/or an enabled/disabled power indicator. The examples of FIG. 22 include a lighting module 2202, a battery recharge module 2204, a dimmer module 2206 for dimming control of the power output from the dimmer module, and a DC power module 2208 with surge suppression. In one example, the AC receptacle 2206 is configured as a power sampling receptacle and/or a power delivery receptacle. In another example, the DC receptacle 2208 is configured as a power sampling receptacle and/or a power delivery receptacle.

FIGS. 23-58 depict an exemplary embodiment of a user interface (UI) 2302. The UI enables a user to determine if an electrical device is connected to the ASPS. In the embodiment of FIGS. 23-58, an electrical device is referred to as an automatic sensing-direct current and automatic synchronous-data communication (asDC) device, and the ASPS is referred to as an intelligent power hub.

The UI enables a user to select the voltage to be transmitted from the ASPS to an electrical device and to select the DC receptacle to which it will be generated. The UI also enables a user to turn one or more AC receptacles and/or DC receptacles on or off. The UI also enables the operation of the power sampling system, including initiating power sampling, setting automatic sampling, selecting a DC receptacle for a sampled voltage, setting an automatic assignment for assigning a DC receptacle to a sampled voltage, entering a name or identifier for a sampled device, assigning voltages to one or more receptacles, and enabling/disabling one or more receptacles. For exemplary purposes, the UI of FIGS. 23-43 is directed to only one AC receptacle (identified as an AC port on the UI) and only one DC receptacle (identified as a DC port on the UI), and the UI of FIGS. 44-58 is directed to multiple AC receptacles (ports) and multiple DC receptacles (ports). However, other UIs may enable selection of one or multiple AC receptacles and one or multiple DC receptacles.

Additionally, a computer is connected to the power hub through a USB connection in an embodiment of FIGS. 23-58. The UI in this embodiment is generated through the host computer and displayable on the computer's display. Other examples exist.

Figure 23:
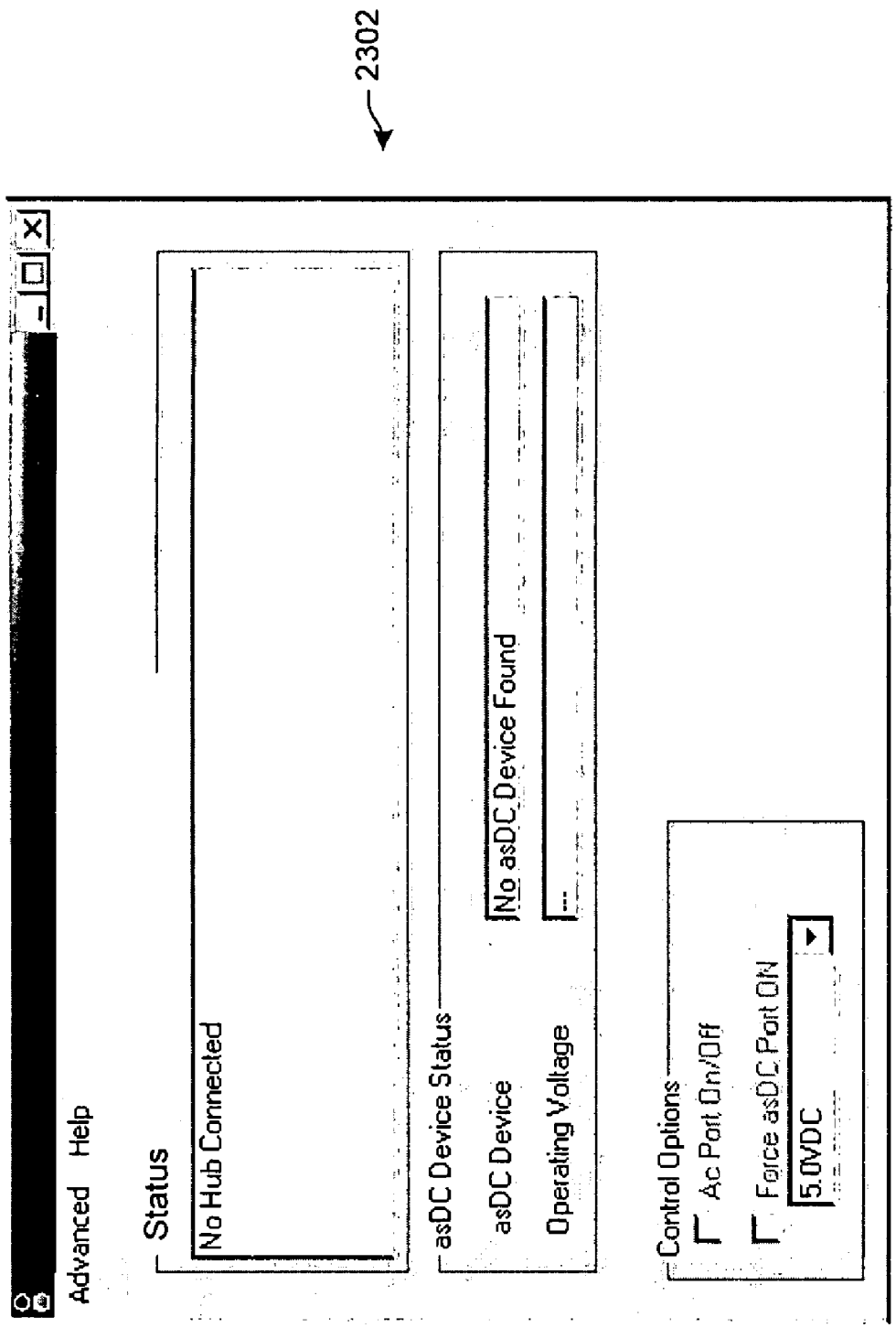
FIGS. 23-58 are screen views of a user interface used with an automatic sensing power system in accordance with an embodiment of the present invention.
Figure 24:
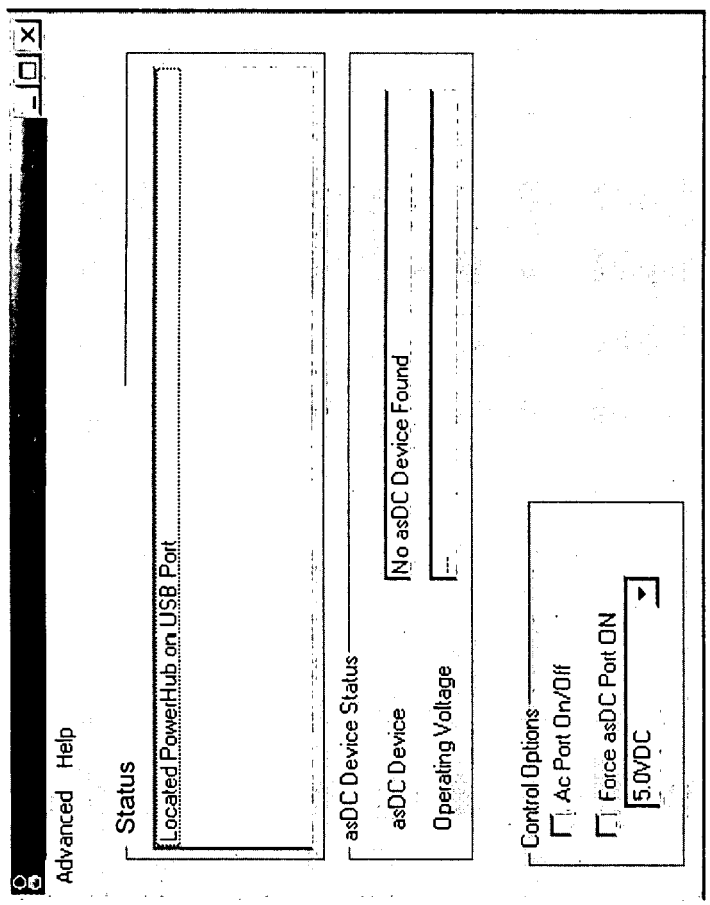

In one example, when the computer is not connected to the power hub, the UI indicates that no power hub is connected to the computer and no asDC device is connected to the power hub, as depicted in FIG. 23. When the power hub is connected to the computer, the UI indicates that the power hub is connected to the computer via the USB port, as depicted in FIG. 24.

Figure 25:
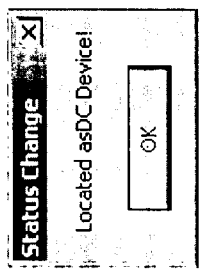
Figure 26:
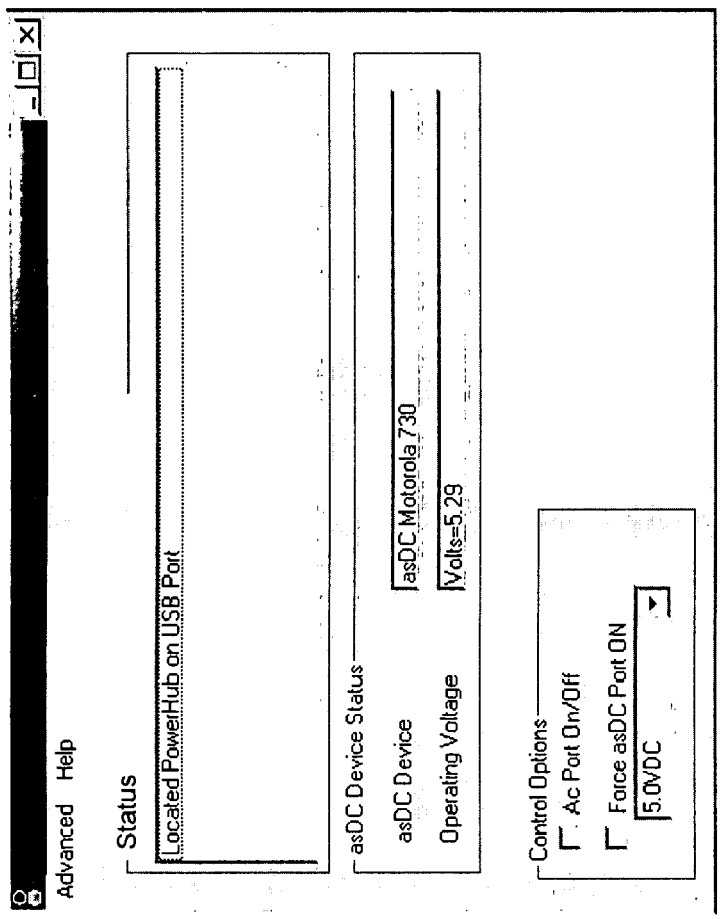

As depicted in FIG. 25, when an asDC device is connected to the power hub, a window is displayed with the status change. The user selects the "OK" button on the status change window, and the status change window disappears. In other embodiments, the status window briefly appears and automatically disappears after a selected period of time. The asDC device status indicates that an asDC device was identified, as depicted in FIG. 26. The asDC device identification is specified by values in two fields, including a name or identity field and an operating voltage field. In the example of FIG. 26, the name or identity field may contain a string of up to forty characters. In this example, the device is identified as an "asDC Motorola 730" having an operating voltage of 5.29 volts DC. Other examples exist.

Figure 27:
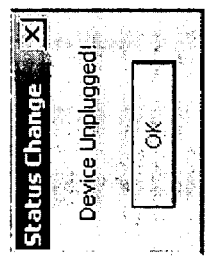
Figure 28:
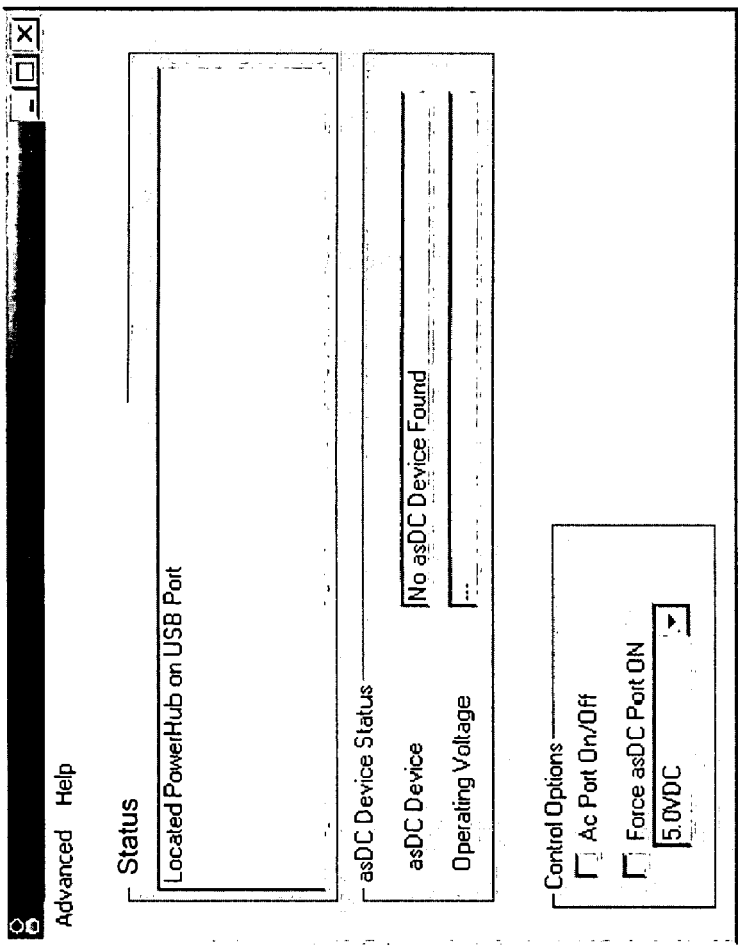

When the asDC device is disconnected from the power hub, a status change window is generated, as depicted in FIG. 27. The device status indicates that no asDC device is connected to the power hub, as indicated in FIG. 28.

Figure 29:
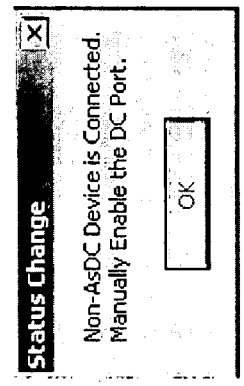

An electrical device that is not configured to communicate with the power hub is referred to as a non-asDC device. If a non-asDC device is connected to the power hub, a status change window indicates that the non-asDC device is connected to the power hub, as indicated in FIG. 29. The status change window suggests that the user manually enable a DC receptacle.

Figure 30:
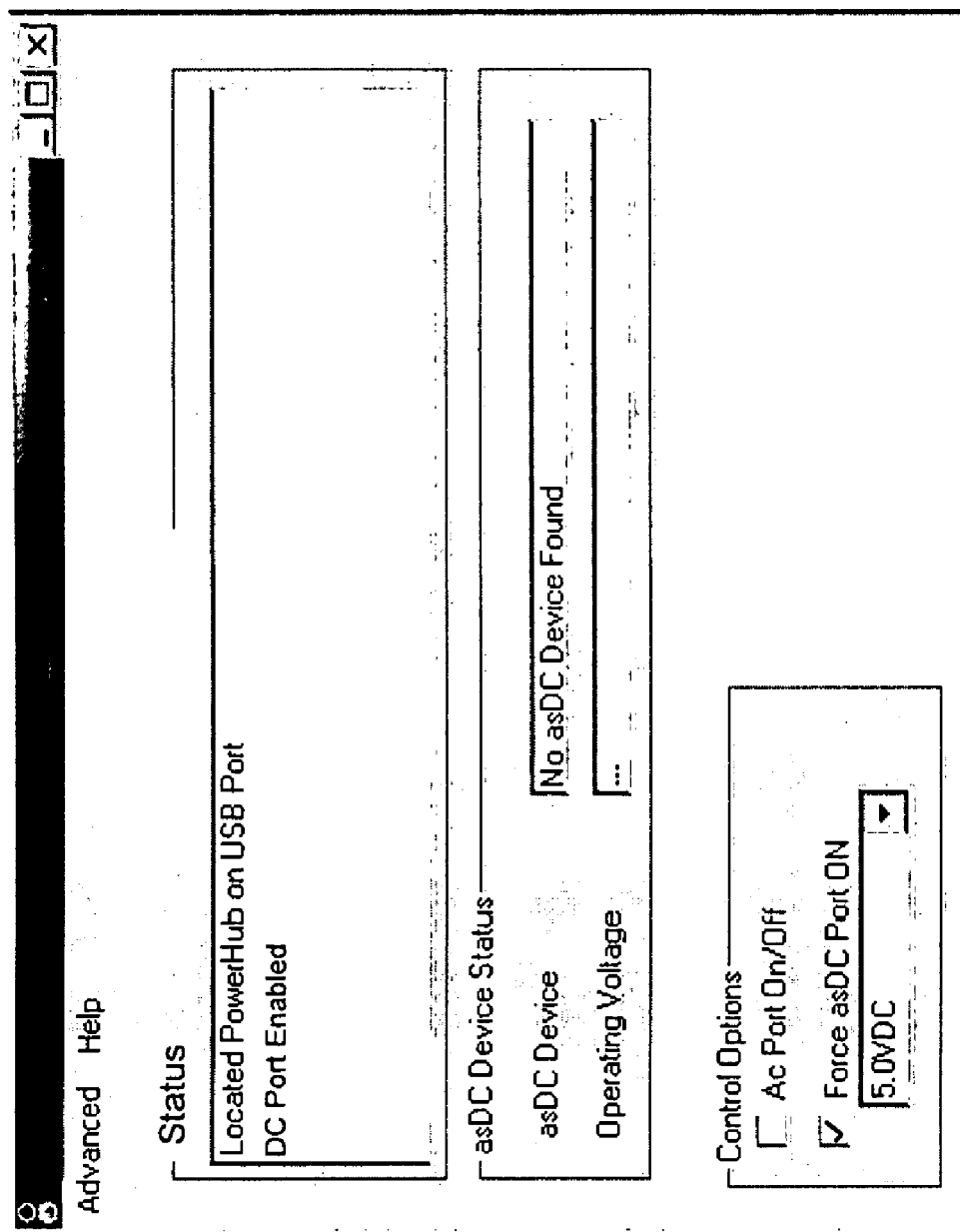

The user may select a voltage to be output to a selected DC receptacle, as depicted in FIG. 30. In this example, the user selected the voltage level to be output to the selected DC receptacle. The user then selected the "force asDC port ON" to set the DC receptacle to the selected voltage level.

Figure 31:
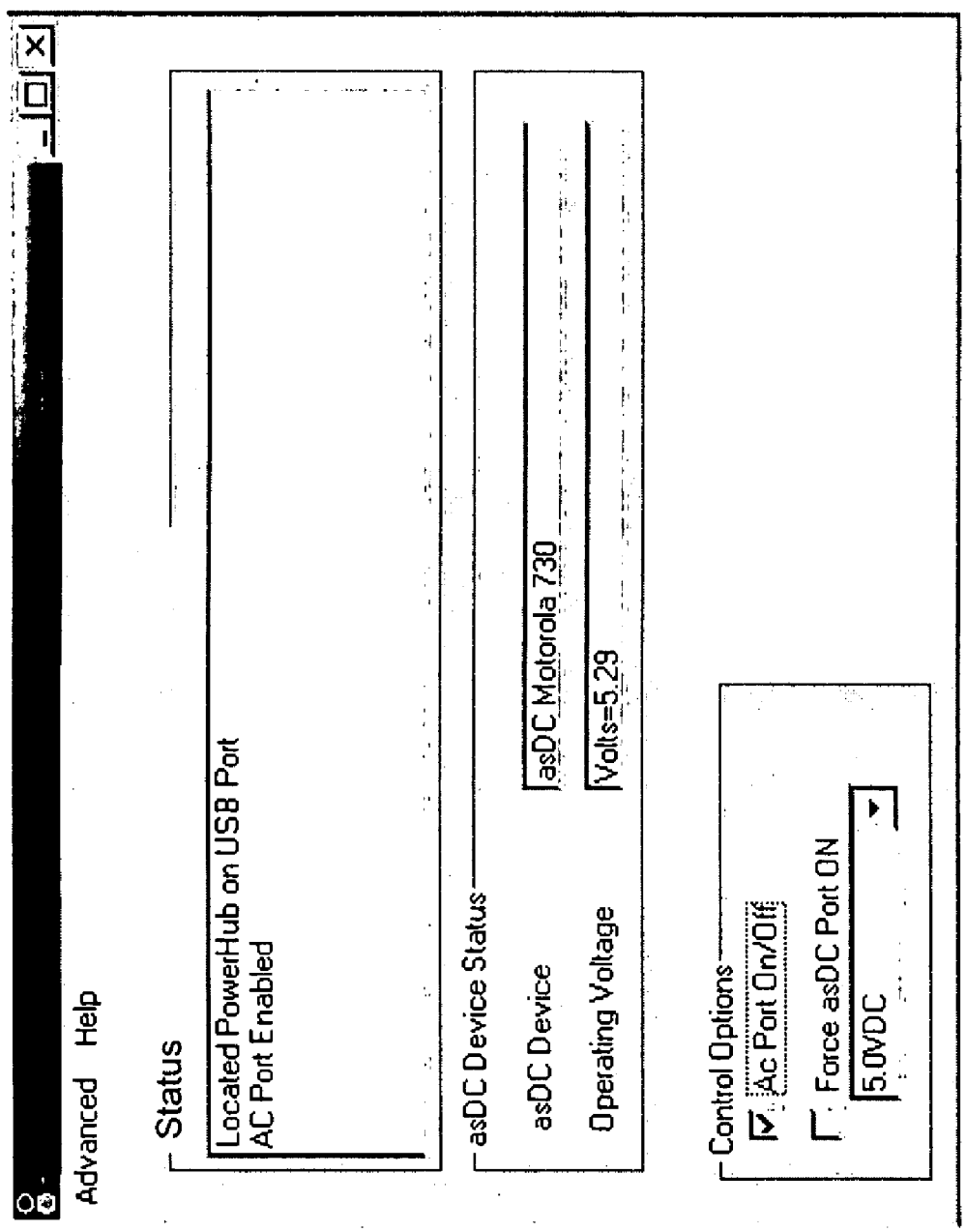

The user may elect to turn the AC receptacle on or off, as depicted in FIG. 31. If the user selects the check box for "AC port on/off," the user may turn the receptacle on and off. When the AC receptacle is turned on, the power hub status window indicates that the AC port was enabled.

Figure 32:
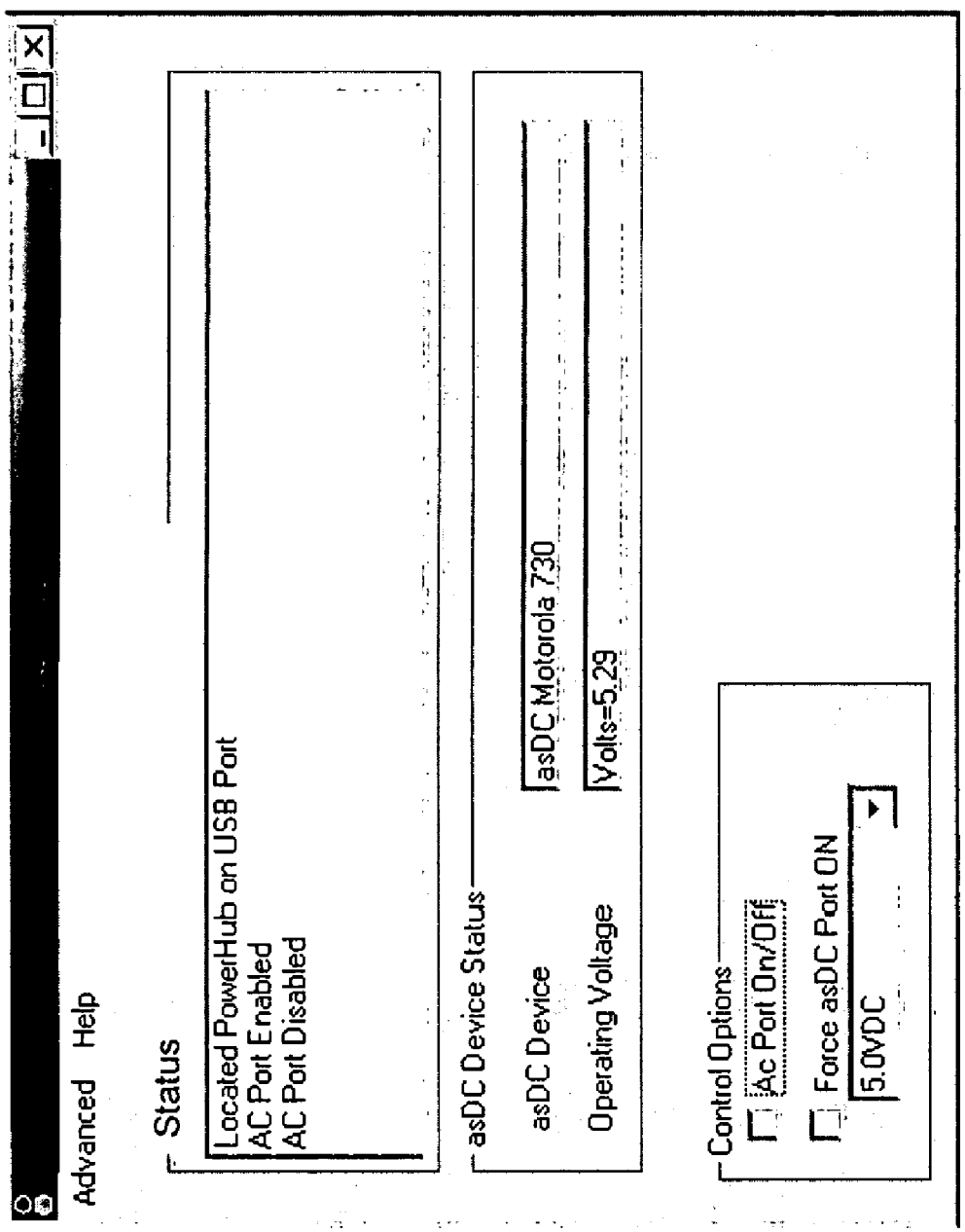

If the user again selects the check box for the AC port on/off, the AC power for the AC receptacle is turned off. The check mark from the check box disappears, and a new line is entered for the power hub status indicating that the AC port is disabled, as depicted in FIG. 32.

Figure 33:
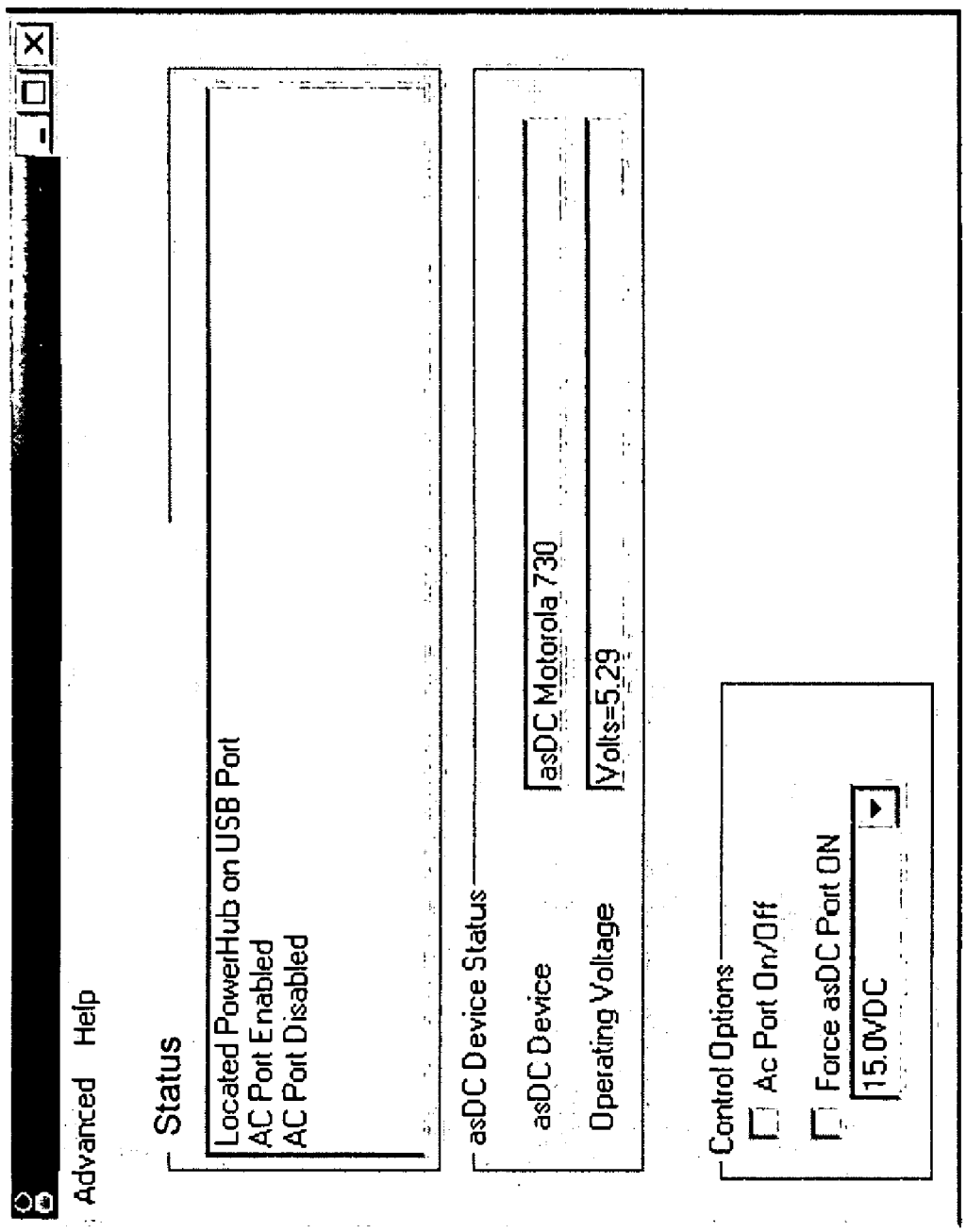
Figure 34:
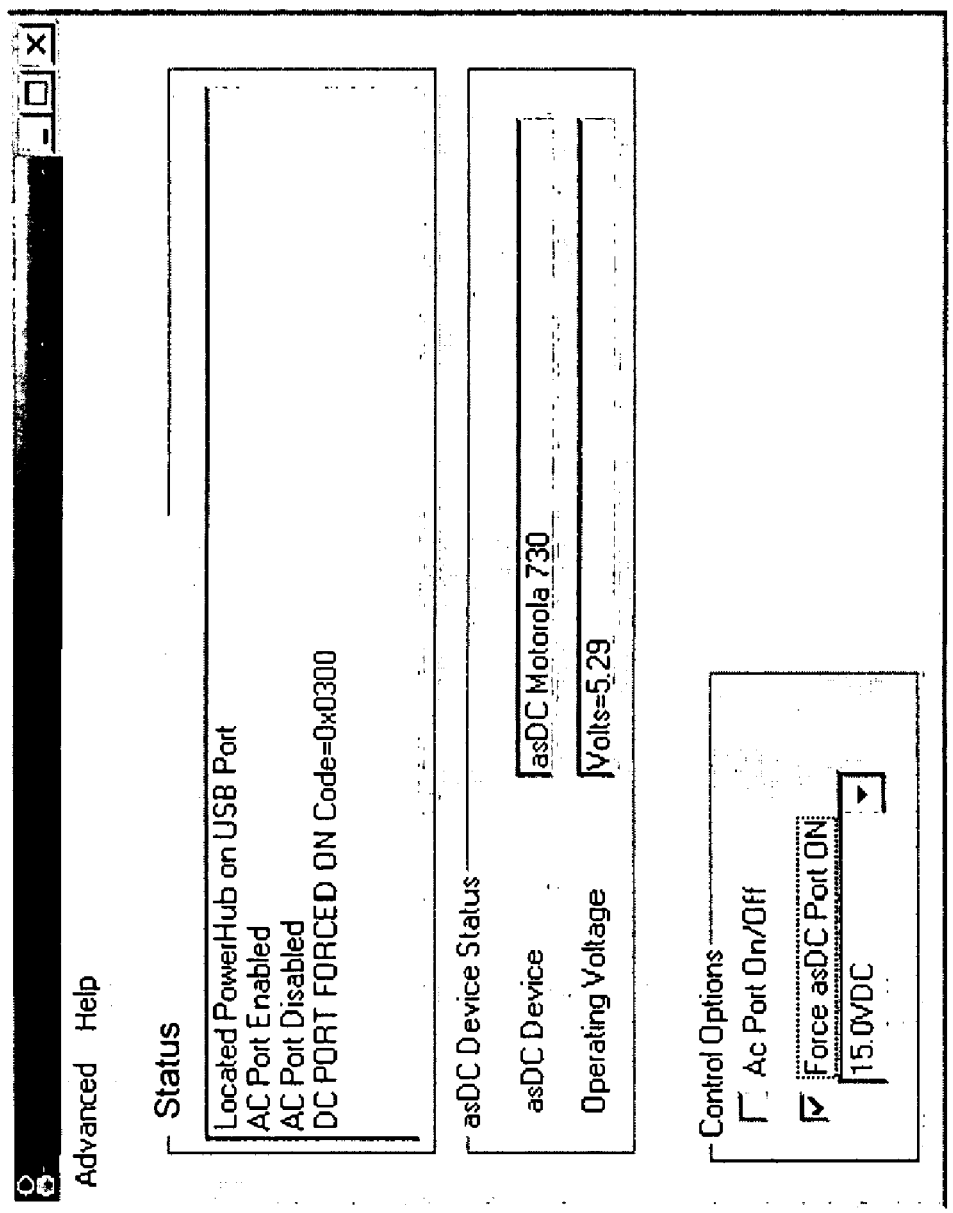

As depicted in FIGS. 33-34, the user turns the power on for the DC receptacle. In this example, the user selects a different voltage to be output to the DC receptacle. The user then selects the "force asDC port ON" check box. A check mark appears in the check box to indicate that the power is being transmitted to the DC receptacle. In addition, a line appears in the power hub status indicating that the DC port was forced on, as depicted in FIG. 34. In this example, the status line also indicates the code for the voltage and/or the device name.

Figure 35:
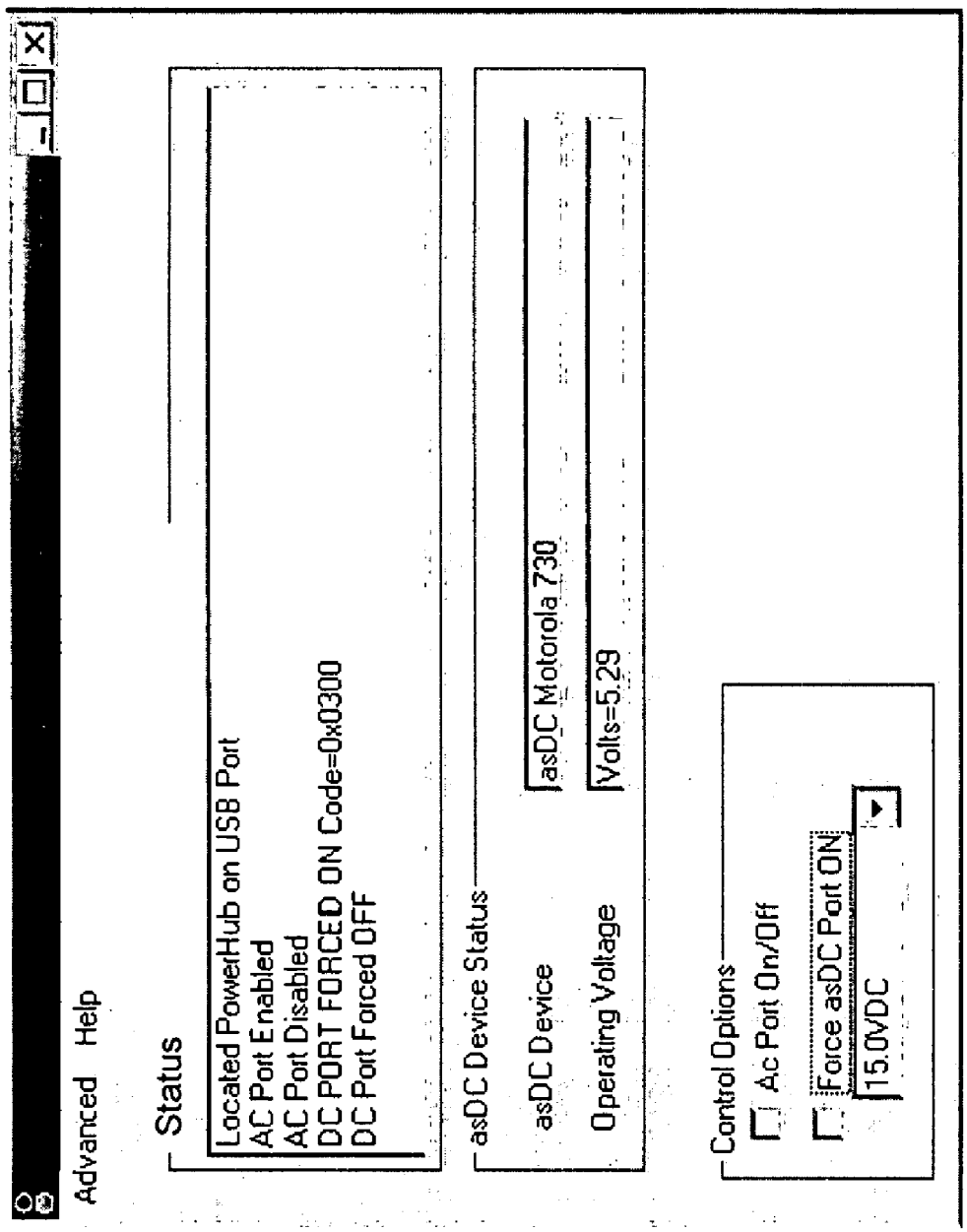

The user may select the check box for the DC port again to force the DC receptacle off, as indicated in FIG. 35. A status line is generated to the power hub status indicating that the DC port was forced off.

Figure 36:
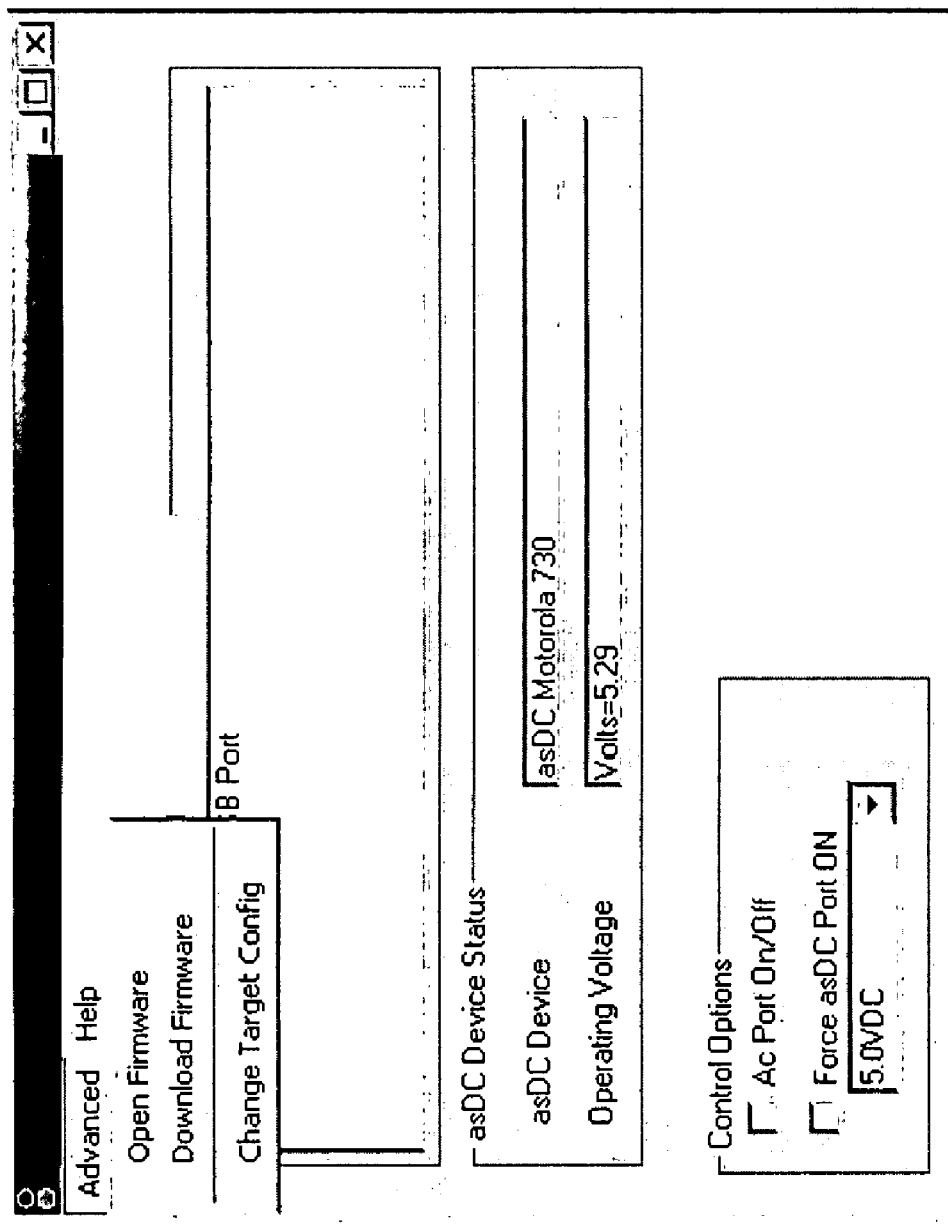
Figure 37:
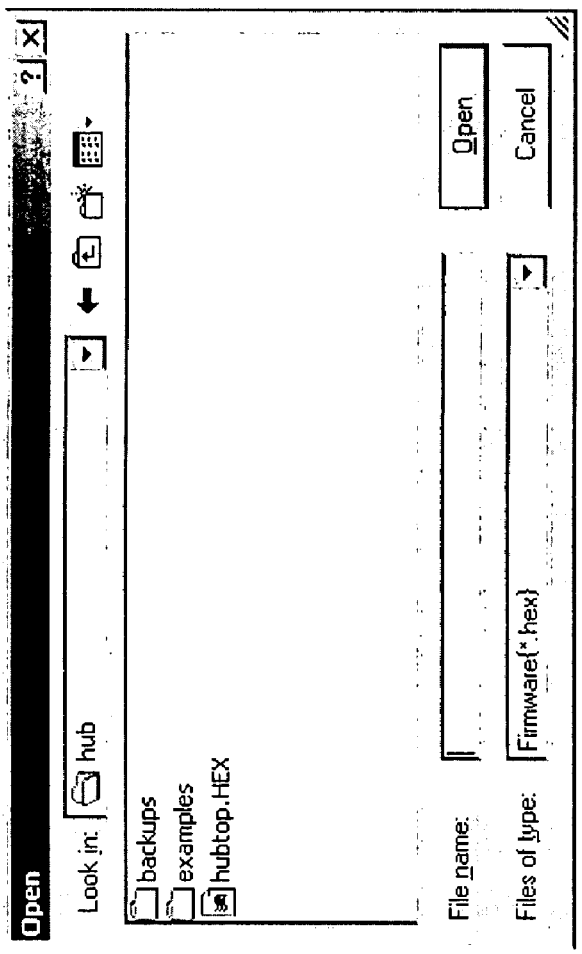
Figure 38:
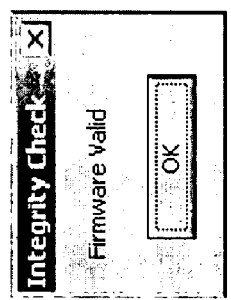

The UI enables the user to update the firmware on the power hub, as indicated by FIG. 36. The UI enables the user to select from an open firmware option and a download firmware option. The open firmware option may be used to locate a file that is to be installed, as indicated in FIG. 37. The user selects the file to be opened, and the contents of the file are checked for integrity. If the integrity check is successful, an integrity check window appears and identifies the firmware as being valid, as indicated in FIG. 38. When the user selects the "OK" button from the integrity check status window, the firmware is opened and downloaded.

Figure 39:
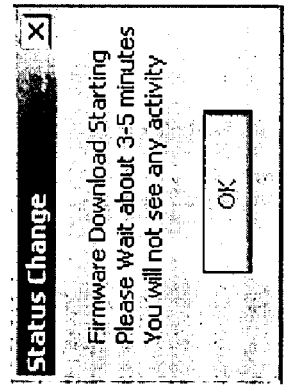
Figure 40:
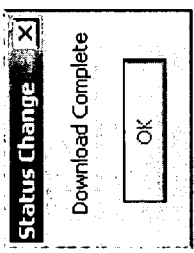

If the user selects the download firmware option from the display of FIG. 36, a status change window is generated indicating that the firmware download is starting, as depicted in FIG. 39. If the download process is successful, a status change window is generated indicating that the download is complete, as depicted in FIG. 40.

When the firmware has been downloaded, the user may select the reset on the power hub or cycle the power supply for the power hub by disconnecting the power supply from the power hub and reconnecting it. The user may relaunch the UI if desired.

Figure 41:
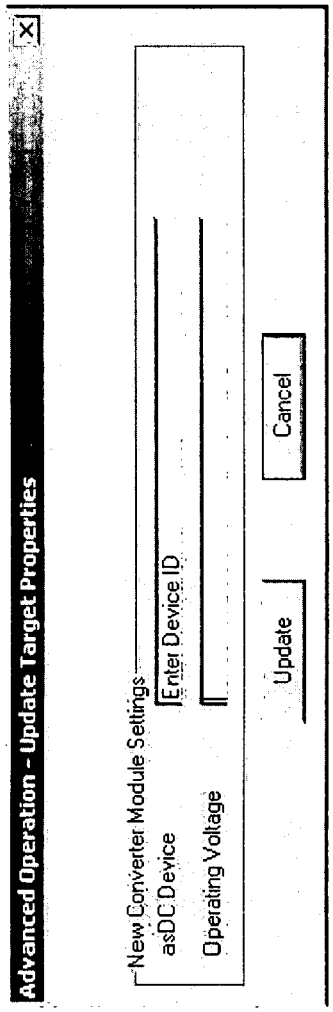
Figure 42:
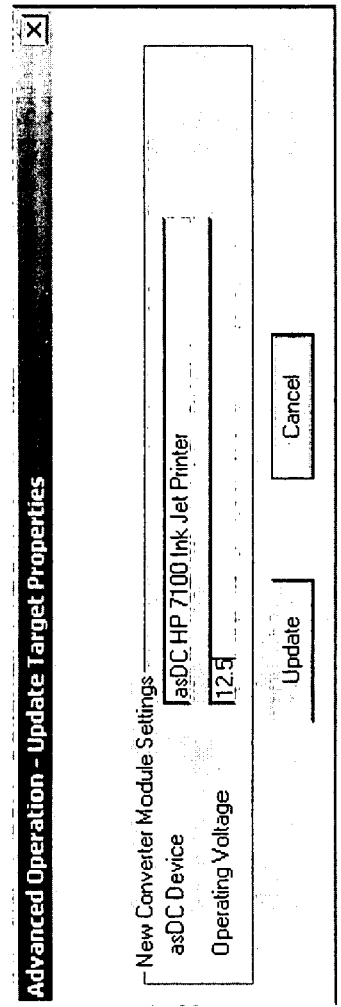
Figure 43:
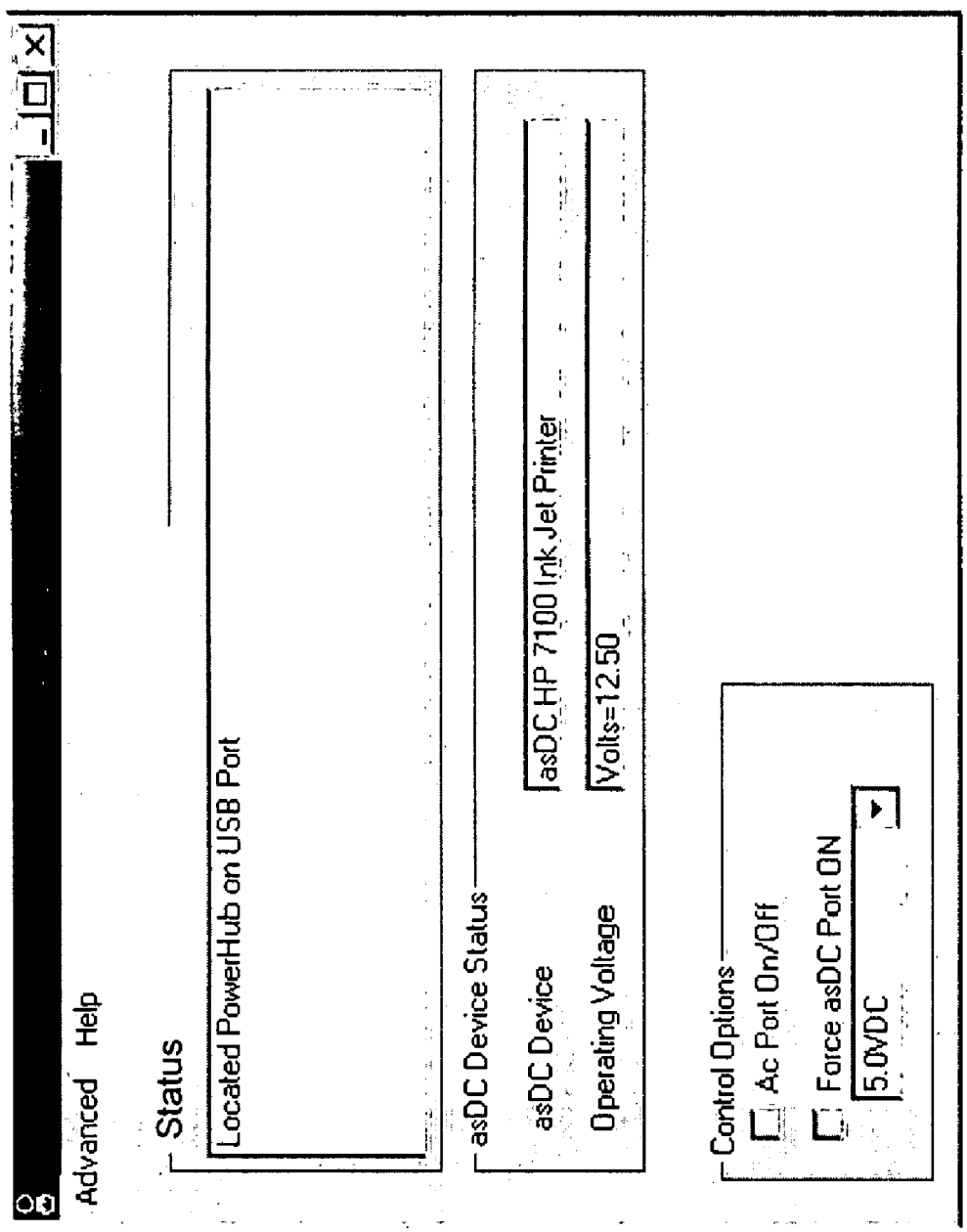

A third option from the advanced menu option from FIG. 36 enables a user to change a target configuration of an asDC enabled device. When the user selects the change target configuration option from the menu, an update target properties window is generated for display, as depicted in FIG. 41. The user enters new values for the asDC device name and its operating voltage, as depicted in FIG. 42. When the asDC device is connected to the power hub, the power hub recognizes the device and its required operating voltage, as depicted in FIG. 43.

Figure 44:
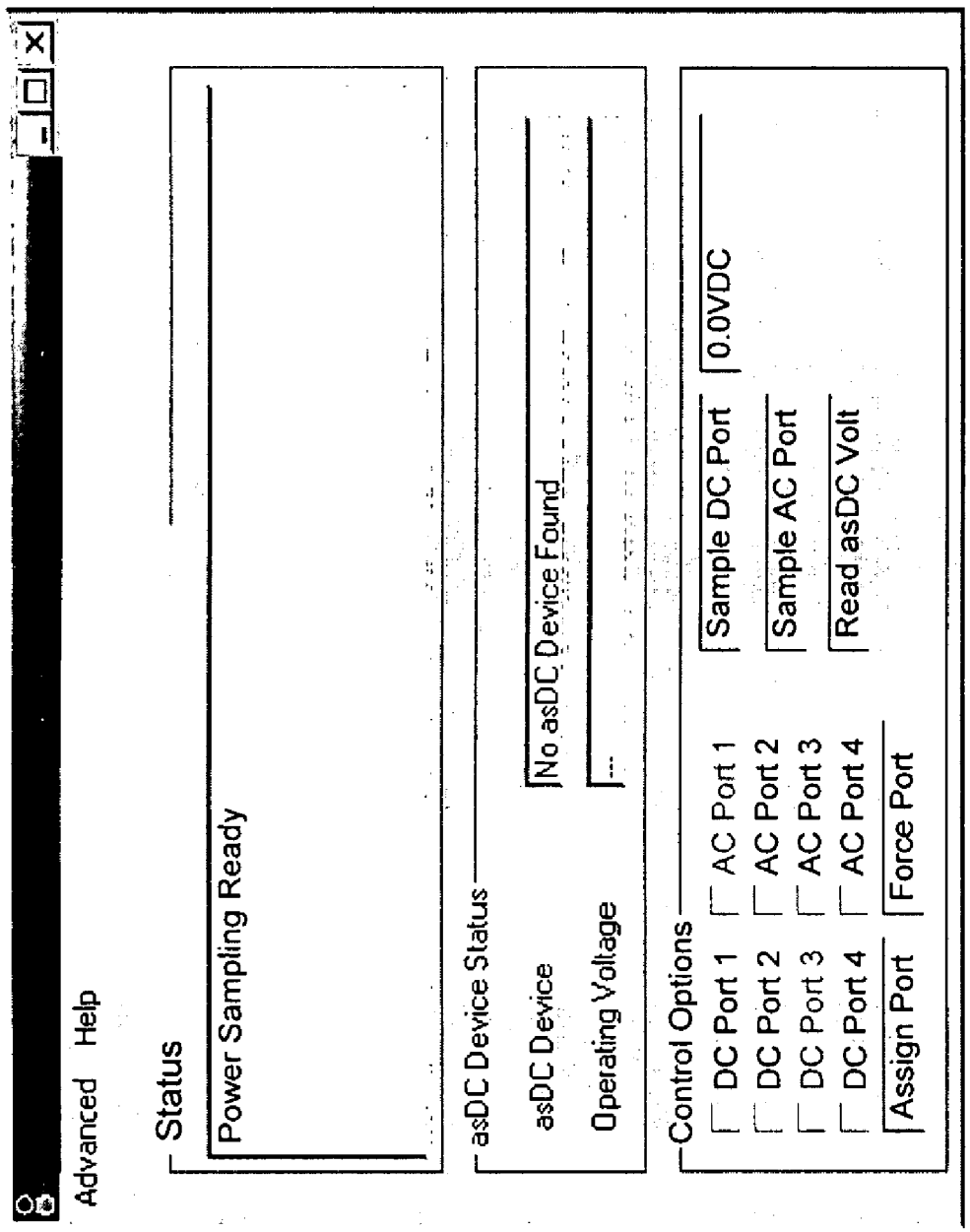

FIGS. 44-58 depict examples of user screens for a power sampling system. In the example of FIG. 44, four AC receptacles (ports) and one four DC receptacles (ports) are identified for operation and control. Each port has an associated check box for selecting that port. Once selected, the port may be assigned a power level, force to a power level, or enabled or disabled.

The UI also includes a status window or frame for identifying the status or operations of the system. Operations of the power sampling and logging is generated to the status frame. Operations of the automatic sensing and other functions of the system also are generated to the status frame.

The UI may include one or more selection or operation buttons for initiating an action or operation. Some embodiments include a Sample Port button that initiates the power sampling operation for one or more power sampling ports. Some embodiments include a separate Sample AC Port for sampling one or more AC receptacles and a separate Sample DC Port for sampling one or more DC receptacles. A Read asDC Voltage (Volt) button initiates communication between the ASPS and the electrical device to determine the power requirements for the electrical device. An Assign Port button assigns a sampled power or an AS DC determined voltage to a particular selected port. A Force Port button forces a selected port on or off. The Force Port button also forces a selected DC port to a power value entered in the entry box.

An Auto Sample check box enables and disables an automatic (auto) sample feature configured to automatically detect and sample power requirements for a device, including a transformer, connected to a power sampling receptacle. An Auto Assign button enables and disables an automatic assignment feature that automatically assigns a sampled power to a default receptacle (port), such as the next lowest numbered receptacle. An ASDC Device Status frame shows the AS DC determined voltage and a name for the AS DC determined device. A Power Box shows the sampled power. An entry box, drop down box, or other entry mechanism enables a user to enter a name or other identifier for a power sampled device. The name or other identifier may be assigned to a receptacle (port) with an Assign Name button or other button or operation.

Figure 45:
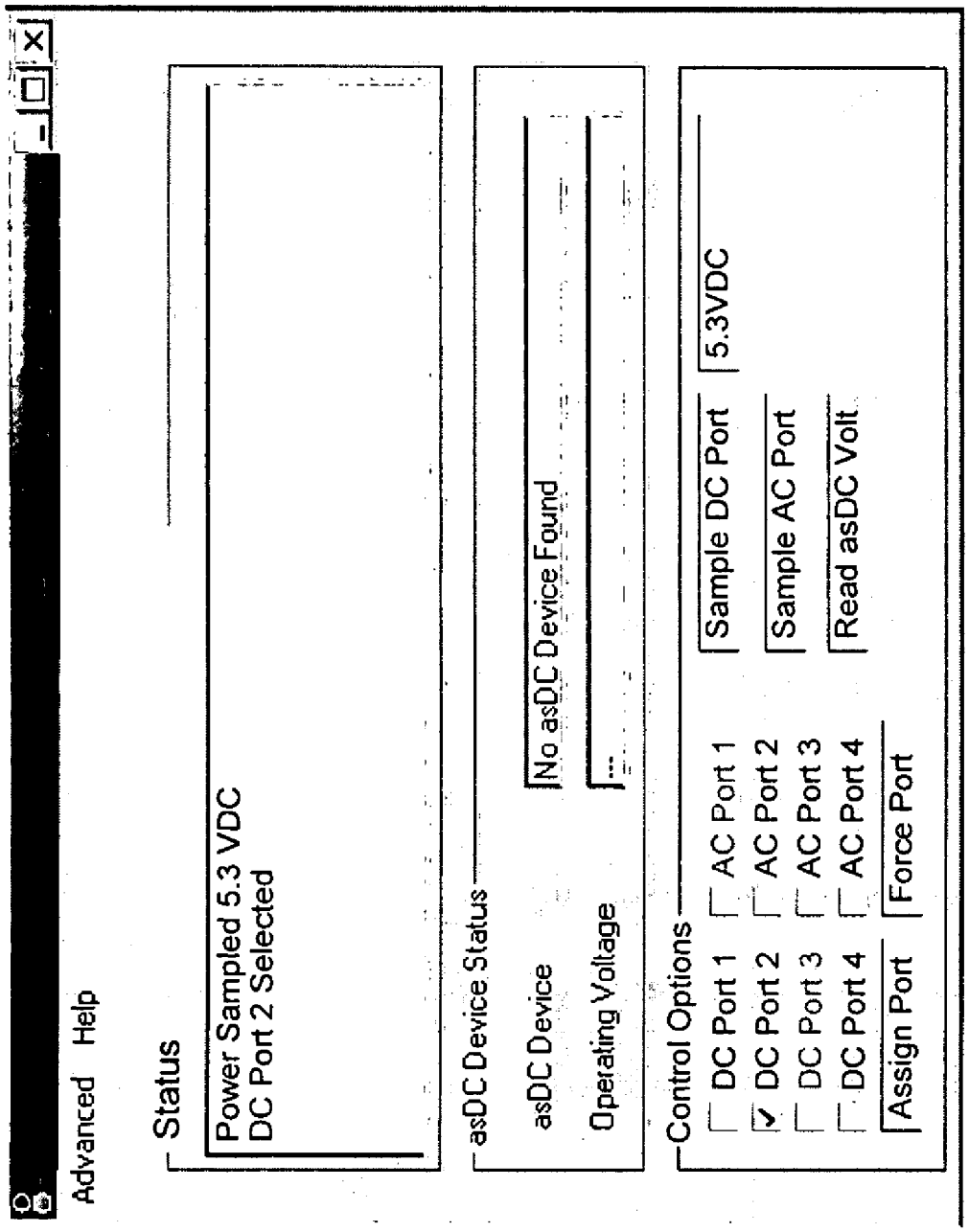
Figure 46:
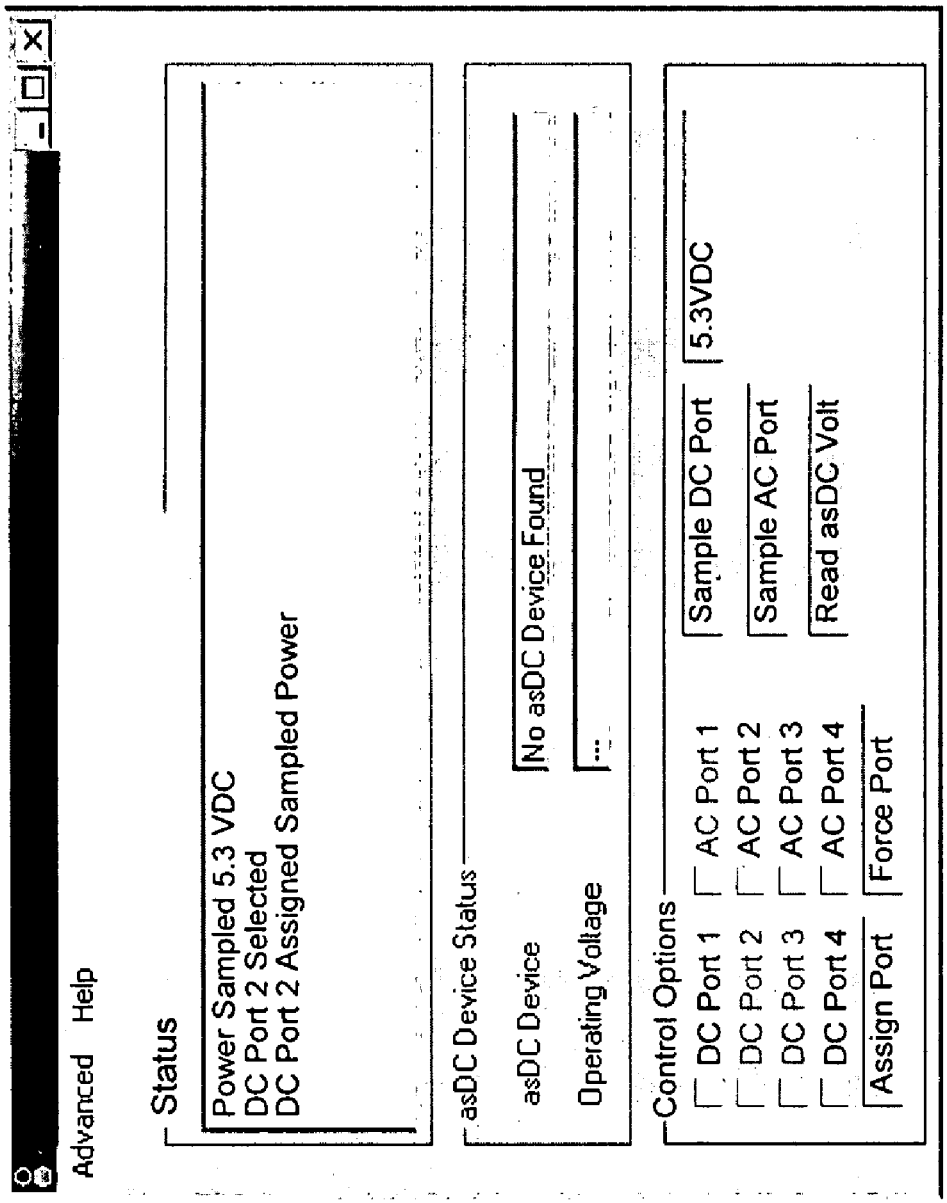

FIGS. 44-46 depict an exemplary embodiment of user interface screens having a separate Sample DC Port and Sample AC Port buttons. In this example, the system is ready to sample power requirements of an electrical device, as depicted in FIG. 44. The user selected the Sample AC Port button, and the system samples the power requirements of the electrical device. The power requirements are shown in the Power Box as 5.3 volts DC (VDC), the user selects the check box for DC Port 2 to receive the power requirements identified by the sampled power, and the Status Frame indicates the user selected DC Port 2 to receive power required for the sampled power, as depicted in FIG. 45. The user selects the Assign Port button, DC Port 2 is assigned 5.3 VDC as its output power, and the Status Frame indicates DC Port 2 was assigned the sampled power, as depicted in FIG. 46.

In the example of FIG. 46, once the selected DC port is assigned for output of power requirements, the name of the port is grayed out to indicate it is assigned or in use. Similarly, if an AC port is forced off, the name of the AC port is grayed out to indicate it is off. Therefore, in the example of FIG. 46, after the DC Port 2 is assigned, the name of DC Port 2 is grayed out to indicate it is assigned. DC Port 3 already was grayed out to indicate it was assigned. AC Port 1 is grayed out to indicate it is off. These features are optional. Other features may be used to indicate a port is off, on, assigned, or in use. Alternately, such features are not used.

Figure 47:
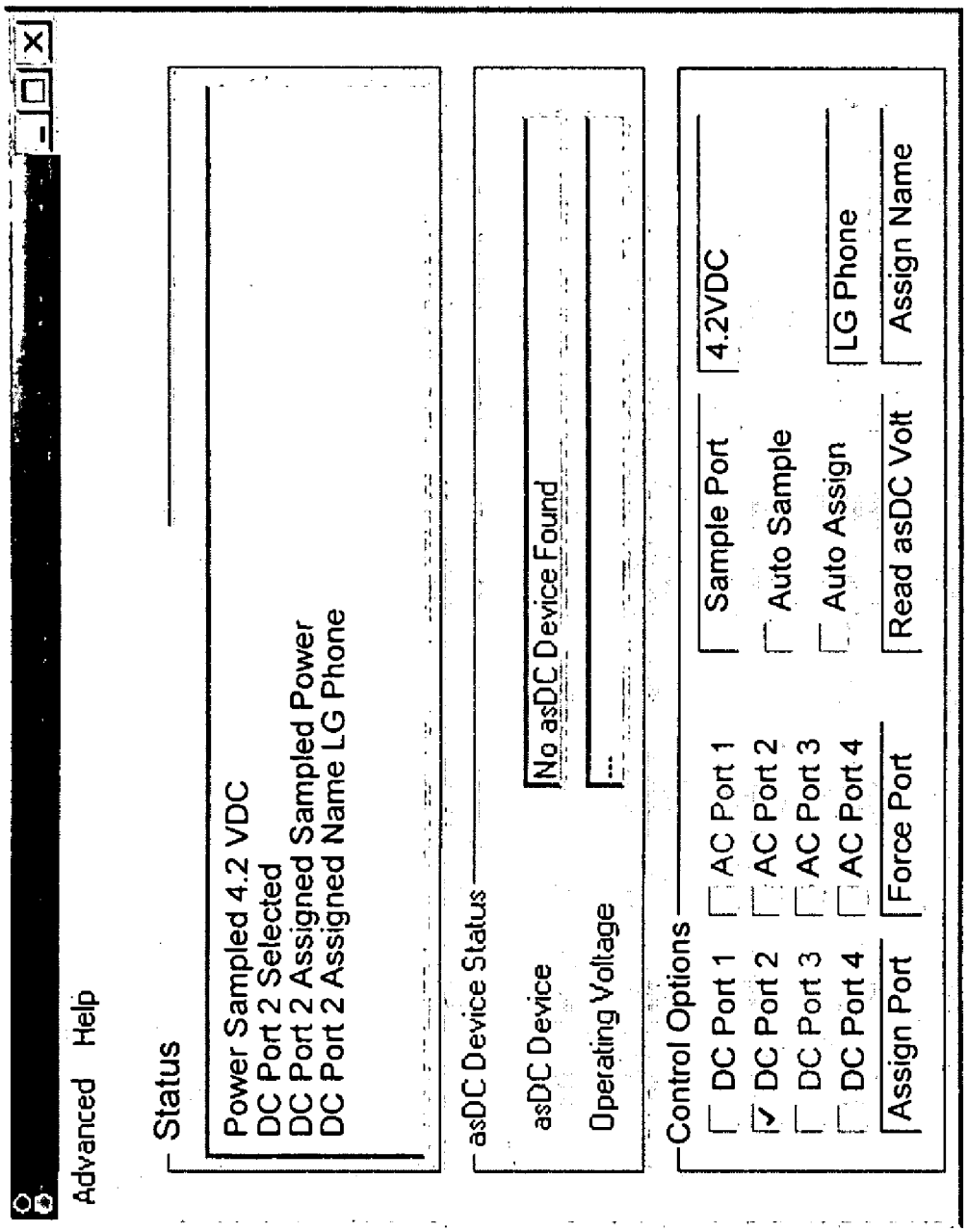
Figure 48:
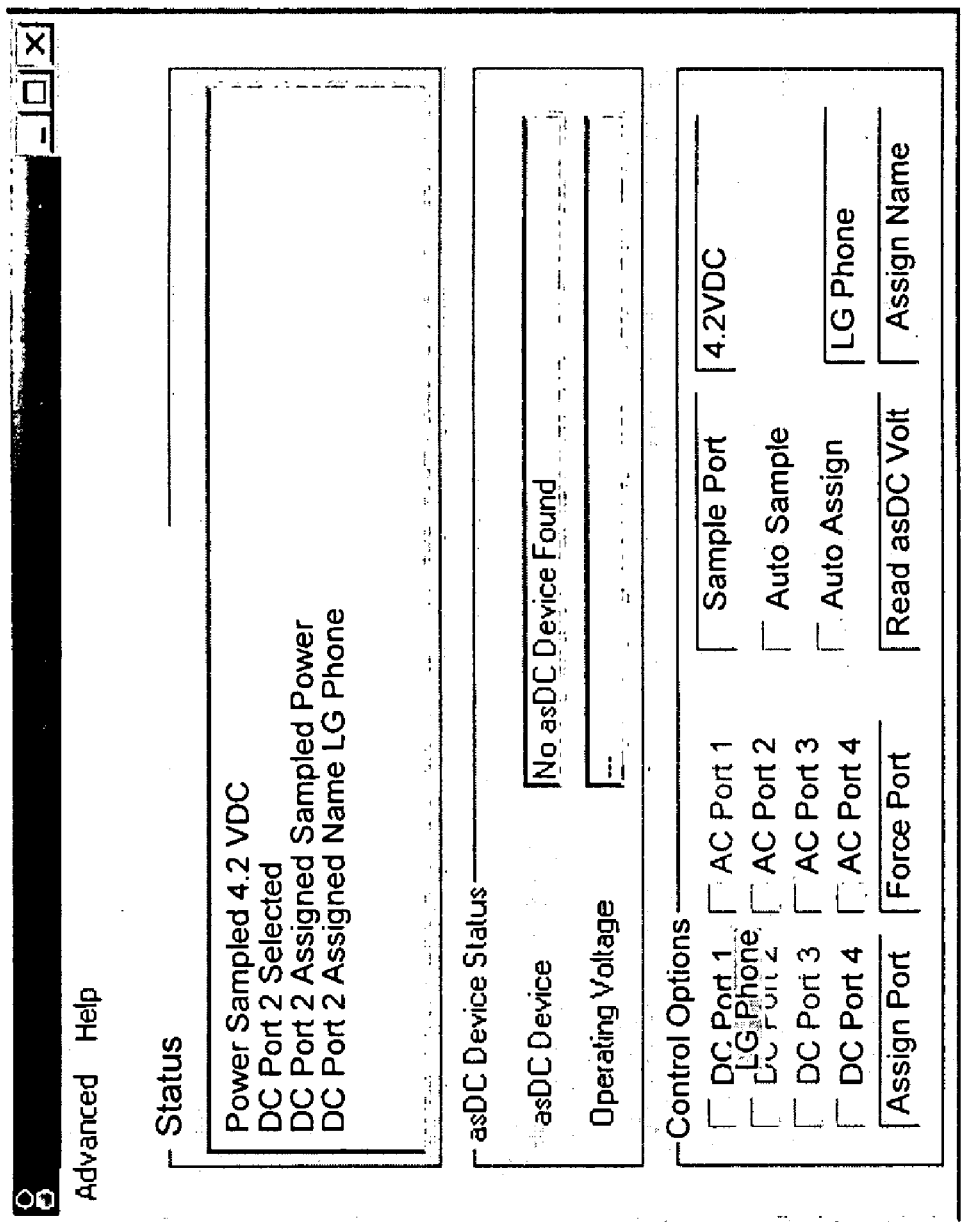
Figure 49:
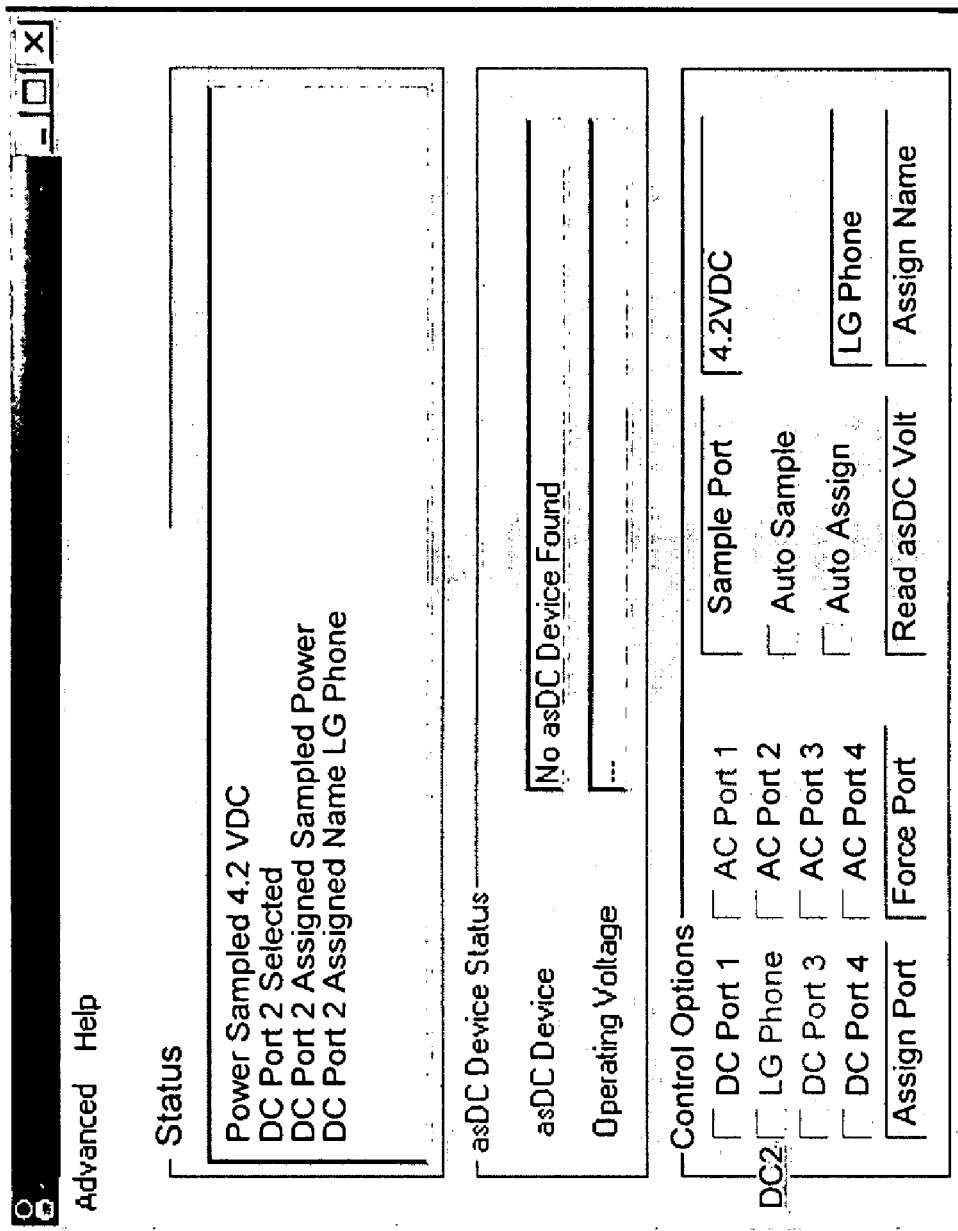

FIGS. 47-49 depict an exemplary embodiment of user interface screens having a single Sample Port button, a Power Box to show the sampled power, an Auto Sample button, an Auto Assign button, an Entry Box to enter the name or identifier of the sampled device, and an Assign Name button to assign the entered name or identifier to the DC Port selected to receive the sampled power. In this example, the Auto Sample and Auto Assign options are not selected.

As depicted in FIG. 47, the user selected the Sample Port button, and the system samples the power requirements of the electrical device. The power requirements are shown in the Power Box as 4.2 VDC, the user selects the check box for DC Port 2 to receive the power requirements identified by the sampled power, the Status Frame indicates the user selected DC Port 2 to receive power required for the sampled power. The user selects the Assign Port button to assign the sampled power to DC Port 2, DC Port 2 is assigned 4.2 VDC as its output power, and the Status Frame indicates DC Port 2 was assigned the sampled power. The user enters a name or identifier of LG Phone for the selected DC port to identify the sampled device and selects the Assign Name button to assign the name to DC Port 2. DC Port 2 is assigned the name or identifier of LG Phone, and the Status Frame indicates DC Port 2 was assigned the name LG Phone.

FIGS. 48 and 49 depict optional examples of name or identifier assignments for ports. In the example of FIG. 48, the name or identifier assigned to DC Port 2 is displayed when the user places the pointer over the DC Port 2 identifier, such as with a mouse, pointer, or other device. In the example of FIG. 49, the identifier for DC Port 2 is replaced by the name LG Phone, which is the identifier assigned to DC Port 2. The name DC Port 2 is displayed when the user places the pointer over the name LG Phone.

Figure 50:
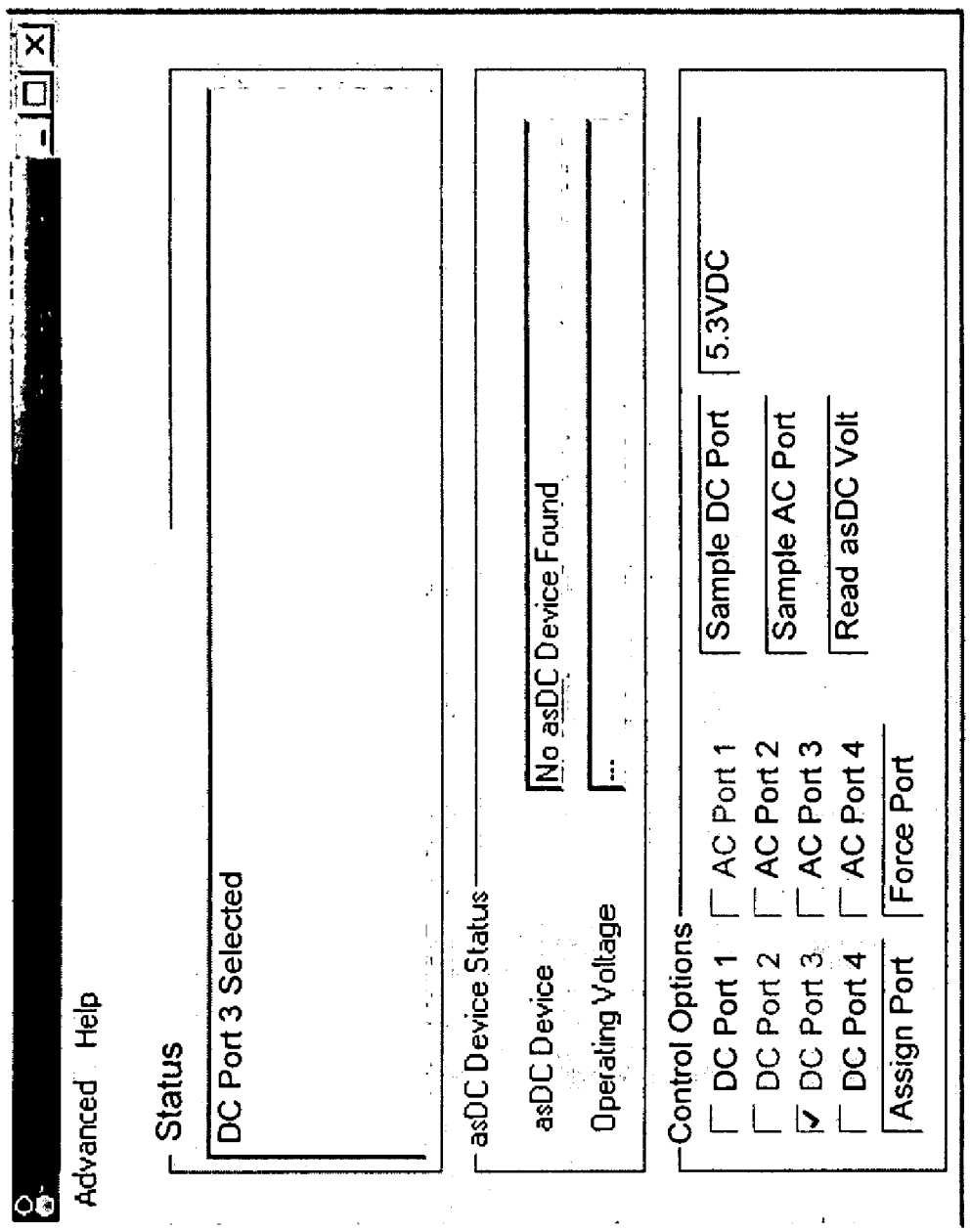
Figure 51:
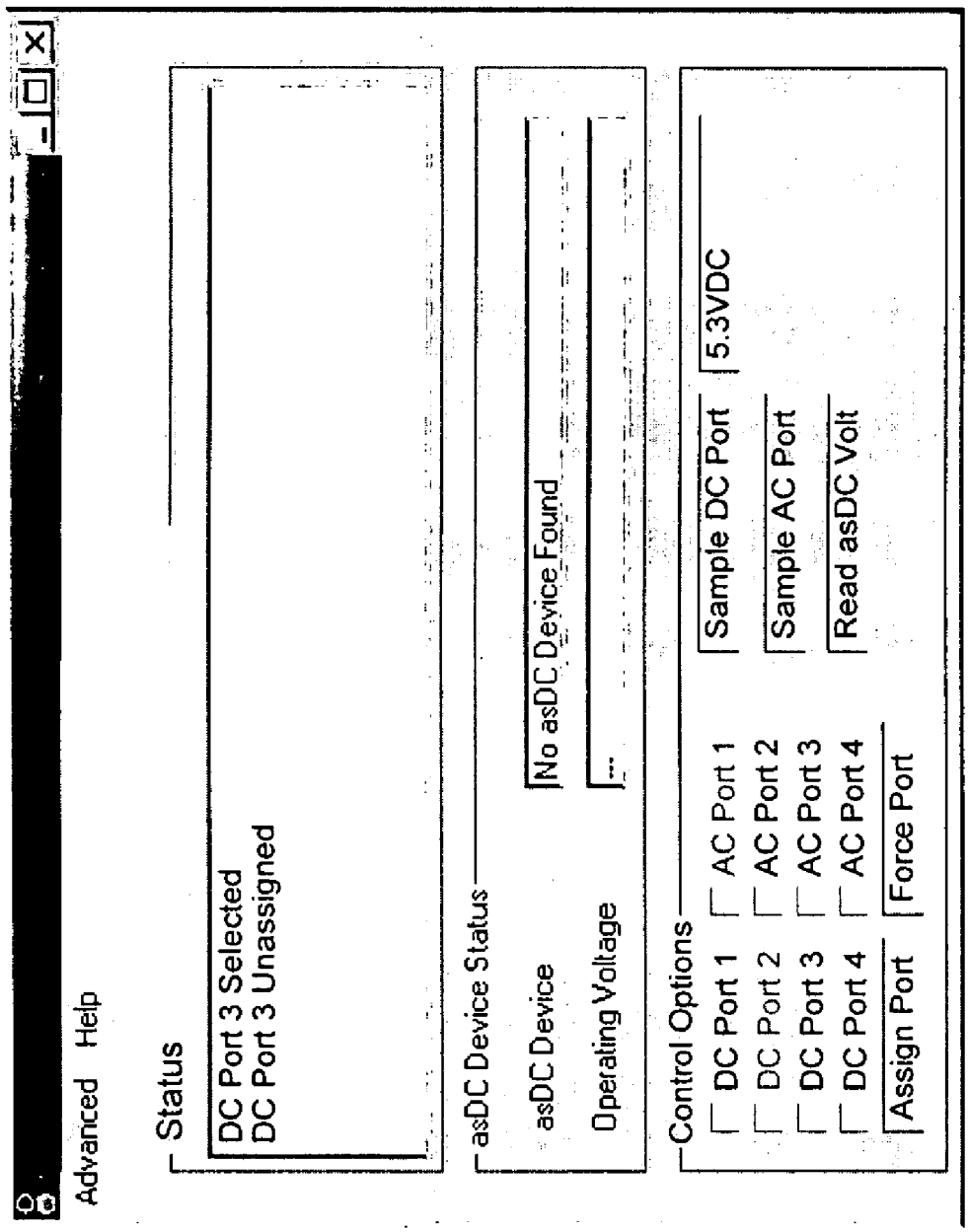

FIGS. 50-51 depict an example of un-assigning a DC Port. In these examples, a DC Port was assigned a sampled voltage or an AS DC determined voltage, and the user un-assigns that port. As shown in FIG. 50, the user selects assigned DC Port 3, and the Status Frame indicates DC Port 3 is selected. As shown in FIG. 51, the user selects the Force Port button, the Status Frame indicates that DC Port 3 is unassigned, and DC Port 3 is no longer grayed out.

Figure 52:
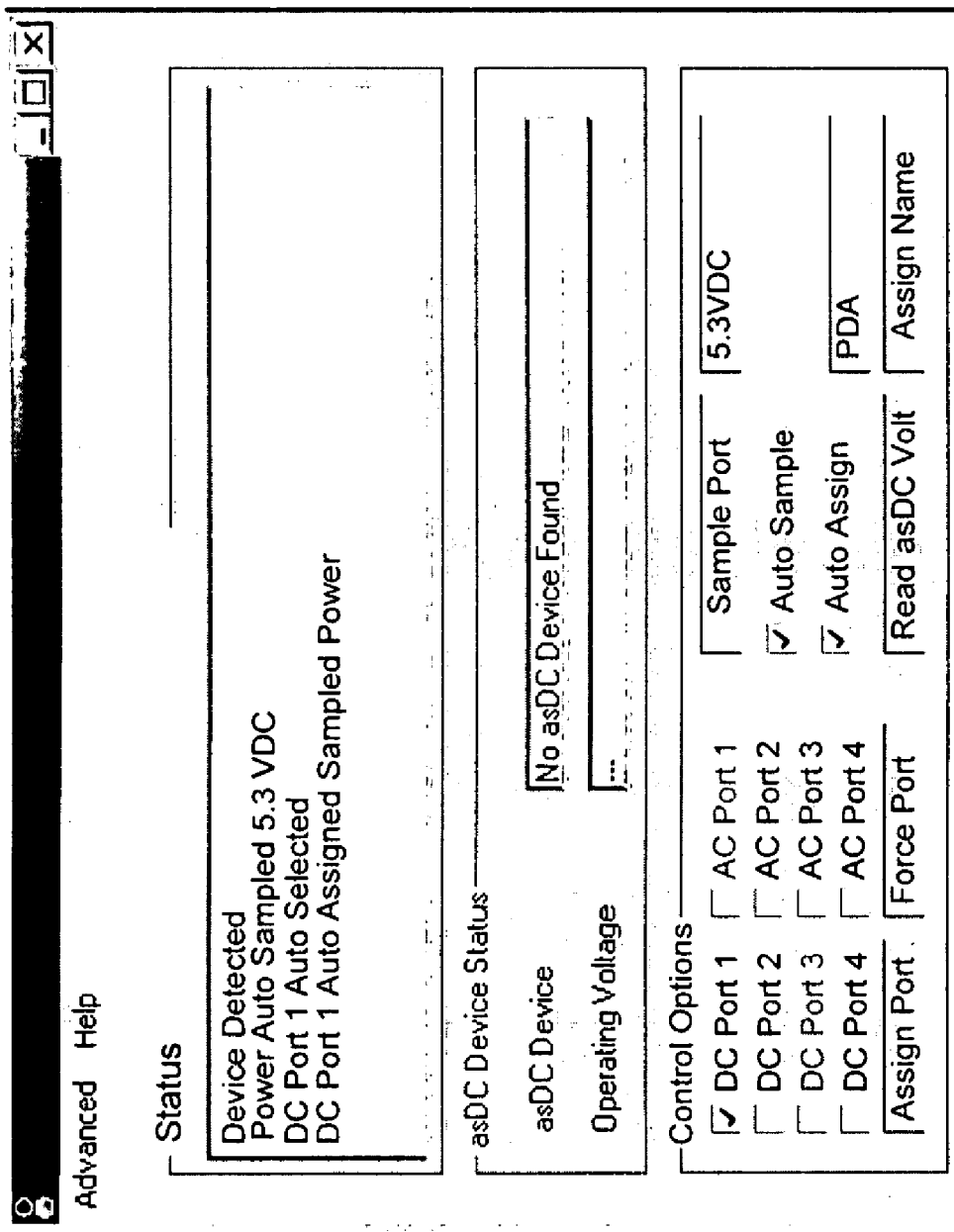
Figure 53:
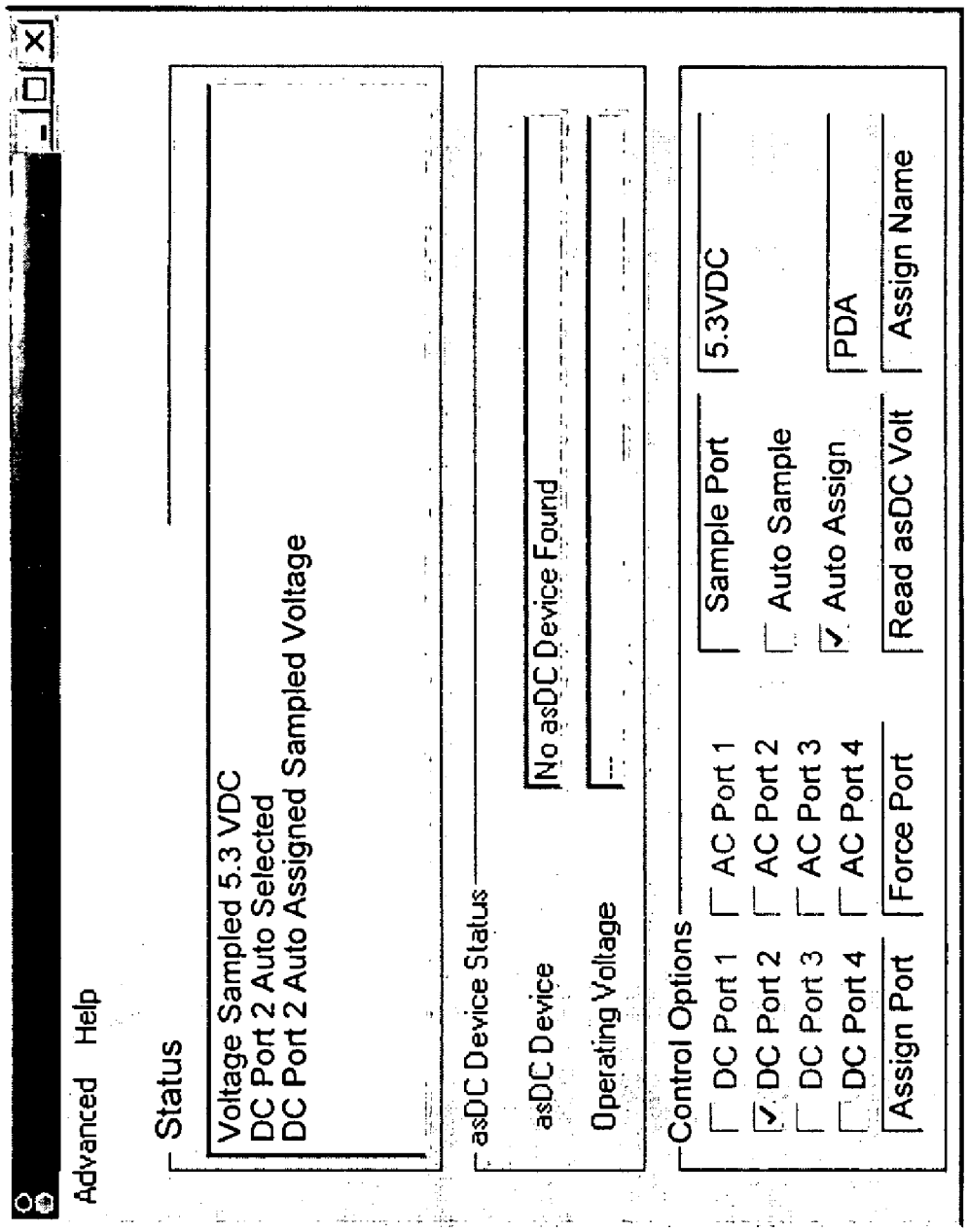

FIGS. 52-53 depict an example of the Auto Sample and Auto Assign features. As shown in FIG. 52, the Auto Sample and Auto Assign features are selected and on. As indicated in the Status Frame, the system detects a device connected to a power sampling receptacle, samples the device, determines the device requires 5.3 VDC, automatically selects the first open DC Port (DC Port 1), and assigns the sampled power to the selected DC Port. Another default selection and assignment may be used.

As shown in FIG. 53, the Auto Sample feature is not selected and is not on, and the Auto Assign feature is selected and is on. The user selects the Sample Port button. As indicated in the Status Frame, the system samples a device connected to a power sampling port, determines the device requires 5.3 VDC, automatically selects the first open DC Port (DC Port 2), and assigns the sampled power to the selected DC Port. Another default assignment may be used.

Figure 54:
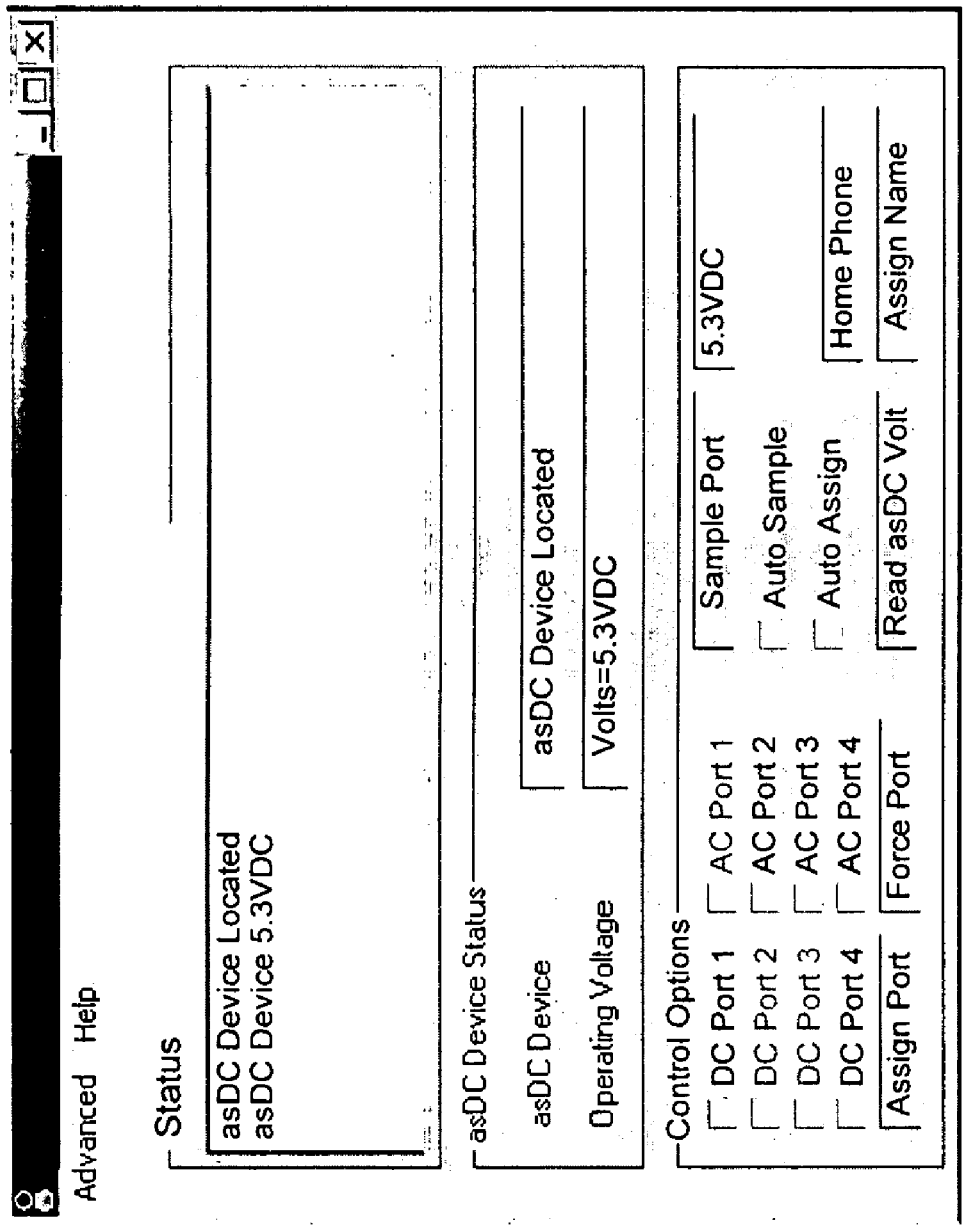

FIG. 54 depicts an example of manually configuring the system to communicate with an AS DC enabled device. The user selects the Read asDC Volt button. The Status Frame indicates that an asDC Device is located, and the device requires 5.3VDC. 5.3VDC also is identified in the Power Box and the Operating Voltage Box of the asDC Device Status Frame. The user may then assign the AS DC determined voltage to DC Port 1 or DC Port 4 and assign a name to the assigned port.

Figure 55:
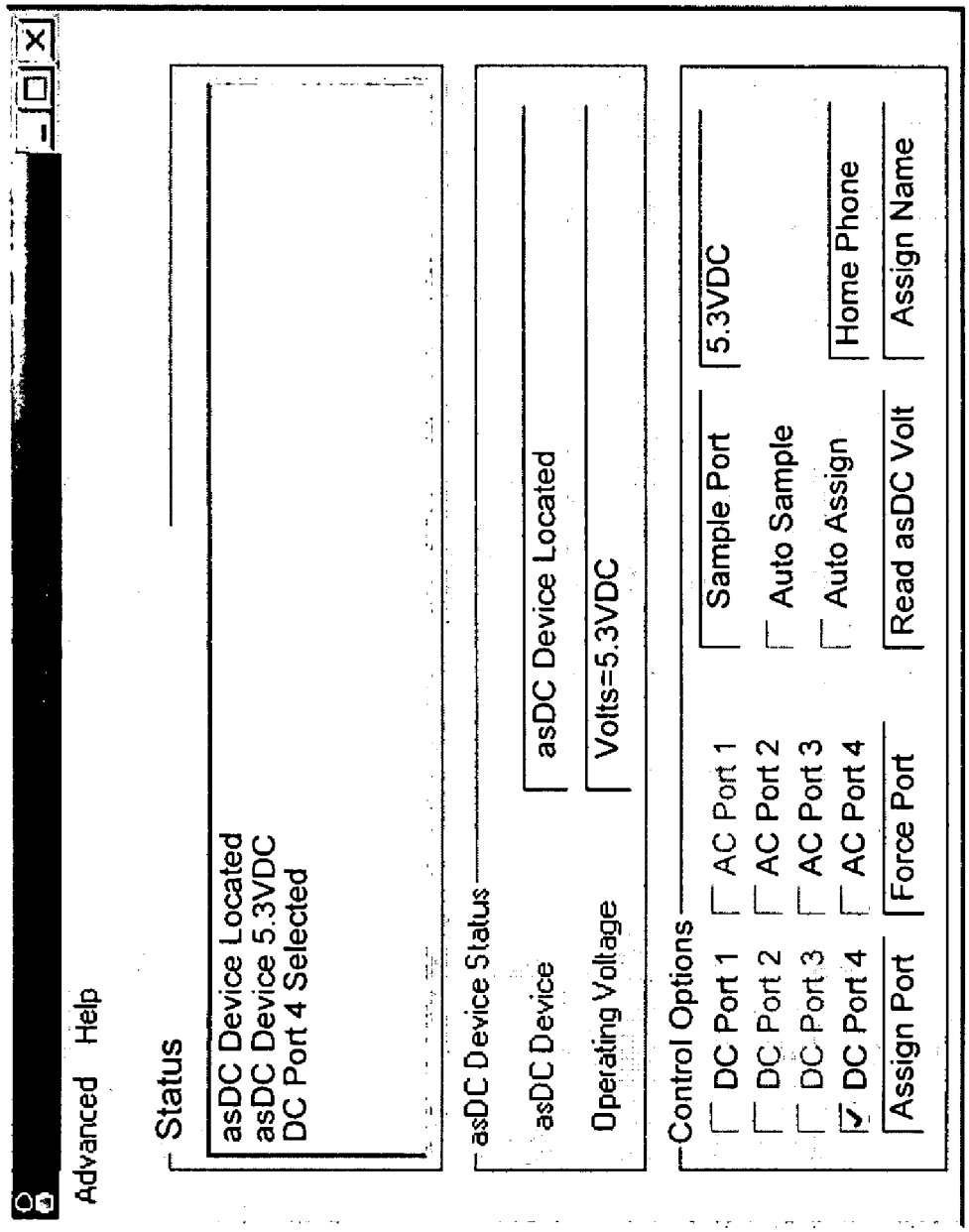
Figure 56:
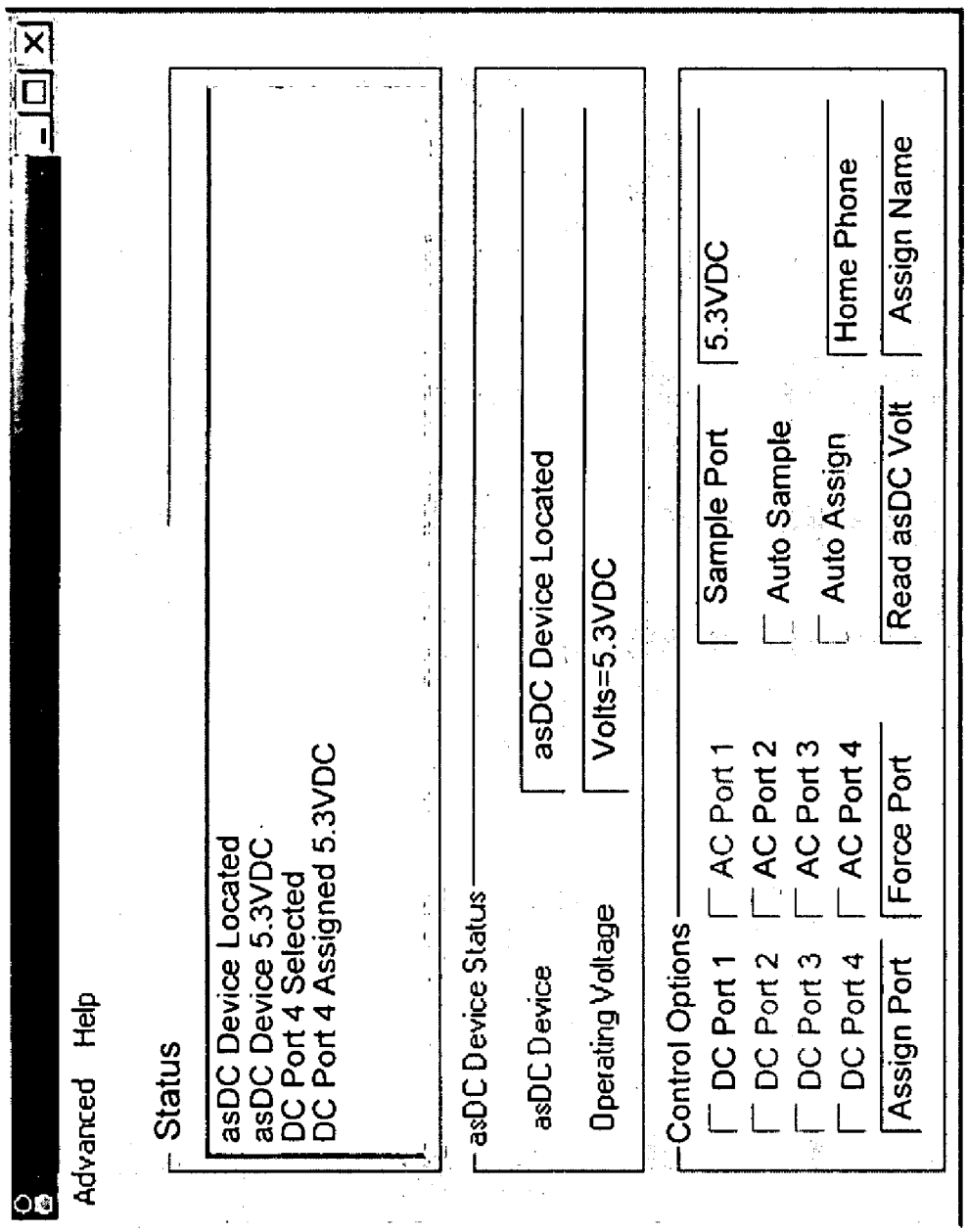

FIGS. 54-56 depicts an example of configuring the system to communicate with an AS DC enabled device to determine the power requirements of the AS DC enabled device. As shown in FIG. 54, the user selects the Read asDC Volt button. The Status Frame indicates that an asDC Device is located, and the device requires 5.3VDC. 5.3VDC also is identified in the Power Box and the Operating Voltage Box of the asDC Device Status Frame. As shown in FIG. 55, the user selects open DC Port 4 to receive the AS DC determined voltage, and the Status Frame indicates that DC Port 4 is selected. As shown in FIG. 56, the user selects the Assign Port button to assign the AS DC determined voltage to DC Port 4, and DC Port 4 is grayed out. The user also may assign a name to the DC Port 4 if desired.

Figure 57:
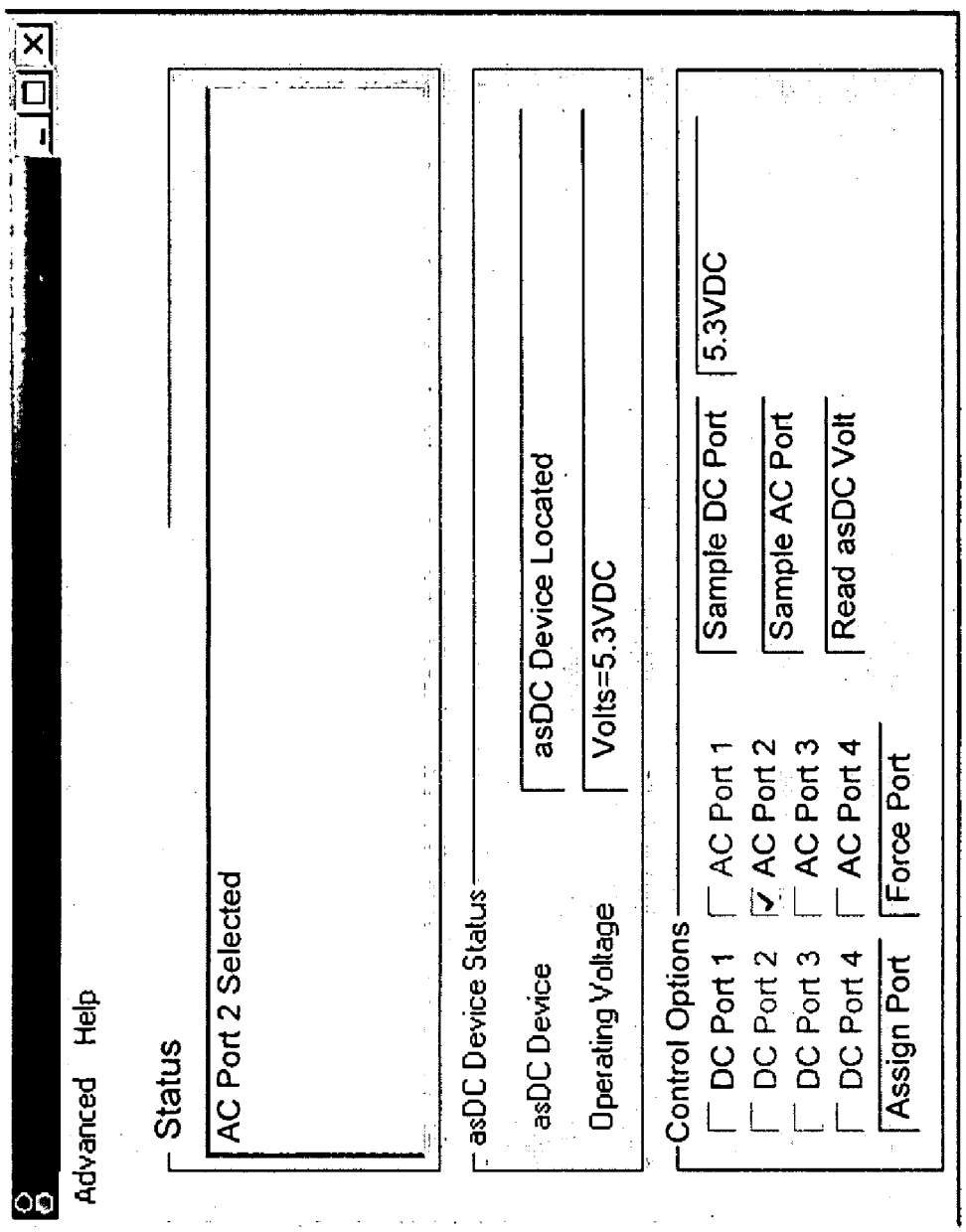
Figure 58:
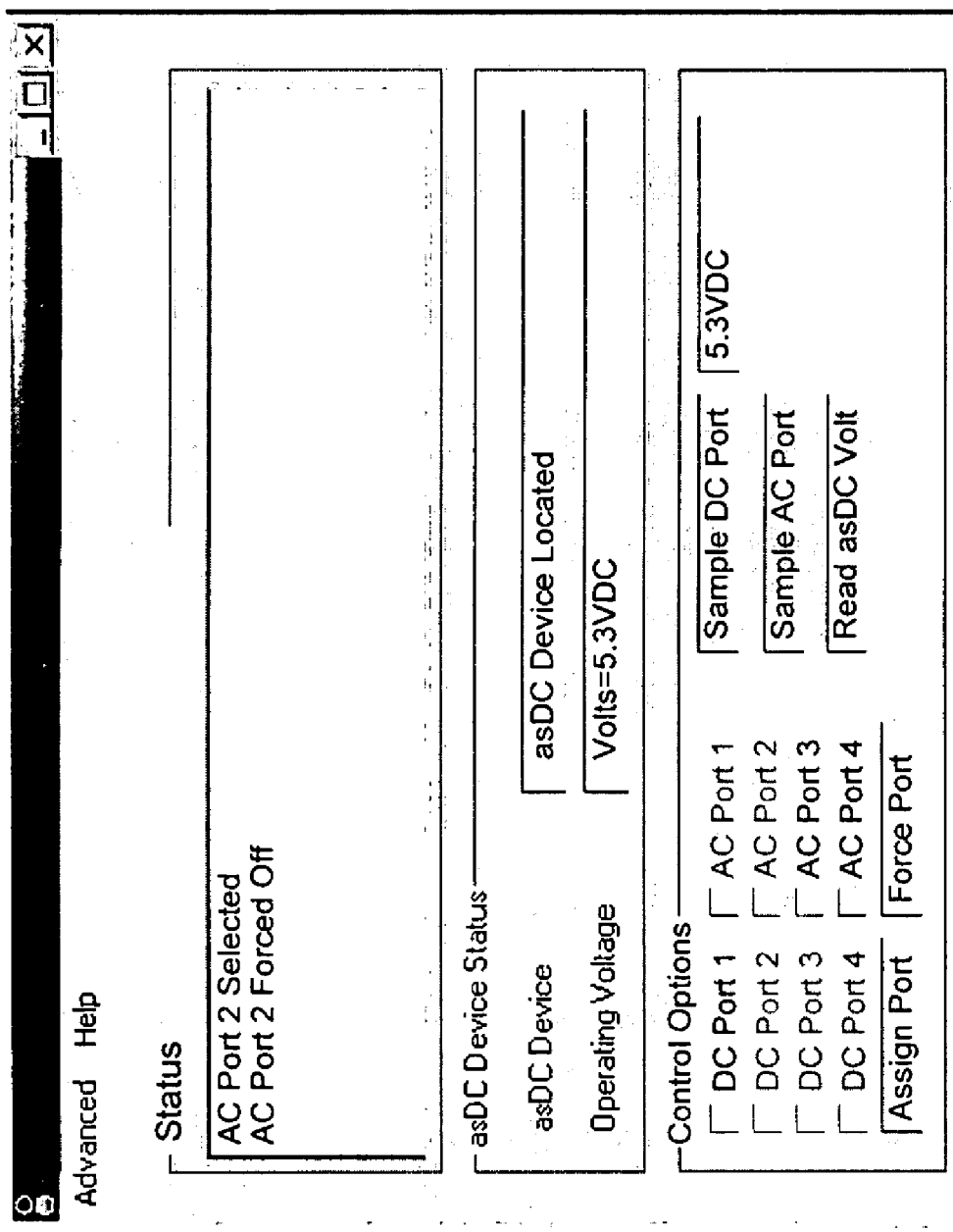

FIGS. 57-58 depict an example of forcing a port off. As shown in FIG. 57, AC Port 2 is selected. As shown in FIG. 58, the user selects the Force Port button, and the Status window indicates AC Port 2 is forced off. AC Port 2 also is grayed out.

FIGS. 59-63 depict exemplary embodiments of power sampling systems 1034A-1034E.

FIG. 59 depicts an exemplary embodiment of a power sampling system 1034A connected to a power sampling receptacle 1036. The power sampling system 1034A includes a detector 5902 configured to receive the power from the receptacle 1036. The detector 5902 converts the received power to a DC form processable by the processor 1002A. The processor 1002A receives the DC converted signal and determines the power requirements.

FIG. 60 depicts an exemplary embodiment of a power sampling system 1034B. An AC power sampling receptacle 1036 receives AC power. An AC/DC converter 6004 converts the received AC power to a DC power level. A detector 6006 detects various power levels of the DC signals and transmits the various power levels to the processor 1002B. The processor 1002B receives the DC signals indicating the various power levels and determines the power levels corresponding to the sampled power requirements. In some instances, the detector 6006 is optional, and the processor 1002B receives the DC signals directly from the AC/DC converter 6004.

FIG. 61 depicts an exemplary embodiment of a power sampling system 1034C. An AC power sampling receptacle 1036 receives AC power. An optional DC receptacle 6102 receives DC power. An AC/DC converter 6004 converts the received AC power to a DC power level. Optionally, the AC/DC converter may transmit the converted AC/DC power to the DC/DC converter 6104 for further down conversion. Otherwise, the AC/DC converter transmits the converted power to a detector 6006. Optionally, the DC receptacle 6102 may transmit the DC power to a DC/DC converter 6104 for further down conversion. Otherwise, the DC receptacle 6102 transmits the DC power to a detector 6006. The DC/DC converter 6104 down converts the DC power to a lower DC power level and transmits the lower DC power level to the detector 6006. The detector 6006 detects various power levels of the DC signals and transmits the various power levels to the processor 1002C. The processor 1002C receives the DC signals from the detector 6006 indicating the various power levels and determines the power levels corresponding to the sampled power requirements.

FIG. 62 depicts an exemplary embodiment of a power sampling system 1034D. An AC power sampling receptacle 6002 receives AC power. A DC receptacle 6102 receives DC power. An AC/DC converter 6004 converts the received AC power to a DC power level. Optionally, the AC/DC converter may transmit the converted AC/DC power to the DC/DC converter 6104 for further down conversion. Otherwise, the AC/DC converter transmits the converted power to a detector 6006. The DC receptacle 6102 transmits the DC power to a DC/DC converter 6010 for further down conversion. The DC/DC converter 6010 down converts the DC power to a lower DC power level and transmits the lower DC power level to the detector 6006. The detector 6006 detects various power levels of the DC signals and transmits the various power levels to the processor 1002D. The processor 1002D receives the DC signals from the detector 6006 indicating the various power levels and determines the power levels corresponding to the sampled power requirements.

FIG. 63 depicts an exemplary embodiment of a power sampling system 1034E. A power sampling receptacle 1036 receives the power to be sampled. A rectifier 6302 converts the received power to a DC value signal, a filter 6304 smoothes the DC signal, an operational amplifier 6306 converts the voltage to a lower DC value, and the processor 1002E processes the received value. Since the operational amplifier 6306 converts the DC signal by a known factor, the signal received by the processor 1002E is a known factor.

The processor 1002C receives the DC signals from the detector 6006 indicating the various power levels and determines the power levels corresponding to the sampled power requirements.

Those skilled in the art will appreciate that variations from the specific embodiments disclosed above are contemplated by the invention. The invention should not be restricted to the above embodiments, but should be measured by the following claims.

What is claimed is:

1. A system for configuring alternating current (AC) power comprising:
    a power system comprising:
        a plurality of direct current (DC) receptacles;
        at least one AC to DC regulator configured to convert the AC power to DC power;
        a power sampling system configured to sample a DC power level from at least one power sampling receptacle and to generate a signal comprising sampling data that, when processed, identifies the sampled DC power level;
        at least one DC to DC regulator configured to receive the DC power from the AC to DC regulator, to convert the DC power to the sampled DC power level, and to generate the DC power at the sampled DC power level for at least one DC receptacle, the sampled DC power level not initially preset, the sampling receptacle and the at least one DC receptacle being separate receptacles;
        a processor configured to process the signal and, in response thereto, determine the sampled DC power level and configure the at least one DC to DC regulator to convert the DC power to the sampled DC power level; and
        a user interface configured to generate for display an identification of the sampled DC power level wherein the user interface is configured to enable initiating sampling the DC power level from the at least one power sampling receptacle in response to a user input.

2. The system of claim 1 wherein:
    the power system further comprises a plurality of AC receptacles configured to convey the AC power at an AC power level; and
    the user interface is configured to enable selecting the at least one power sampling receptacle from the group consisting of the plurality of DC receptacles and the plurality of AC receptacles.

3. The system of claim 2 wherein the at least one power sampling receptacle is selected from the plurality of DC receptacles and.

4. The system of claim 1 wherein the user interface is configured to generate for display status information of the power system, the status information selected from a group consisting of an operation of the power system, an event log of the power system, a disable of the least one power sampling receptacle, an enable of the at least one power sampling receptacle, a disable of the at least one DC receptacle, an enable of the at least one DC receptacle, a state of the at least one power sampling receptacle, a power level sampled by the at least one power sampling receptacle, a power setting for the at least one DC receptacle, and a device identification received for an electrical device.

5. The system of claim 1 wherein the user interface is configured to enable selecting the at least one DC receptacle at which to generate the DC power at the sampled DC power level.

6. The system of claim 1 wherein the user interface is configured to enable and disable the at least one DC receptacle.

7. The system of claim 1 wherein the user interface is configured to enable detecting a connection between the at least one power sampling receptacle and an electrical device and to enable automatically initiating sampling of the DC power level from the at least one power sampling receptacle upon detecting the connection, and wherein the electrical device comprises at least one member of a group consisting of a computer, a printer, a fax machine, a pocket PC, a personal digital assistant, a phone, a camera, a recording device, an audio device, a video device, and a drill.

8. The system of claim 7 wherein the user interface is configured to receive a user input assigning a name to a connected electrical device and to generate for display the name of the connected electrical device.

9. The system of claim 8 wherein:
    the power sampling system is configured to generate a second signal comprising other sampling data that, when processed, identifies whether the connected electrical device is power sensing enabled;
    the processor is configured to process the second signal and, in response thereto, determine whether the electrical device is power sensing enabled; and
    the user interface is configured to:

generate for display an indication that the connected electrical device is an enabled power sensing device when the electrical device is determined to be power sensing enabled; and generate for display an indication that the connected electrical device is not an enabled power sensing device when the electrical device is determined not to be power sensing enabled.

10. The system of claim 1 wherein:

the user interface is configured to receive user input defining a desired DC power level; and the processor is configured to process the user input and, in response thereto, determine the desired DC power level and configure the at least one DC to DC regulator to convert the DC power to the desired DC power level, and enable the at least one DC to DC regulator to generate the DC power at the desired DC power level for at least one other DC receptacle.

11. The system of claim 1 wherein:

the power system further comprises a plurality of AC receptacles configured to convey the AC power at an AC power level; and the user interface is configured to generate for display a default name for each of the plurality of DC receptacles and each of the plurality of AC receptacles.

12. The system of claim 11 wherein the user interface is configured to receive a user input assigning a different name for at least one receptacle selected from the group consisting of the plurality of DC receptacles and the plurality of AC receptacles and to generate for display the different name assigned to the at least one receptacle.

13. The system of claim 12 wherein the displayed default name or the displayed different name of the at least one receptacle has a first appearance when the at least one receptacles is enabled and has a second appearance when the at least one receptacle is not enabled.

14. The system of claim 1 wherein:

the user interface is further configured to enable automatically assigning the sampled DC power level to a default receptacle when the at least one DC receptacle is not open for a connection to an electrical device;

the power sampling system is configured to generate another signal, that when processed, indicates whether the at least one DC receptacle is open for the connection to the electrical device; and the processor is configured to process the other signal, and in response thereto, determine whether the at least one DC receptacle is open for the connection and enable the at least one DC to DC regulator to generate the DC power at the sampled DC power level for the default receptacle when the at least one DC receptacle is determined not to be open for the connection.

15. A system for configuring alternating current (AC) power comprising:

a power system comprising:
a plurality of direct current (DC) receptacles;
at least one AC to DC regulator configured to convert the AC power to DC power;
a voltage sampling system configured to sample a voltage from at least one voltage sampling receptacle and to generate a signal comprising sampling data that, when processed, identifies the sample voltage;
at least one DC to DC regulator configured to receive the DC power from the at least one AC to DC regulator, to convert the DC power to the sampled voltage and to generate the DC power at the sampled voltage for at least one DC receptacle, the sampled voltage not initially preset, the sampling receptacle and the at least one DC receptacle being separate receptacles;
a processor configured to process the signal and, in response thereto, determine the sampled voltage, and configure the at least one DC to DC regulator to convert the DC power to the sampled voltage; and
a user interface configured to generate for display an identification of the sampled voltage the power system further comprises a plurality of AC receptacles configured to convey AC power at an AC power level; and the user interface is configured to enable selecting the at least one voltage sampling receptacle from the group consisting of the plurality of DC receptacles and the plurality of AC receptacles.

16. The system of claim 15 wherein the at least one voltage sampling receptacle is selected from the plurality of DC receptacles and wherein the user interface is configured to enable sampling the voltage from the at least one voltage sampling receptacle only in response to a user input.

17. The system of claim 15 wherein the user interface is configured to generate for display status information of the power system, the status information selected from a group consisting of an operation of the power system, an event log of the power system, a disable of the at least one voltage sampling receptacle, an enable of the at least one voltage sampling receptacle, a disable of the at least one DC receptacle, an enable of the at least one DC receptacle, a state of the at least one voltage sampling receptacle, a voltage sampled by the at least one voltage sampling receptacle, a voltage setting for the at least one DC receptacle, and a device identification received for an electrical device.

18. The system of claim 15 wherein the user interface is configured to:
enable selecting the at least one DC receptacle at which to generate the DC power at the sampled voltage; and
enable and disable the at least one DC receptacle.

19. The system of claim 15 wherein the user interface is configured to enable detecting a connection between the at least one voltage sampling receptacle and an electrical device and to enable automatically sampling the voltage from the at least one voltage sampling receptacle upon detecting the connection, and wherein the electrical device comprises at least one member of a group consisting of a computer, a printer, a fax machine, a pocket PC, a personal digital assistant, a phone, a camera, a recording device, an audio device, a video device, and a drill.

20. The system of claim 15 wherein:

the user interface is configured to receive user input defining a desired voltage; and the processor is configured to process the user input and, in response thereto, determine the desired voltage, configure the at least one DC to DC regulator to convert the DC power to the desired voltage, and enable generating the DC power at the desired voltage for at least one other DC receptacle.

21. The system of claim 15 wherein:

the power system further comprises a plurality of AC receptacles configured to convey the AC power at an AC power level; and the user interface is configured to generate for display a name for each of the plurality of DC receptacles and each of the plurality of AC receptacles and to change an appearance of the name corresponding to the at least one voltage sampling receptacle and to the at least one DC receptacle.

22. The system of claim 21 wherein the user interface is configured to receive a user input assigning a different name for at least one receptacle selected from the group consisting of the plurality of DC receptacles and the plurality of AC receptacles and to generate for display the different name assigned to the at least one receptacle.

23. The system of claim 15 wherein:
the user interface is further configured to enable automatically assigning the sampled DC power level to at least one other DC receptacle when the at least one DC receptacle is not open for a connection to an electrical device;
the voltage sampling system is configured to generate another signal, that when processed, indicates whether the at least one other DC receptacle is open for the connection to the electrical device; and
the processor is configured to process the other signal, and in response thereto, determine whether the at least one DC receptacle is open for the connection and to enable the at least one DC to DC regulator to generate the DC power at the sampled voltage level for the at least one other DC receptacle when the at least one DC receptacle is determined not to be open for the connection.

24. A system for configuring alternating current (AC) power comprising:
a power system comprising:
    a plurality of direct current (DC) receptacles;
    at least one AC to DC regulator configured to convert the AC power to DC power;
    a voltage sampling system configured to sample a voltage from at least one voltage sampling receptacle and to generate a signal indicating the sample voltage;
    at least one DC to DC regulator configured to receive the DC power from the at least one AC to DC regulator, to convert the DC power to the sampled voltage, and to generate the DC power at the sampled voltage for at least one DC receptacle, the sampled voltage not initially preset, the sampling receptacle and the at least one DC receptacle being separate receptacles;
    a processor configured to process the signal and, in response thereto, determine the sampled voltage and configure the at least one DC to DC regulator to convert the DC power to the sampled voltage; and
a user interface configured to:
    enable detecting a connection between the at least one voltage sampling receptacle and an electrical device;
    generate for display an identification of the sampled voltage;
    enable automatically initiating sampling of the voltage from the at least one voltage sampling receptacle upon detecting the connection;
    enable selecting the at least one DC receptacle from the plurality of DC receptacles at which to generate the DC power at the sampled voltage; and
    enable and disable the at least one DC receptacle.

* * * * *